United States Patent
Reis et al.

(10) Patent No.: US 11,971,490 B2
(45) Date of Patent: Apr. 30, 2024

(54) MULTI-SYSTEM-BASED DETECTION AND MITIGATION OF GNSS SPOOFING

(71) Applicant: Higher Ground LLC, Palo Alto, CA (US)

(72) Inventors: Robert S. Reis, Palo Alto, CA (US); Shmuel Shaffer, Palo Alto, CA (US); Darren Robert Reis, Palo Alto, CA (US); James M. Behmke, Pembroke, MA (US); David Alexander Reuss, San Leandro, CA (US)

(73) Assignee: Higher Ground LLC, Palo Alto, CA (US)

( * ) Notice: Subject to any disclaimer, the term of this patent is extended or adjusted under 35 U.S.C. 154(b) by 450 days.

(21) Appl. No.: 17/186,611

(22) Filed: Feb. 26, 2021

(65) Prior Publication Data

US 2021/0311201 A1    Oct. 7, 2021

Related U.S. Application Data

(60) Provisional application No. 63/003,438, filed on Apr. 1, 2020, provisional application No. 63/039,876, filed on Jun. 16, 2020.

(51) Int. Cl.
  *G01S 19/21*    (2010.01)
  *G01S 19/42*    (2010.01)
  (Continued)

(52) U.S. Cl.
  CPC ............ *G01S 19/21* (2013.01); *G01S 19/215* (2013.01); *G01S 19/421* (2013.01); *G01S 5/14* (2013.01);
  (Continued)

(58) Field of Classification Search
  CPC ........ G01S 19/20; G01S 19/21; G01S 19/215; G01S 19/42; G01S 19/51; H04K 3/22; H04K 3/90; H04W 12/122
  (Continued)

(56) References Cited

U.S. PATENT DOCUMENTS 9,571,970 B2 *  2/2017  Kazemi ................. H04W 4/029
9,945,952 B2     4/2018  Arcidiacono et al.
(Continued)

FOREIGN PATENT DOCUMENTS

CN          112055821 A  * 12/2020  ........... G01S 19/215

OTHER PUBLICATIONS

"Report Concerning Space Data Systems Standards: Delta-Dor Technical Characteristics and Performance", Informational Report, Green Book, Nov. 2019, 83 pages, CCSDS.
(Continued)

*Primary Examiner* — Chuong P Nguyen
(74) *Attorney, Agent, or Firm* — BEHMKE INNOVATION GROUP LLC; James M. Behmke; Andy L. Schofield

(57) ABSTRACT

According to one or more of the embodiments herein, systems and techniques for multi-system-based detection and mitigation of Global Navigation Satellite System (GNSS) spoofing are provided. In one embodiment, a method comprises: obtaining a first location of an object from a primary location determination hardware system; obtaining a second location of the object from a secondary location determination hardware system; determining a distance difference between the first location and the second location; determining whether the distance difference between the first location and the second location is acceptable based on a threshold distance; and initiating one or more mitigation actions in response to the distance differ-
(Continued)

ence between the first location and the second location being unacceptable.

96 Claims, 51 Drawing Sheets

(51) Int. Cl.
| | |
|---|---|
| G01S 5/14 | (2006.01) |
| G01S 19/11 | (2010.01) |
| G01S 19/25 | (2010.01) |
| G01S 19/37 | (2010.01) |
| G01S 19/45 | (2010.01) |
| G01S 19/51 | (2010.01) |
| H04B 7/185 | (2006.01) |
| H04W 4/02 | (2018.01) |
| H04W 4/021 | (2018.01) |
| H04W 4/029 | (2018.01) |
| H04W 12/122 | (2021.01) |
| H04W 64/00 | (2009.01) |

(52) U.S. Cl.
CPC .......... *G01S 19/115* (2019.08); *G01S 19/256* (2013.01); *G01S 19/258* (2013.01); *G01S 19/37* (2013.01); *G01S 19/45* (2013.01); *G01S 19/51* (2013.01); *H04B 7/18513* (2013.01); *H04W 4/021* (2013.01); *H04W 4/023* (2013.01); *H04W 4/029* (2018.02); *H04W 12/122* (2021.01); *H04W 64/00* (2013.01)

(58) Field of Classification Search
USPC .................. 342/357.59, 357.25, 357.34
See application file for complete search history.

(56) References Cited

U.S. PATENT DOCUMENTS

| | | | | |
|---|---|---|---|---|
| 10,036,813 | B2* | 7/2018 | Nyikos | G01S 19/396 |
| 10,165,452 | B2* | 12/2018 | Ramamurthi | H04W 16/28 |
| 10,495,759 | B2* | 12/2019 | Leibner | G01S 19/215 |
| 10,812,991 | B2* | 10/2020 | Ramamurthi | H04W 36/20 |
| 11,415,702 | B2* | 8/2022 | Marmet | G06K 19/06009 |
| 11,448,770 | B2* | 9/2022 | Song | G01S 19/20 |
| 11,638,153 | B2* | 4/2023 | Reis | G01S 19/38 |
| | | | | 342/352 |
| 11,736,946 | B2* | 8/2023 | Reis | H04W 12/122 |
| | | | | 370/316 |
| 2016/0370470 | A1* | 12/2016 | Mabuchi | G07B 15/063 |
| 2016/0370471 | A1* | 12/2016 | Mabuchi | G01S 19/215 |
| 2021/0333411 | A1* | 10/2021 | Gum | G01S 19/215 |

OTHER PUBLICATIONS

Krawinkel, et al., "Innovation: Better GNSS Navigation and Spoofing Detection with Chip-Scale Atomic Clocks", Oct. 12, 2016, 14 pages, GPSWorld.com.

* cited by examiner

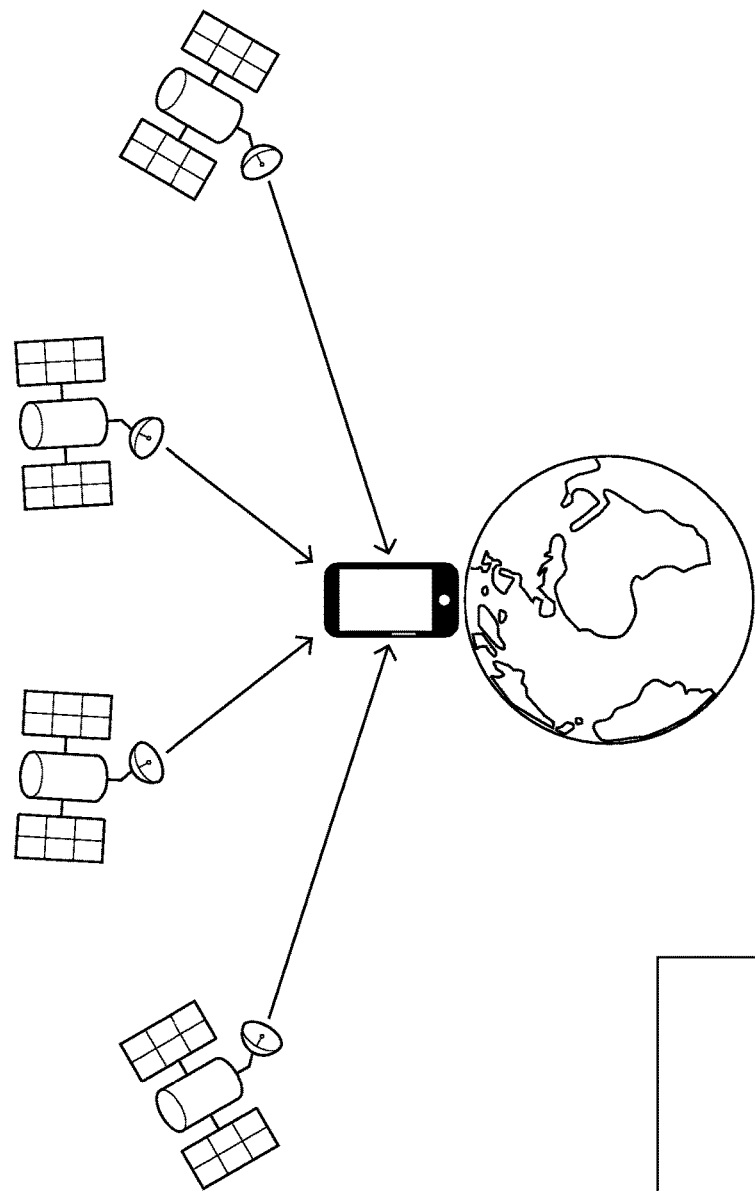
FIG. 1
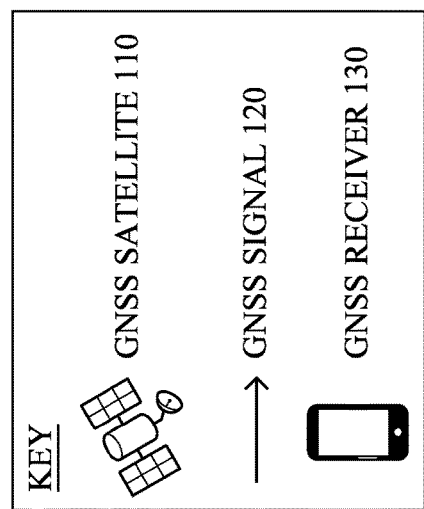

| Terminal ID 1705 | Satellite X 1710x | Satellite Y 1710y | Satellite Z 1710z | Location 1715 |
|---|---|---|---|---|
| "A" | (Measurement) | (Measurement) | (Measurement) | "X" |
| "B" | (Measurement) | (Measurement) | (Measurement) | "Y" |
| "C" | (Measurement) | [--] | (Measurement) | ?? |
| ... | | | ... | ... |

| | |
|---|---|
| HEADER 2210 | |
| TRANSMITTER INFORMATION 2220 | |
| [ ID 2222 | TX TIME 2224t | MEASUREMENT 2226 ] | |
| FIRST RELAY / SATELLITE INFORMATION 2230 | |
| [ ID 2232 | RX TIME 2234r | TX TIME 2234t | DELAY 2238 ] | |
| ECHO DEVICE INFORMATION 2240 | |
| [ ID 2242 | RX TIME 2244r | TX TIME 2244t | MEASUREMENT 2246 | DELAY 2248 ] | |
| SECOND RELAY / SATELLITE INFORMATION 2250 | |
| [ ID 2252 | RX TIME 2254r | TX TIME 2254t | DELAY 2258 ] | |
| OTHER CONTROLS / DATA 2260 | |

| HEADER 2310 | ACCUMULATED DELAY 2320 | KNOWN MEASUREMENT 2330 | SATELLITE LOCATION INFORMATION 2340 | OTHER CONTROLS / DATA 2360 |
|---|---|---|---|---|

FIG. 23

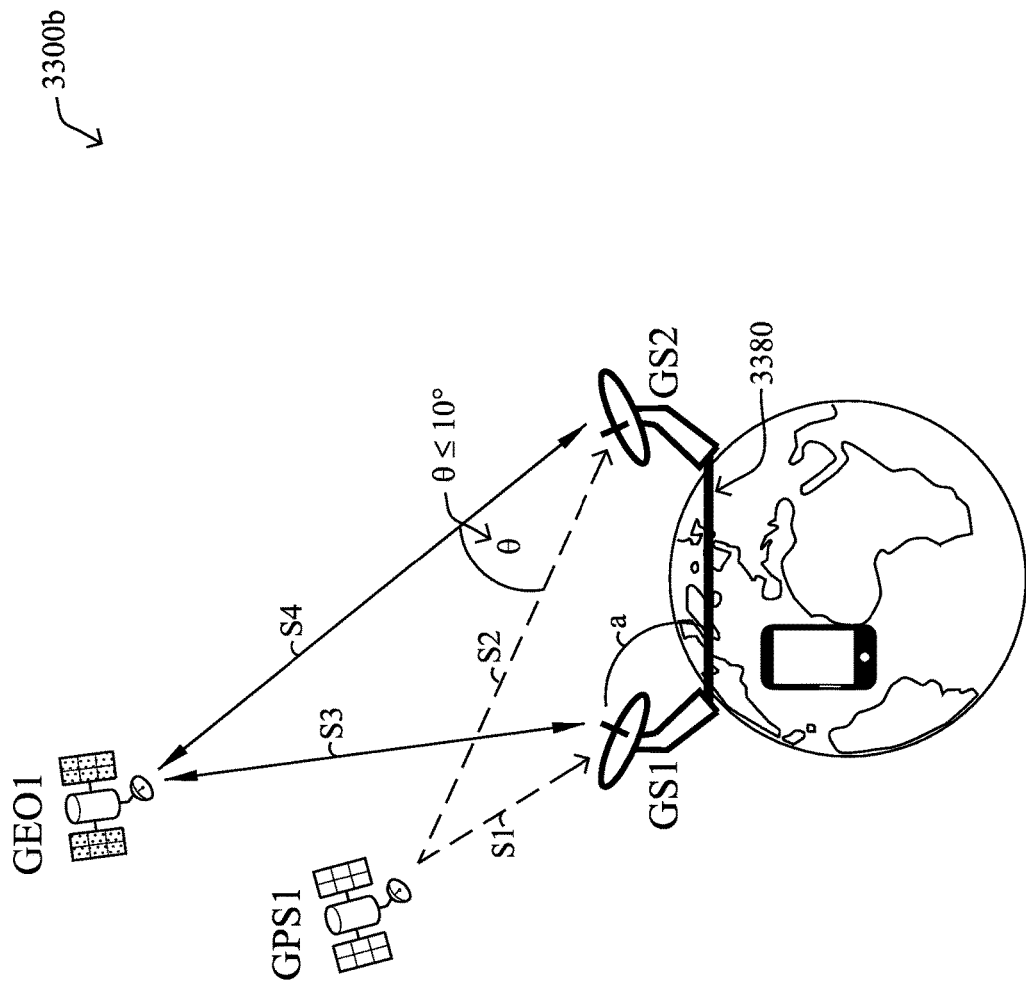
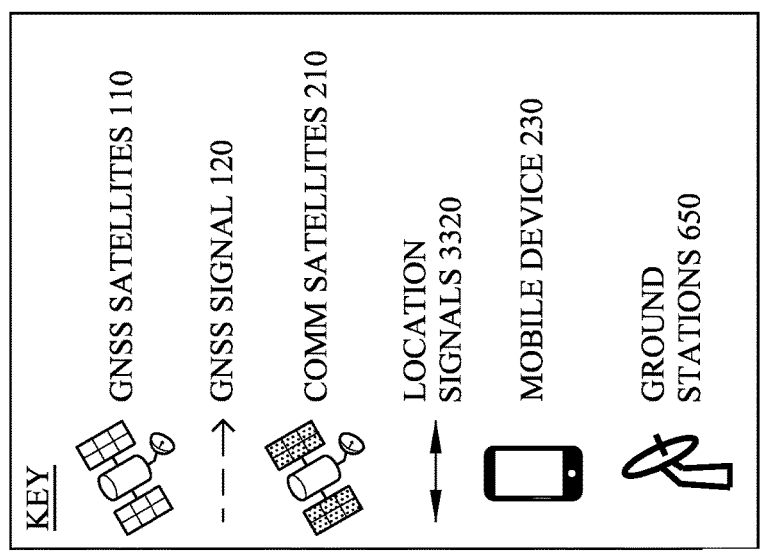
FIG. 33B

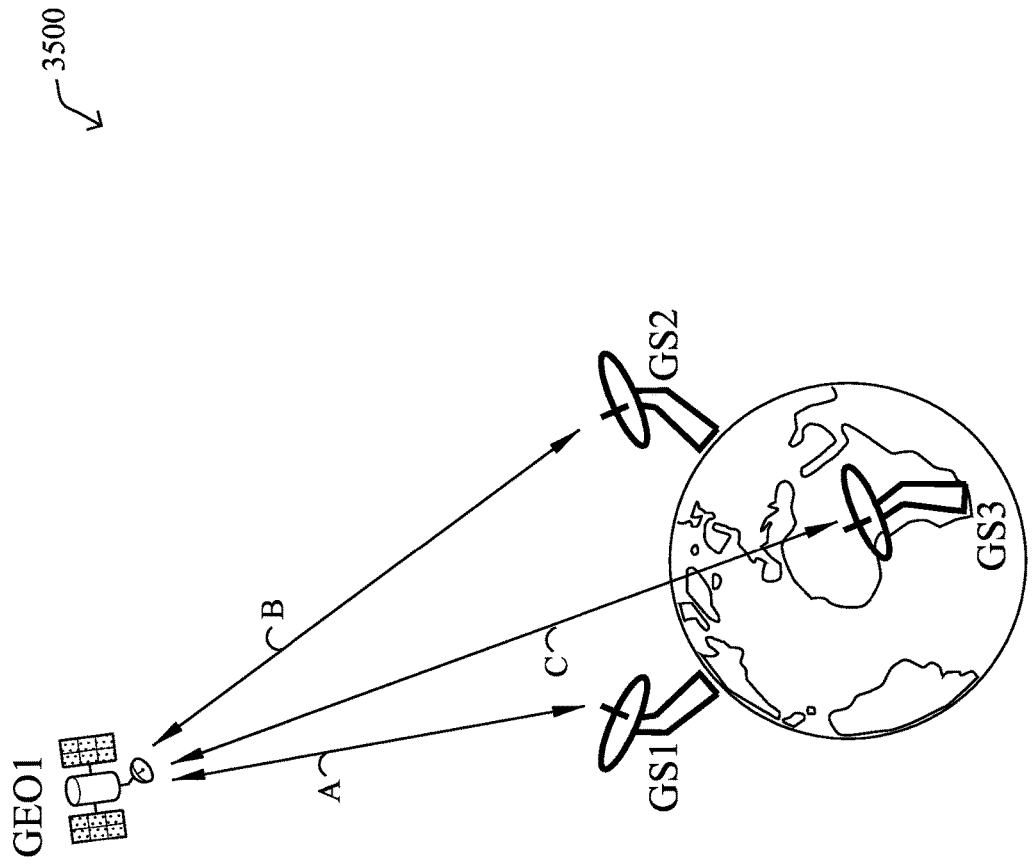
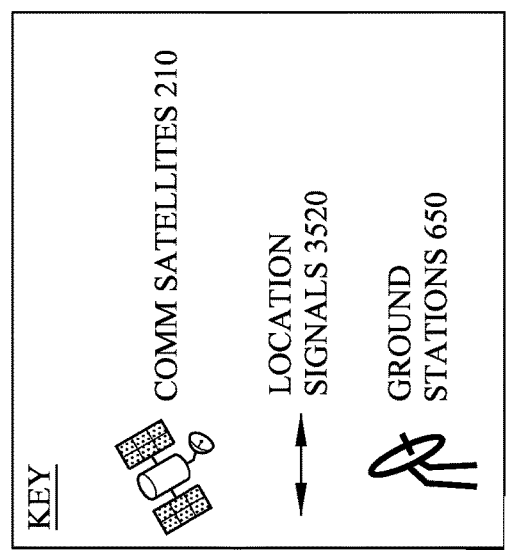
FIG. 35

MULTI-SYSTEM-BASED DETECTION AND MITIGATION OF GNSS SPOOFING

RELATED APPLICATIONS

This application claims priority to U.S. Provisional Patent Application No. 63/039,876 filed on Jun. 16, 2020, entitled DETECTION AND MITIGATION OF GPS DENIAL, by Reis, et al., as well as to U.S. Provisional Patent Application No. 63/003,438 filed on Apr. 1, 2020, entitled DETECTION AND MITIGATION OF GPS DENIAL, by Reis, et al., the contents of each of which being incorporated herein by reference in their entirety.

TECHNICAL FIELD

The present disclosure relates generally to satellite communication systems, and, more particularly, to multi-system-based detection and mitigation of Global Navigation Satellite System (GNSS) spoofing.

BACKGROUND

Global Navigation Satellite Systems (GNSS), such as the Global Positioning System (GPS) (also referred to as "global positioning satellites") in the United States, are systems wherein a mobile device is a passive device which receives signals from GNSS satellites and determines its own location based on the information encoded in the received signals as well as the time difference between the received signals. One of the benefits of this system is the fact that the mobile device does not need to transmit any signals and as such it does not have any radio footprint that may identify its location. Additionally, the fact that the mobile device does not need to transmit any radio signal saves battery power and extends the operation time of the device.

One of the biggest shortcomings of GNSS systems is the ease with which they can be jammed (blocked) or spoofed (making a receiver believe it is in a different location than it actually is). GNSS jamming devices are readily available for personal privacy use, and on a larger scale, GNSS jammers can be, and frequently are, used as part of electronic warfare to eliminate or misguide an adversary's personnel navigation and sophisticated weaponry systems. Additionally, while GNSS spoofing devices are generally more sophisticated, they are still known to exist and to be in use.

Generally, GNSS is easy to jam because it relies on a weak signal transmitted from satellites over a narrow frequency band. Additionally, given the fact that the GNSS signal is generated by predefined hardware in satellites makes it practically impossible to modify the system in order to make it more robust.

Numerous worldwide commercial operations heavily rely on the operations of the GNSS system. A 2017 London Economics report concluded that a five day GNSS outage would cost the nation at least $1.3B per day.

The US army is experimenting with a solution based on deploying GPS "satellites" or stations on or near the ground. The ground-based GPS stations provide full control over the locations and power of the transmissions. Such a system can ensure that transmissions reach places that space borne GPS signals normally struggles with, such as deep urban canyons, forests, and valleys. Though the transmit power of such a system may be increased to make the signal much harder to jam than space-borne GPS satellite signals, the challenge with these GPS ground stations (or pseudo-satellites) is determining their location accurately in an environment that is prone to jamming and susceptible to spoofing of the space borne GPS.

Similarly, another suggested solution to this problem is based on low elevation orbiting satellites (LEO) which are 25 times closer to earth than the GPS satellites, and as such the signal received from these satellites is 1000 times stronger than signals received from the GPS satellites. Additionally, the signal from these satellites is encrypted. Therefore, it is proposed that jamming or spoofing these signals is more challenging. However, one problem associated with this solution is that a low flying drone or other devices can still jam the specific frequencies used by this system and block the frequency band used by this solution.

To address the severity of this situation and the lack of current solutions, the United States Department of Defense issued a memorandum on Dec. 16, 2019 to the Defense Science Board Task Force on Position, Navigation, and Timing Control (PNTC) establishing a taskforce to study and recommend an architecture which provides a more resilient position, navigation, and timing (PNT) services (alternatively, precision navigation and timekeeping (PNT)) for both commercial and military purposes.

SUMMARY

According to one or more of the embodiments herein, systems and techniques are provided for a viable alternative to a traditional Global Navigation Satellite System (GNSS), as well as for detection and mitigation of GNSS denial (jamming and/or spoofing). In particular, certain aspects of the techniques herein may be used in conjunction with providing a robust positioning and navigation system that is not prone to jamming or spoofing, and is easy to modify through software methodology (i.e., without modifications to satellite hardware systems). Unlike existing GNSS systems, where the mobile device acts as a passive receiver, a system in accordance with certain techniques herein may use a mobile device's satellite transmission and reception capabilities to determine a position of the mobile device, without being dependent on receiving signals from traditional GNSS satellites. Also, a system in accordance with the present disclosure can operate as a standalone system or as a companion system to the conventional GNSS system. Further embodiments described herein may also be used to increase the accuracy of the satellite-based geolocation techniques herein, accordingly.

Specifically, the current application is directed to satellite communication systems, and, more particularly, to multi-system-based detection and mitigation of GNSS spoofing. In one particular embodiment, an illustrative method according to one or more embodiments of the present disclosure may comprise: obtaining a first location of an object from a primary location determination hardware system; obtaining a second location of the object from a secondary location determination hardware system; determining a distance difference between the first location and the second location; determining whether the distance difference between the first location and the second location is acceptable based on a threshold distance; and initiating one or more mitigation actions in response to the distance difference between the first location and the second location being unacceptable.

Other embodiments of the present disclosure may be discussed in the detailed description below, and the summary above is not meant to be limiting to the scope of the invention herein.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 1 illustrates an example of a Global Navigation Satellite System (GNSS);

FIG. 17 illustrates an example of a location measurement collection table in accordance with one or more embodiments herein;

FIG. 22 illustrates an example of a locating message format in accordance with one or more embodiments herein;

FIG. 23 illustrates another example of a locating message format in accordance with one or more embodiments herein;

FIG. 33B illustrates an example of Delta-DOR (differential interferometry) for highly accurate locating of a communication satellite in accordance with one or more embodiments herein;

FIG. 35 illustrates an example of an example of trilateration-based satellite location accuracy for improved satellite-based geolocation in accordance with one or more embodiments herein;

DESCRIPTION OF EXAMPLE EMBODIMENTS

Figure 2:
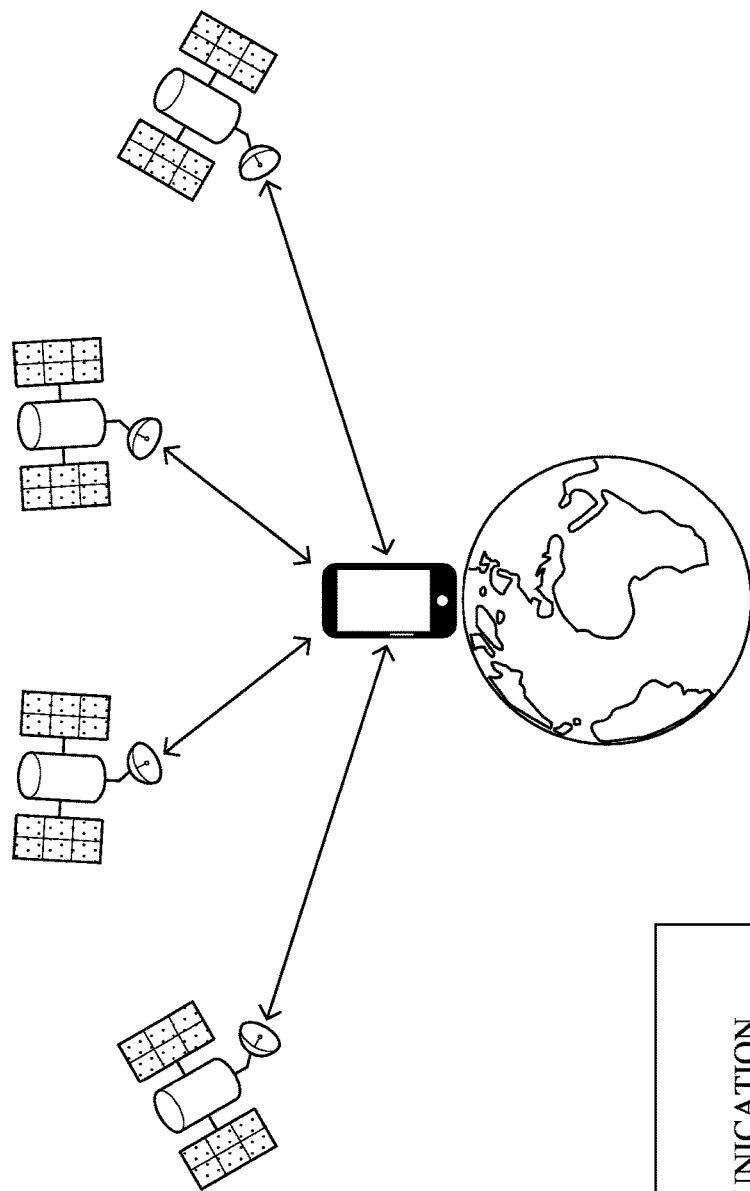
FIG. 2 illustrates an example of a bidirectional satellite communication location system in accordance with one or more embodiments herein.

As noted above, Global Navigation Satellite Systems (GNSS), such as the Global Positioning System (GPS) in the United States, are systems wherein a passive mobile device receives signals from GNSS satellites and determines its own location based on the information encoded in the received signals as well as the time difference between these received signals. As also noted above, however, one of the biggest shortcomings of GNSS systems is the ease with which they can be jammed or spoofed.

For example, people who are concerned that a GNSS tracking device may have been installed on their vehicle can purchase (on the web) a GNSS jamming device. Examples for people who use these small devices are truckers trying to avoid paying highway tolls, employees blocking their bosses from tracking their cars, high school kids using them to fly drones in a restricted area, and even undercover police officers using them to avoid tails.

On larger scale, given the use of GNSS systems for warfare such as GNSS guided missiles, ship and aircraft navigation, drone navigation, etc., GNSS jammers used as part of electronic warfare. For example, military operations can jam GNSS over a 500-mile zone, eliminating the ability for soldiers and weapons within that region to properly decode GNSS signals.

Furthermore, while jamming GNSS signals is a crude way of disabling the system, a more sophisticated method of interfering with the GNSS system focuses on spoofing the signals, thus generating a misleading GNSS readout rather than simply jamming it. For example, spoofed (or impersonated) GNSS signals can make a receiver believe that it is in a much different location than it actually is, such as ships moored in a harbor believing that they are many miles away on land, by overriding and promoting incorrect data (e.g., fake signals structured to resemble a set of normal GPS signals, or by rebroadcasting genuine signals captured elsewhere or at a different time). This applies to timing, latitude and longitude and altitude, so these false signals could also have detrimental effects to numerous use cases, including sea and air travel, for instance. Additionally, one specific type of GNSS spoofing is a "carry-off attack" starts with broadcasting signals synchronized with genuine signals that would be seen by the receiver, and then the counterfeit signals are gradually increased in power to draw reception away from the genuine signals, and controlling the receiver's information without causing any alarmingly abrupt change in location.

As also noted above, GNSS can be easy to jam and spoof, or generally "deny", because it relies on a signal transmitted from satellites over long distances such that it is weak in power at the ground (i.e., the signal received on/near the earth is incredibly weak, having a low signal-to-noise ratio (SNR)). Further, the typical GNSS signal is spread over a narrow frequency band. Overpowering the signal with noise or a misleading signal thus merely requires transmission of an interfering signal on the GNSS frequencies. Since the spectrum is narrow (e.g., GPS operation, for example, is at a single central frequency [1575 MHz]), this is not difficult to accomplish. Additionally, given the fact that the GNSS signal is generated by predefined hardware in satellites makes it practically impossible to modify the system in order to make it more robust. That is, the only way to upgrade GNSS satellites is to replace them, or to manually upgrade their hardware in orbit, neither of which being a particularly practical solution.

Both GNSS jamming and spoofing can be based on mobile devices as well as stationary systems. Unfortunately, while originally limited to highly sophisticated operations, the technology required to disrupt GNSS functionality is becoming more readily accessible as time progresses, and can occur anywhere without warning or expectation. The proliferation of the manipulation of global positioning and navigation systems in this manner makes reliance on current GNSS receivers increasingly dangerous.

Numerous alternative navigation solutions have been proposed, each one of them having different drawbacks. Inertial navigation systems, for instance, are based on accelerometers (e.g., gyros), and are prone to drift due to gyro's bias. Image-based navigation systems are computationally expensive and may require prior mapping of the terrain over which navigation would take place. Additionally, each of these systems may be less useful in the open seas. Moreover, navigation systems that utilize signals of opportunity, such as television, radio, cellular signals, etc., require a preview of the signal's strength and depend on these signals being available at all times. These systems may also have similar limitations for navigation over oceans.

The techniques herein, therefore, provide for a robust positioning and navigation system as a viable alternative to a traditional GNSS that is not prone to jamming or spoofing, as well as for detection and mitigation of GNSS denial (jamming and/or spoofing). Unlike existing GNSS systems, where the mobile device is a passive receiver, a system in accordance with certain techniques herein may use a mobile device's satellite transmission and reception capabilities to determine a position of the mobile device, without being dependent on receiving signals from traditional GNSS satellites. Also, a system in accordance with the present disclosure can operate as a standalone system or as a companion system to the conventional GNSS system. Further embodiments described herein may also be used to increase the accuracy of the satellite-based geolocation techniques herein, accordingly.

Referring to FIG. 1, a GNSS environment 100 relies on the fact that the location of the GNSS satellites 110 is well known with high accuracy. Illustratively, GPS satellites transmit, in GNSS signals 120, their identification (ID), orbit path, and a precise time-stamp indicating the time of transmission (ToT) of the signal. When a GNSS receiver 130, such as a mobile device, receives a signal from a GNSS satellite (from at least three, or preferably four or more satellites for increased precision), it determines the time of arrival (ToA), and specifically the difference between the ToT and ToA (time difference on arrival, or "TDOA", and from this the travel time of the radio signal (also known as the time of flight (ToF)). The ToF can then be used to calculate the distance between a given satellite and the mobile device, and through trilateration, which is the intersection of spheres of possible locations based on distances from three or more satellites. A fourth satellite signal would allow the receiver to determine its own time offset from the atomic time of the satellites. With these values the mobile device (GPS receiver 130) can determine its position.

Illustratively, each GPS satellite continuously broadcasts a navigation message on two or more L-band (10.23 MHz) frequencies: one at 1575.42 MHz (10.23 MHz×154) called "L1"; and a second at 1227.60 MHz (10.23 MHz×120), called "L2". L1 traditionally broadcasts a coarse/acquisition (C/A) code and a longer precision code (P), particularly its encrypted version or "P(Y)" code, while the L2 frequency is used to broadcast P(Y) code. Notably, at a rate of 50 bits per second, each complete "almanac" message takes 750 seconds (i.e., 12½ minutes) to complete. However, once a particular satellite's code is tracked, a GPS receiver can then estimate its position from the continuous message it is receiving from that satellite. Additional frequencies and codes (e.g., various modernization codes, military codes, "L5" frequency, and so on) have been added over time for better precision, security, and general availability.

Based on the original design, GPS signals (e.g., the L1, L2, and L5 signals) utilizing a bandwidth of about 10.23 MHz each, are generally easy to disrupt by jamming or spoofing. This is because the GPS frequency is fixed and narrow. Accordingly, the techniques herein provide a more robust system which is harder to jam or spoof, as well as a system that can determine and provide mitigation when a GPS/GNSS location is spoofed, as described in detail below. The signals used by the techniques herein, on the other hand, may be moved to different parts of the spectrum band as traffic or adversaries demand, where the protocol between the receiver and transmitter can negotiate the utilized band based on a number of factors (e.g., channel availability, for instance). In accordance with another example implementation, the receiver and the transmitter are part of the same mobile device and as such the change in communication parameters is determined locally in the mobile device and distributed to all other components of the mobile device. In accordance with yet another example implementation the change in communication parameters is negotiated between the transmitter and the satellite or between the transmitter and the ground station.

Referring to environment 200 of FIG. 2, however, certain aspects of the techniques herein may rely on a plurality of bi-directional communication satellites 210, e.g., geostationary satellites, geosynchronous equatorial orbit (GEO) satellites medium earth orbit or (MEO) satellites, or low earth orbit (LEO) satellites, and their known locations. That is, through the advantageous use of bi-directional location signals 220 described herein, meaning signals that can be sent either from the satellite 210 to the mobile device 230, or from the mobile device to the satellite (and, optionally, to/from a ground station, not shown in FIG. 2 but described further below), the techniques herein overcome many of the limitations of conventional GNSS technologies, complement many of the features of GNSS technologies, and enhance geolocation capabilities in general.

For instance, unlike a GNSS signal (e.g., a GPS signal), which is narrow band over a fixed frequency, the bi-directional location signals 220 herein can, and often do, use frequency hopping spread spectrum (FHSS) signals which are difficult to jam. This is particularly true since the parameters of the bi-directional location signals 220 are generated (or at least controlled) by the mobile (e.g., handheld) device 230 or a ground station communicating with the mobile device, the characteristics of signal (e.g., frequency, modulation, bandwidth, encryption, etc.) may easily be modified to further avoid jamming and/or spoofing. For instance, as described below, in certain embodiments a mobile device echoes messages off a satellite back to itself, and as such can configure the message in any way it desires (within the bounds be being echoed by the satellite), such as changing the parameters of the message (bandwidth, frequency band, spread spectrum code/keys, modulation, and so on) or the message itself (e.g., encryption, content, etc.). Also, as described below, where ground stations are involved, the mobile device and the ground station may exchange control messages to coordinate these parameters in advance and/or as a mitigation measure. Additionally, the generally unpredictable nature of the bi-directional location signals 220, or at least of their configuration, make the signals challenging for an adversary to deny, since it can be difficult to know when and where a location request is being initiated, and under what signal characteristics, and to what satellite, and so on, as described in greater detail below. Moreover, although the signature of a next GNSS signal is known to everyone, the techniques herein allow for a signature to be embedded within an encrypted communication message, and as such spoofing is more challenging. (Also, the techniques herein may repeat the spread spectrum code n times to achieve integration gain and thus reduced ranging error, as may be appreciated by those skilled in the art.)

Figure 3:
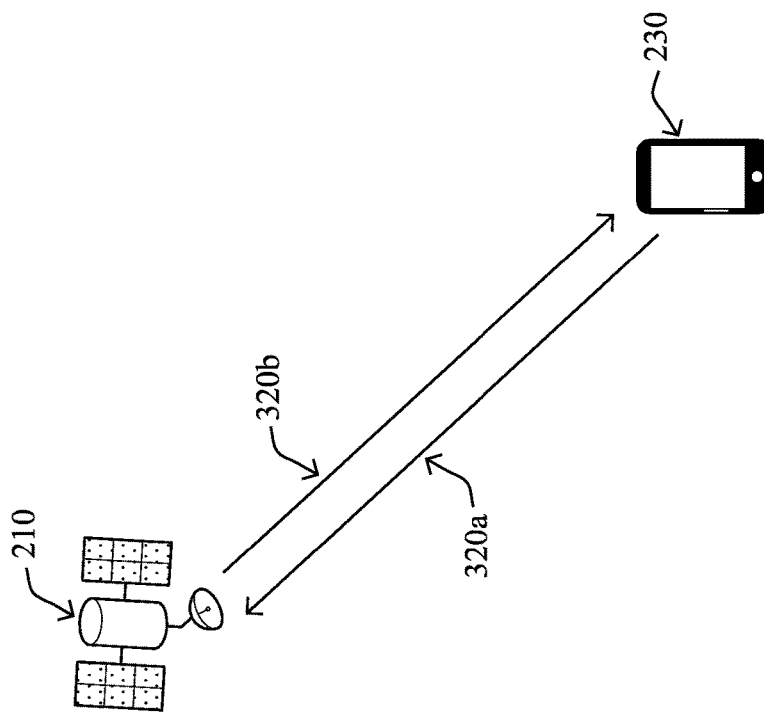
FIG. 3 illustrates an example of a "where am I" (WAI) message system in accordance with one or more embodiments herein.

According to a first embodiment of the techniques herein, and with reference to simplified environment 300 of FIG. 3, when a system (e.g., mobile device 230, also referred to herein as a terminal 230) needs to determine its own location, it transmits a sequence of specific "locating messages" 320 (bi-directional location signals 220), referred to in this embodiment as "where am I" (WAI) messages, towards one or more different satellites on a specific communication channel dedicated to communication between the mobile device and each specific satellite 210. In particular, locating messages 320, as shown, comprise the initial message 320a from the mobile device 230 to the satellite 210, which then "echoes" the message 320b back to the mobile device. (Note that matched filters may be used to increase the signal-to-noise ratio (SNR) of the returned message, where, since the known signal (unknown to an adversary) is sent out in message 320a, the reflected signal in message 320b can be examined for common elements of the out-going signal, increasing the SNR, and adding further jam prevention.)

WAI messages are "self-clocked", meaning no time synchronization is needed between the mobile device 230 and the satellite 210. Instead, the mobile device may either mark the message 320a with the time of transmission, store the time of transmission locally, or may start an internal timer at the time of transmission. This way, once the mobile device receives the echoed WAI message 320b, it calculates the total time the WAI message travelled to and from the satellite based on the time of reception (e.g., compared to the marked, stored, or elapsed time). From the total round trip flight time, the mobile device may then calculate the one way flight time of the message as follows:

One way flight time=(round trip time−satellite processing time)/2  Eq. 1.

The flight time is then translated into a distance between the mobile device 230 and the satellite 210 based on the speed of radio waves in the air, as will be appreciated by those skilled in the art.

From this distance, the mobile device may then be able to calculate its location based on a known location of the satellite, in addition to the distances between the mobile device and other objects (e.g., other satellites, generally). This is a process called "trilateration" for the case where there are three range measurements. (Obtaining the additional distances is described in more detail below.)

Regarding the satellite processing time in Eq. 1, it is critical to remove any delay from the round trip flight time that is not associated with actual flight time of the signals through air (and space). In accordance with one example embodiment, as the satellite receives a WAI message, it reflects and echoes the WAI message back to the mobile device while indicating in the returned message the processing time delay in the satellite before the reply message has been transmitted back to the mobile device. In accordance with another embodiment, rather than incorporating the processing time of the reflected echo message in the echo message itself, the processing time delay is sent after sending the reflected message in a follow-up message after measuring precisely the delay time for the echoed message (e.g., immediately after the echo message is returned). In either case, the mobile device uses the time of flight (ToF) of the message between the mobile device and the satellite based on subtracting the time the satellite processed/delayed the message from the total round trip flight time from the initial transmission from the mobile device and back to itself.

The delay time through the satellite according to one embodiment is measured with high precision and communicated to the mobile terminal. In accordance with a second embodiment, a fixed delay time may be configured in the satellite, e.g., 10 milliseconds. The satellite then delays the WAI echo message and ensures that it is sent back to the mobile terminal exactly (e.g., 10 milliseconds) after the original WAI message has been received by the satellite. When a fixed delay is used, the fixed delay is configured in the mobile terminal rather than being sent to the mobile terminal from the satellite. When this method is used, the satellite ensures that its transmitter is ready to transmit the WAI echo message exactly at the configured time. To achieve this, the satellite may, and often does, preempt any other operation that may interfere with its ability to send the WAI echo message in a timely manner. In accordance with another implementation rather than preempting ongoing operations, as soon as the satellite identifies that it has received a WAI message, it stops queueing new (non-WAI) messages in its transmit queue that could interfere with its ability to meet the strict transmission timing. This process ensures that the satellite would not need to stop transmitting (preempt) a message in the middle of a transmission packet.

Notably, as used herein, the term "echo" references the fact that a message initiated from a transmitting device is returned to that transmitting device. However, as will be appreciated by those skilled in the art based on the description herein, an "echoed message" may be altered along its transmission path by intermediate devices in one way or another. For instance, as described herein, a communication satellite may be described as receiving and returning a message, but in detail the satellite may alter one or more signal transmission properties of the received message, such as by mixing the received signal with a signal from another oscillator, such that the "echoed message/signal" is returned over a different frequency band than the received frequency band (e.g., the incoming frequency band is different than the returned frequency band). Also, intermediate devices may insert additional data into the echoed messages, such as entering one or more delay values as described herein, or may generate an entirely new message to return in response to a received message. Accordingly, the terms "echo", "echoed", "echoing", etc., are not meant to be limiting to the scope of the present disclosure, and are merely meant to imply that a message initiated by an initiating device results in a returned message to that initiating device per one or more of the embodiments of the techniques herein.

Figure 4:
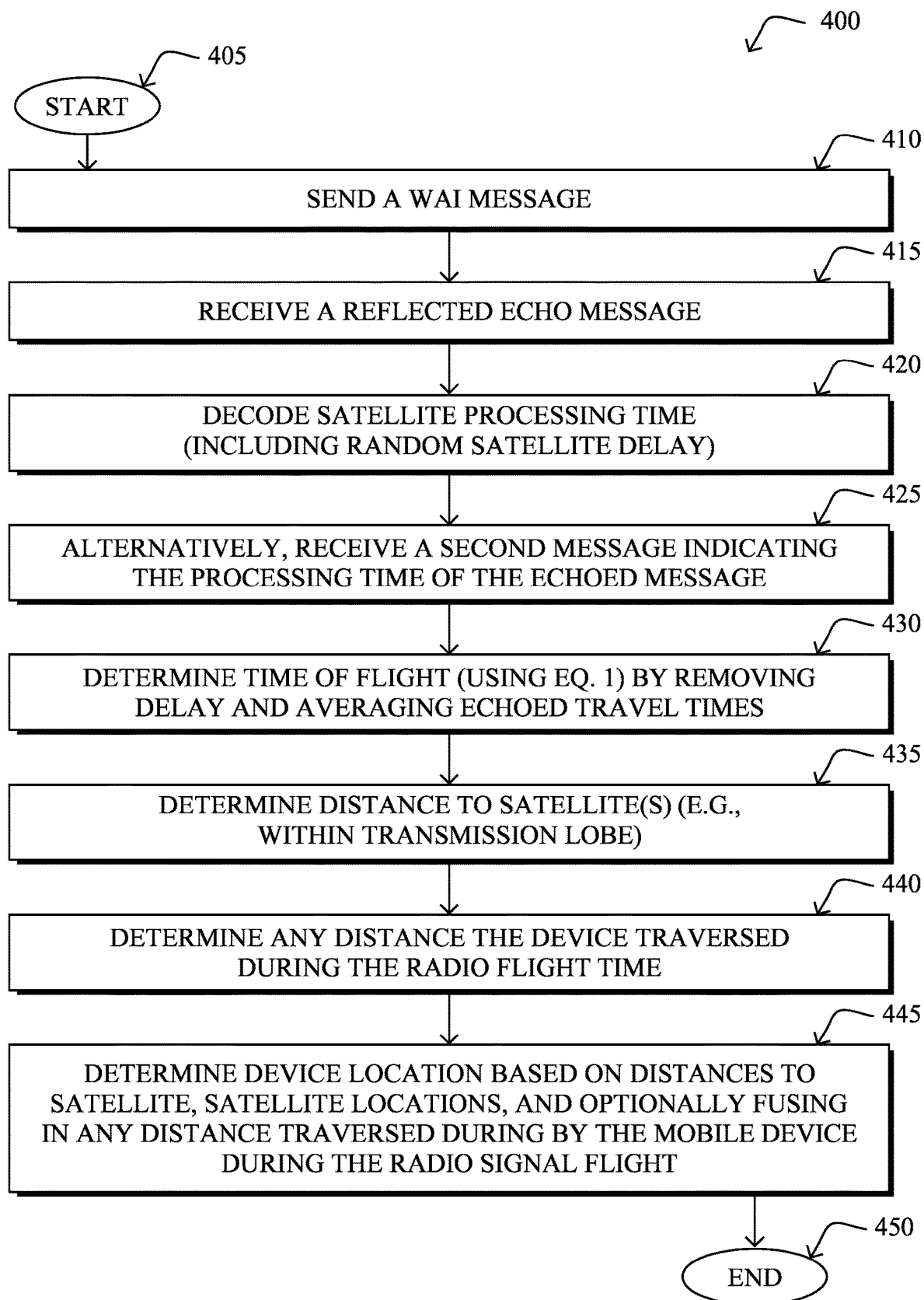
FIG. 4 illustrates an example of determining a location based on sending WAI messages in a single direction in accordance with one or more embodiments herein.

FIG. 4 illustrates an example flowchart 400 for a device that determines its location based on sending WAI messages in a single direction. Starting in step 405, the device sends a WAI message (step 410), and then receives reflected echo messages (step 415). In step 420, the device decodes satellite processing time (including random satellite delay), or else in step 425 alternatively receives a second message indicating the processing time of the echoed message. Accordingly, in step 430, the device determines time of flight using Eq. 1 above (removing delay and averaging echoed travel times), and can thus determine its distance to the satellite (and, as described below, optionally other satellites within the transmission lobe of the original WAI message) in step 435.

As also described further below, in certain embodiments herein, in step 440 the device may also determine any distance it traversed during the echoing WAI message flight time. That is, given the processing time and the delay caused by the radio signal flight time, the system herein may also utilize an accelerometer or similar relative positioning sensor to determine any distance traveled by the mobile device while the radio signal was in flight. The mobile device can then determine the device location in step 445 based on distances to the satellites, satellite locations, and optionally fusing in any distance traversed during by the mobile device during the radio signal flight. (As described in greater detail below, the location presented to the end user of the mobile device would thus include a compensation for the distance indicated by the accelerometer system.)

The example procedure ends in step 450.

Figure 5:
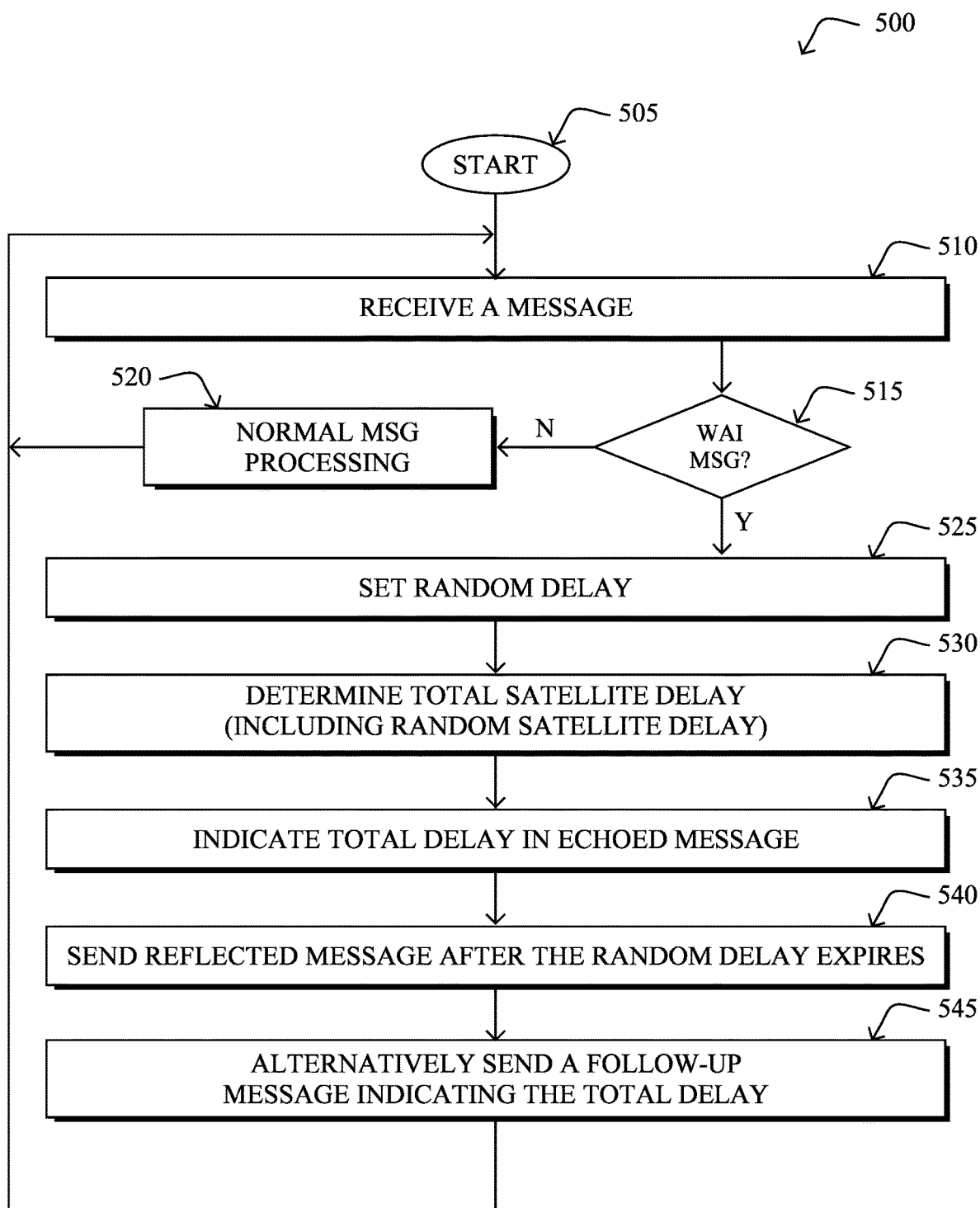
FIG. 5 illustrates an example of satellite operation in accordance with one or more embodiments herein.

Further, FIG. 5 illustrates the operations 500 of the satellite when it receives a WAI message. In particular, after starting in step 505, a satellite receives a message in step 510, and determines in step 515 whether the message is a WAI message. If not, then in step 520 the satellite proceeds with normal message processing. However, if it is a WAI message, then in step 525 the satellite may, in certain embodiments, set a random delay (or specified delay) in step 525. In step 530, the satellite determines its total delay, including any set or random satellite delay. In step 535, the satellite indicates its total delay in an echoed message sent in step 540 (after the delay expires), or alternatively, in step 545, sends a follow-up message indicating the total delay. The procedure then returns to step 510 to receives a next message.

Notably, in an alternative embodiment, particularly where it is possible to have a synchronized clock between the mobile device and the satellite, the satellite 210 may be configured to process and return the time the initial WAI message was received at the satellite, the time of flight by the initial WAI message 320a, or may process and return the actual the distance between the mobile device 230 and satellite 210 based on the determined time of flight. For instance, in these certain embodiments, the initial WAI message 320a may be marked by the transmitting mobile device with the time of transmission, such that the satellite can then perform the processing without needing to account for the delay at the satellite. Generally, while these embodiments simplify the elimination of delay from the total round trip flight time of the echoed messages, they do require synchronized clocks. There are various methods that may be used to synchronize clocks as understood by those skilled in the art, including maintaining synchronicity through the use of atomic clocks, as well as others described herein.

Those skilled in the art will recognize that while the discussion above and the drawings do not explicitly show the communication link between the satellites and a ground station (for the sake of simplifying the description), the present disclosure also contemplates the scenarios where the process of echoing of the WAI messages includes having the satellites send the WAI message to the ground station, and the ground station echoing the message (including the processing time in the ground station) back to the satellite, which promptly forwards the echoed message to the mobile device.

Figure 6:
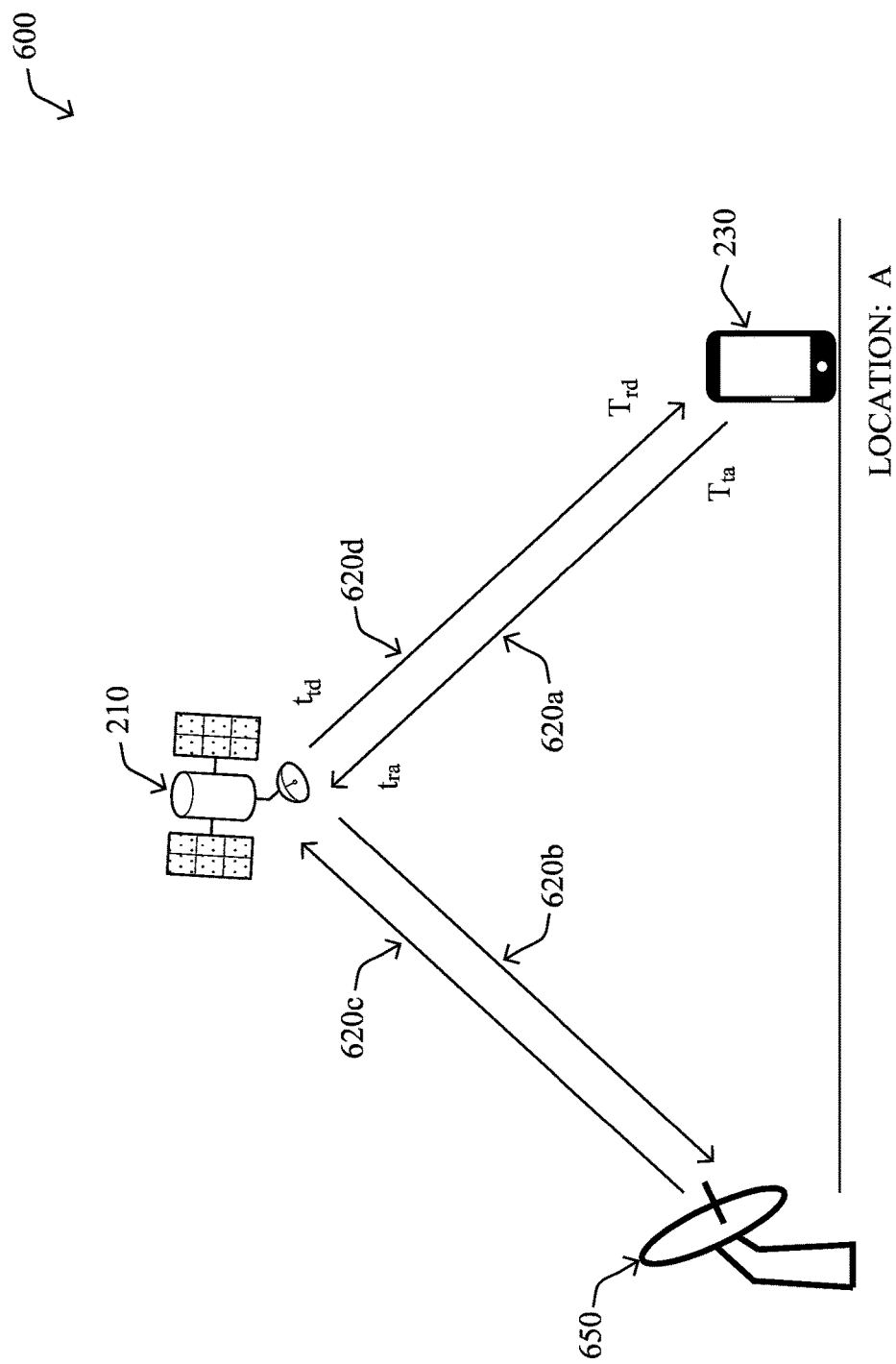
FIG. 6 illustrates an example of a WAI message system incorporating the use of a ground station in accordance with one or more embodiments herein.

FIG. 6 illustrates an environment where a ground station 650 (or "teleport") is involved in the communication path of the locating messages (e.g., WAI messages 320), referenced here as messages 620, generally. That is, according to one or more embodiments herein, the WAI message may be reflected by the satellites 210 to an associated ground station 650 for processing. For instance, rather than using the satellite to echo the WAI message as detailed above, the satellite 210 may receive an initial message 620a from the mobile device 230, and may then forward the message (including the time delay through the satellite), now message 620b, towards a ground station 650 as a relayed message. The ground station may then echo the WAI message (including the associated satellite delay) in return, message 620c, to the mobile device 230 while including (in a special field) the delay in the processing and transmission via the ground station. The WAI echoing then passes via the same satellite (which adds yet another satellite delay field to its relayed message 620d) towards the mobile device.

Factoring in a known or determined distance between the satellite 210 and the ground station 650, the mobile device may then use the various delays (first and second satellite delays and the ground station delay) to determine the relative distance between its location and the respective satellite in a number of manners. For instance, a total round trip flight time may first be determined:

Round trip flight time=(round trip time−first and second satellite processing times−ground station processing time)    Eq. 2.

The equation above (Eq. 2), however, still contains the time/distance between the ground station 650 and the satellite 210. To remove the time/distance between the ground station 650 and the satellite 210 from the round trip flight time, a number of options may be implemented:

Option 2a, using the equation above:

One way flight time (mobile device to satellite)= (Round trip flight time)/2−(Ground station to OR from satellite time)    Eq. 2a;

Option 2b, again using the equation above:

One way flight time (mobile device to satellite)= (Round trip flight time−Ground station to AND from satellite time)/2    Eq. 2b;

Option 2c, after converting (round trip flight time)/2 into a total distance:

One way distance (mobile device to satellite)=(Total distance−Ground station to satellite distance)    Eq. 2c.

Said differently, in option 2a, the one way travel time is determined between the mobile device 230 and the ground station 650, and then the one way time between the ground station and the satellite 210 is removed from the result (i.e., subtracted from the total distance). Alternatively, in option 2b, the round trip time between the ground station and the satellite is removed/subtracted from the total round trip time, and then the one way travel time is determined between the mobile device and the satellite based on the remaining time. Alternatively still, in option 2c, once the round trip flight time is converted into a one-way total distance between the mobile device and the ground station, then the actual distance between the ground station and the satellite may be removed/subtracted, resulting in the remaining distance between the mobile device and the satellite. (Still other methods for calculating the distance between the mobile device 230 and the satellite 210 may be conceived, and the methods discussed herein are not meant to be limiting to the scope of the present disclosure.)

It should be noted that while the above discussion assumes the notion of calculating the processing time (delay) in the satellite and/or the ground station similar to the discussion above with reference to FIG. 3, the present disclosure again also covers the case wherein the delay is set/configured in both of these network nodes (the satellite 210 and the ground station 650), and the nodes ensure that the WAI echo message is sent back toward the originating mobile terminal at exactly the expiration of the configured delay as explained above.

Note also that the time/distance between the ground station 650 and the satellite 210 may be known by the ground station (e.g., through its own calculations), and may be shared with the mobile device 230 either at the time of the WAI messages 620 (e.g., in a special field), or else in advance, such as part of a general configuration parameter (which may be updated as needed). Alternatively, the mobile device may be able to determine the time of travel based on time stamps of receipt and transmission of the messages 620b and 620c. In one embodiment, each device in FIG. 6 is time synchronized, while in another embodiment, only the ground station and satellite are time synchronized to allow for determination of the transmit and receive differential.

In still a further self-clocked embodiment, not requiring time synchronization between any of the devices or any knowledge of the distance between the ground station 650 and the satellite 210, the embodiments herein may employ the use of satellite time stamping to remove the portion of the WAI message's journey between the ground station and the satellite. In particular, if the satellite can be configured to return timestamps of its receipt of the initial message 620a as well as of the transmission of the return message 620d, the mobile terminal need not account for any delays or distances due to the satellite and/or ground station. For instance, assume that the mobile device 230 transmits message 620a at time "$T_{ta}$" and receives message 620d and time "$T_{rd}$", where times "T" at the mobile device are self-clocked. The satellite 210, notably not needing to be time synchronized with the mobile device (e.g., satellite times "t"), can mark the message 620d, or can send a follow up message (as mentioned above), with the timestamps of its receipt of message 620a (time "$t_{ra}$") and transmission of message 620d (time "$t_{td}$"). With this information, the mobile device may then isolate the time of travel between itself and the satellite as follows:

$$\text{Round trip time} = T_{rd} - T_{ta} \quad \text{Eq. 3a;}$$

$$\text{Additional time} = t_{td} - t_{ra} \quad \text{Eq. 3b;}$$

$$\text{One way flight time} = (\text{round trip time} - \text{additional time})/2 \quad \text{Eq. 3c.}$$

The additional flight time, in particular, accounts for the first and second satellite delays, the ground station delay, and both flight times between the satellite and the ground station. Note that as an alternative, the satellite itself, if so configured, may also share the calculated time differential $t_{td} - t_{ra}$ rather than the individual timestamps, saving the mobile device from having to compute the difference.

Notably, while certain equations are shown and described herein for isolating the portion of a communication path that is between the communication satellite and a particular target device (i.e., a single pass of that portion), the techniques herein may be based at any point on distances, times of flight, phases, times of arrival, and so on, and the order of intermediate calculations between initial measurements and final solutions may involve many different permutations. For example, one embodiment may divide time in half and then convert the remaining time into a distance, while another embodiment may convert the time into a distance, and may then divide the distance in half. Many other options may be available, and those shown herein are merely examples that may be adjusted as desired for particular configurations as will be appreciated by those skilled in the art.

The discussion above has thus far addressed the distance between the mobile device 230 and a single satellite 210, and those skilled in the art will appreciate that trilateration requires at least three distances (preferably four or more) to known points in order to determine the location (Location "A") of the mobile device. Though the singular distance alone may be beneficial for different embodiments, certain embodiments herein may specifically provide an estimated location based on trilateration by using a plurality of estimated distances between various satellites and the mobile terminal, accordingly. In general, the plurality of satellites and distances used may be based on the same locating system/technology (e.g., all being based on WAI messages as described above), or in certain embodiments, the techniques may use a "split system" configuration, such as through using two GNSS-based distances to GNSS satellites 110 (e.g., GPS satellites), and a third distance determined from a WAI message to a GEO/LEO satellite 210 above, and so on.

Specifically, in accordance with one or more aspects of the techniques herein, various embodiments are available through the present disclosure for achieving the plurality of distances (to a plurality of satellites) for use with trilateration and locating of the mobile device.

Figure 7:
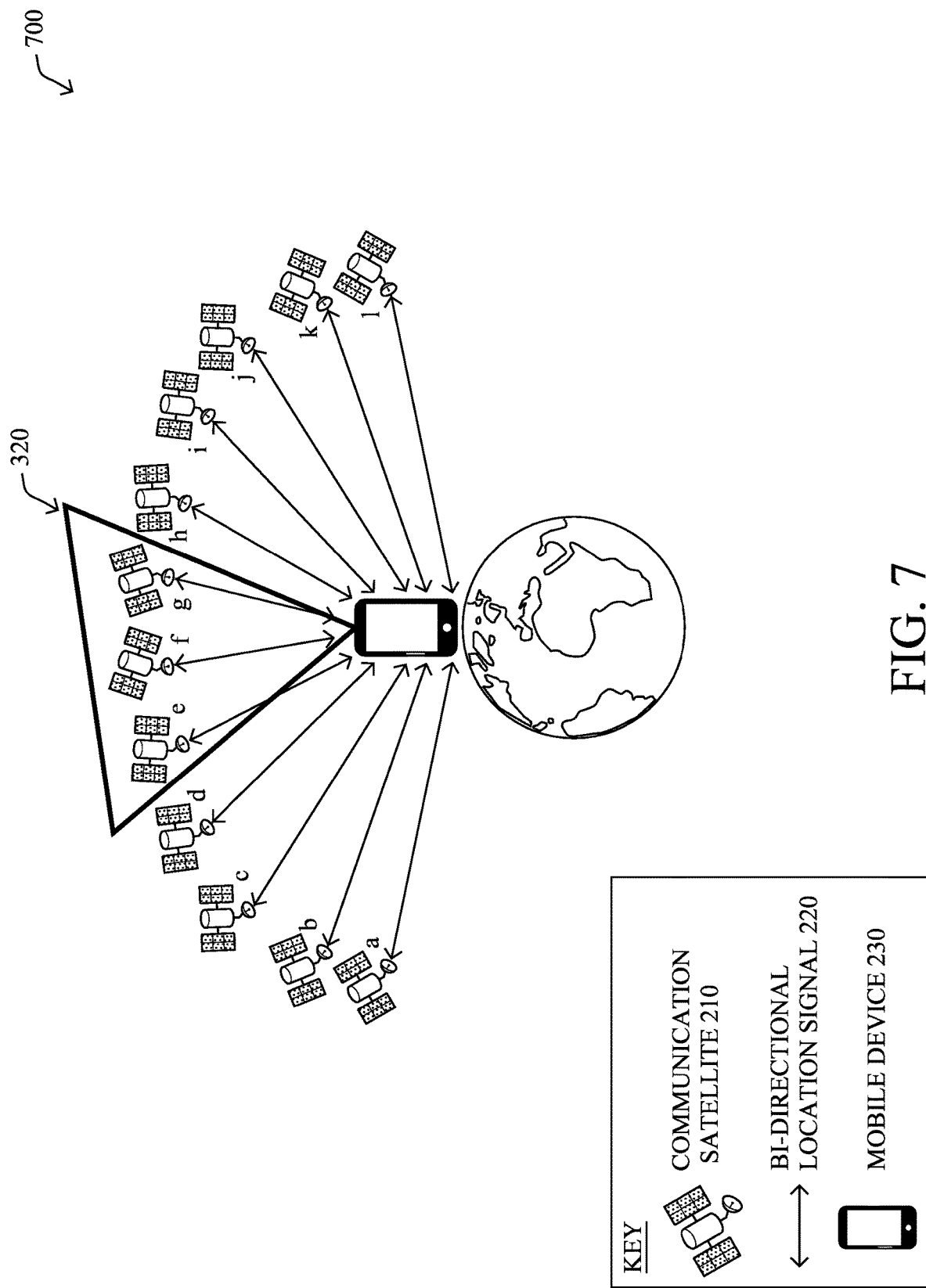
FIG. 7 illustrates an example of a single WAI message system reaching multiple satellites in accordance with one or more embodiments herein.

In a first embodiment, as discussed with reference to environment 700 of FIG. 7, a single message (e.g., WAI message 320/620) may result in a plurality of satellite distances. In particular, as shown, the mobile device 230 may be able to transmit a single message 320 which is received and acted upon by multiple satellites 210 (e.g., 210e, 210f, and 210g) which are in close angular proximity, and as such are all within the transmission lobe of the antenna of the mobile device when the particular message is sent. In this manner, the mobile device may receive echo messages from the three or more satellites required for trilateration. Said differently, despite the use of a directional satellite antenna on the mobile device, the lobe of the antenna (the cone of transmission) still extends outwards as a signal is transmitted into space, thus the radiated power sent from the mobile device toward one intended satellite may result in the signal also being received by satellites operating at orbital positions adjacent to the intended satellite. This phenomenon is often referred to as "adjacent satellite interference" (ASI) or ASI spillover, and though typically something to avoid, the techniques herein may take advantage of this ASI spillover to intentionally reach multiple satellites at once, and to trigger multiple echo replies, accordingly (e.g., by sending a single signal aimed at satellite 210f, and receiving echo replies from satellites 210e, 210f, and 210g).

Notably, when the system uses a single transmission of WAI message and multiple echoed signals from multiple satellites (FIG. 7 above), there is a risk that the echoed messages from different satellites would interfere with each other. To this end, each satellite may introduce a short random delay before it echoes the signal back to the mobile device. Since the length of delay is indicated in the satellite processing time, which is conveyed by the satellite to the device, this random delay is accounted for in the equations above. Using multiple satellites in close angular proximity may increase a dilution of precision, or geometric dilution of precision (GDOP).

Figure 8:
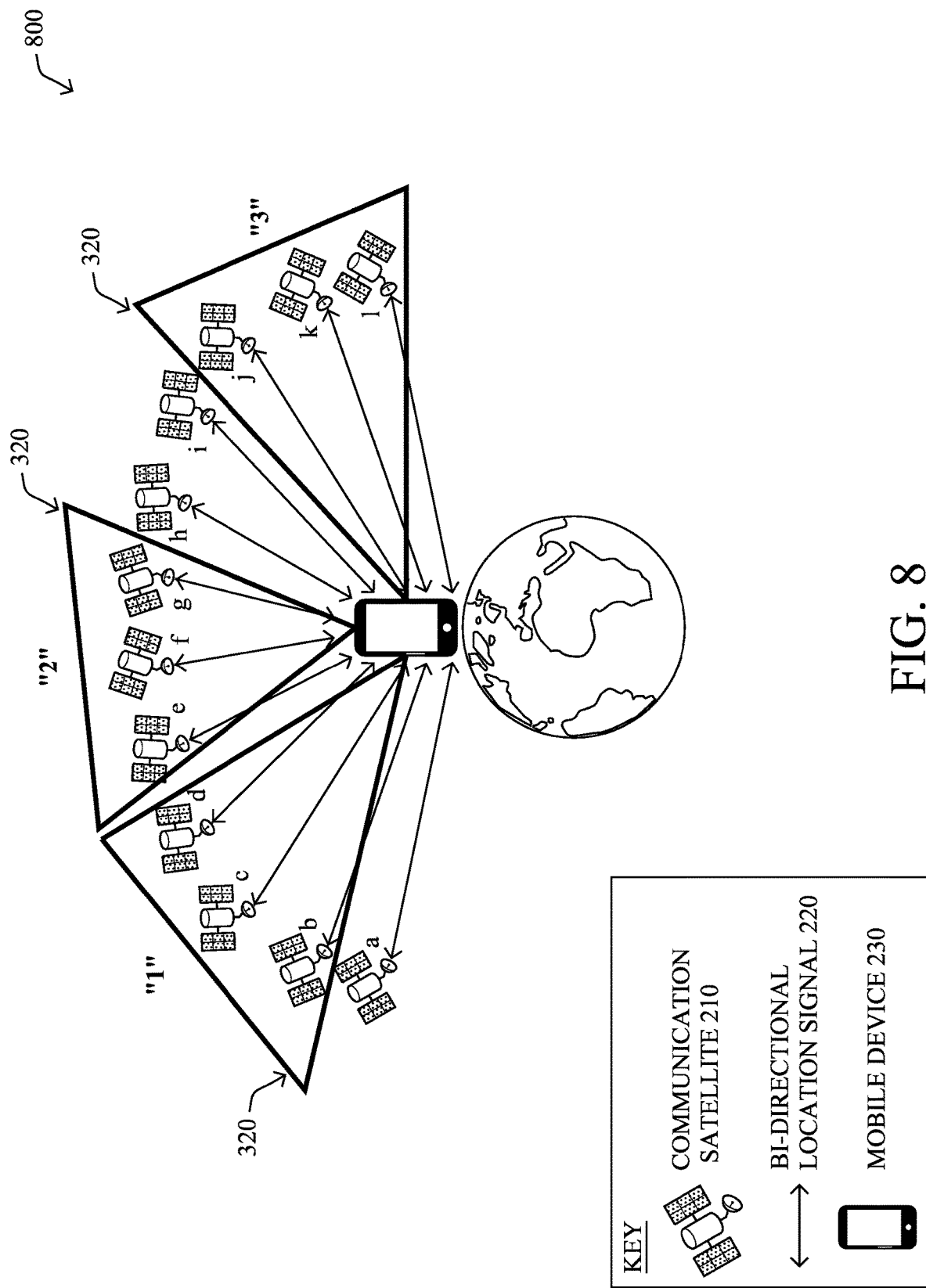
FIG. 8 illustrates an example of a system with multiple WAI messages to multiple satellites in accordance with one or more embodiments herein.

Environment 800 of FIG. 8, on the other hand, illustrates another example embodiment designed to reduce the GDOP in which the mobile device changes the direction it aims/points each time it transmits a WAI message 320 in order to reach a diverse distribution of satellites (e.g., WAI messages "1", "2", and "3", in any order, aimed toward satellites 210c, 210f, and 210k, respectively). In this manner, the mobile device 230 may receive a response from a plurality of communication satellites (e.g., in certain embodiments, from their respective ground stations) that offer greater angular diversity and as such reduce the GDOP error.

Note that the same ASI spillover principle may apply in this embodiment as well, possibly reaching an even greater number of echoing satellites (e.g., satellites 210b, 210c, and 210d for message "1", satellites 210e, 210f, and 210g for message "2", and satellites 210j, 210k, and 210l for message "3") for even greater location computation accuracy. Said differently, the present disclosure also contemplates the case where the system operates in a hybrid mode, wherein the location estimation is performed based on multiple WAI messages sent in different directions towards different groups of satellites, and for each transmitted WAI message, multiple reflected/echoed messages are received and processed.

Figure 9A:
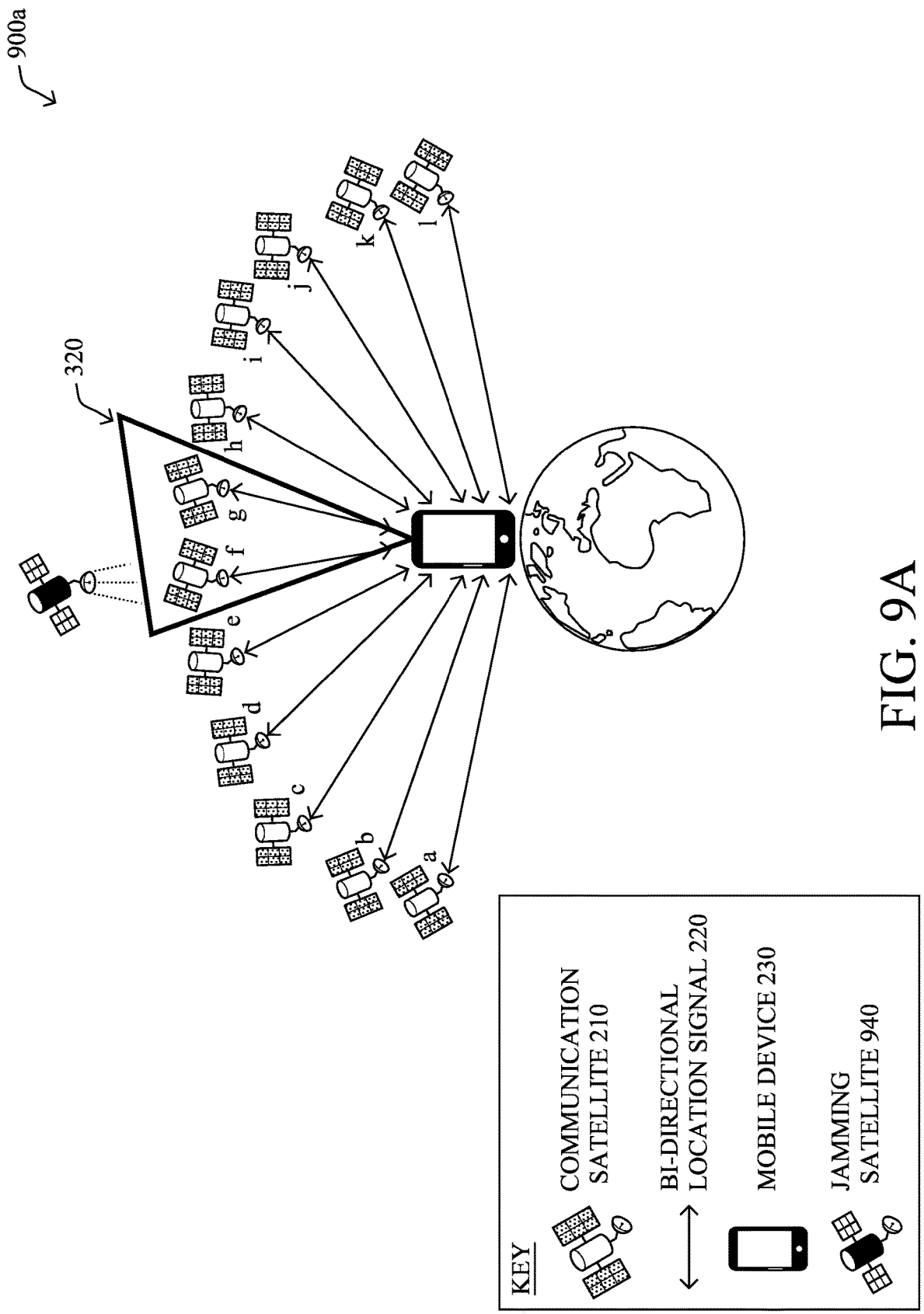
FIG. 9A illustrates an example of a single WAI message and a jamming satellite in accordance with one or more embodiments herein.

Generally, there are two main disadvantages for a system which determines the location of a mobile device based on a single WAI message reflected from multiple satellites (e.g., as in environment 700 above). First, because the echoing satellites are in close angular proximity (e.g., satellites 210e, 210f, and 210g), a small error in determining the time of flight of any radio signal translates to a large location error. Second, the narrow angle direction from which the satellite operates can be jammed and prevent the location determination from operating properly. For example, the environment 900a of FIG. 9A illustrates how a single WAI message 320 may still be jammed by a single jamming satellite 940 (or other jamming source, such as a lower flying plane, drone, etc., which for sake of simplifying the drawing are not shown in the figures). (More details on detecting and mitigating jamming and spoofing are described in particular below.)

Figure 9B:
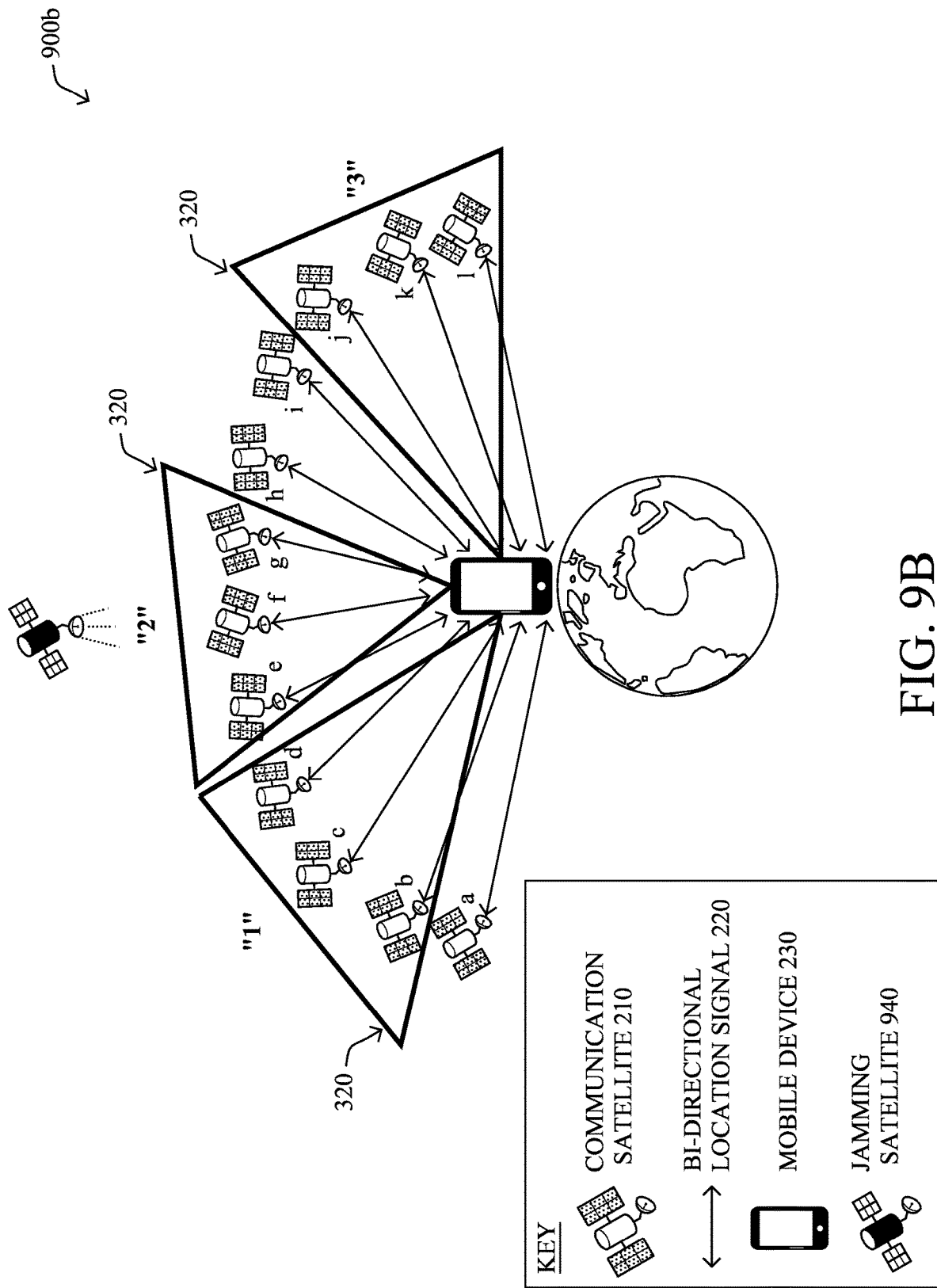
FIG. 9B illustrates an example of a system with multiple WAI messages and a jamming satellite in accordance with one or more embodiments herein.

In contrast, a system wherein the mobile device changes the direction of the antenna after completing processing of the WAI message reflected from one direction and sending the next WAI message to a different direction, such as that shown above in FIG. 8, avoids these two pitfalls. As illustrated in the environment 900b of FIG. 9B, for instance, while some of the WAI echoed messages may be jammed (e.g., WAI messages "2" from satellites 210e, 210f, and 210g), other directional transmissions may continue to echo, uninterrupted, and the WAI messages (e.g., "1" and "3") can thus still facilitate a location determination (e.g., satellites 210b, 210c, and 210d from unjammed message "1" and satellites 210j, 210k, and 210l from unjammed message "3"). Also, the fact that the direction to the various satellites has greater angular diversity ensures lower sensitivity of the location determination to small errors in the radio flight time estimations and a reduced GDOP.

Figure 10:
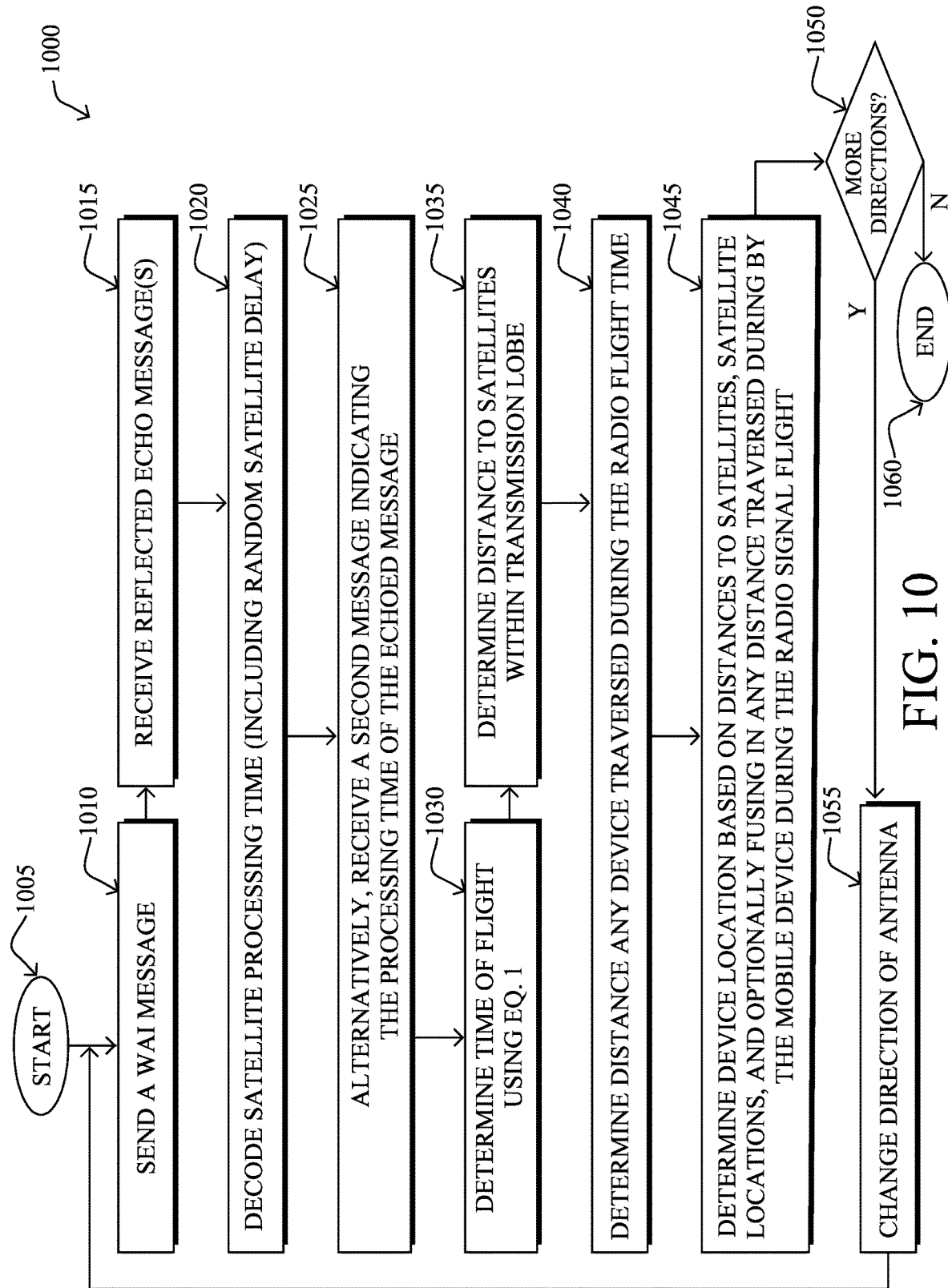
FIG. 10 illustrates an example of determining a location based on sending WAI messages in multiple directions in accordance with one or more embodiments herein.

FIG. 10 illustrates an example flowchart 1000 for a device that determines its location based on sending WAI messages in multiple directions. The flowchart starts in step 1005, and continues to step 1010 where the device sends a WAI message, and then receives reflected echo message(s) in step 1015. In step 1020, the device decodes satellite processing time (including random satellite delay), or else in step 1025 alternatively receives a second message indicating the processing time of the echoed message. Accordingly, in step 1030, the device determines time of flight using Eq. 1 above, and can thus determine its distance to satellites within the transmission lobe of the original WAI message in step 1035. (Alternatively, computations may also be made based on the signals traversing a ground station, as described above.)

As described in greater detail below, in step 1040 the device may also determine any distance it traversed during the radio flight time, and can then determine the device location in step 1045 based on distances to the satellites, satellite locations, and fusing in any distance traversed during by the mobile device during the radio signal flight.

As described above, operation/step 1045 may be repeated multiple times, each one adding a distance to another satellite to the geolocation computation, and as such improving the accuracy of the estimated location of the mobile device. Therefore, if in step 1050 there are more directions to transmit a WAI message (more satellites, more frequencies, more angles of transmission, etc.), then in step 1055 the device can cause a change of direction of the device's satellite antenna (e.g., directing a user to a new aimed position, moving motors/gimbals, etc.), and the procedure performs another echo message, accordingly. In particular, in accordance with this embodiment, once a reply for the WAI message is received from the first satellite, the antenna of the mobile terminal may be pointed at a second satellite and the process described above repeats resulting in an estimation of the mobile terminal in relationship to the second satellite. The process may repeat numerous times each time pointing the antenna of the mobile device at a different satellite and obtaining the estimated position in relationship to that satellite. The system then uses trilateration to provide an estimated location based on all of the estimated distances between the various satellites and the mobile terminal.

Once there are no further directions/transmissions in step 1050, then the example procedure ends in step 1060.

In accordance with still another embodiment herein, the system may use LEO satellites or any other appropriate satellite that supports satellite-to-satellite communication. Using this system, rather than moving and pointing the antenna at different directions towards different satellites, the techniques herein may take advantage of the side-lobes of the mobile device antenna.

Figure 11:
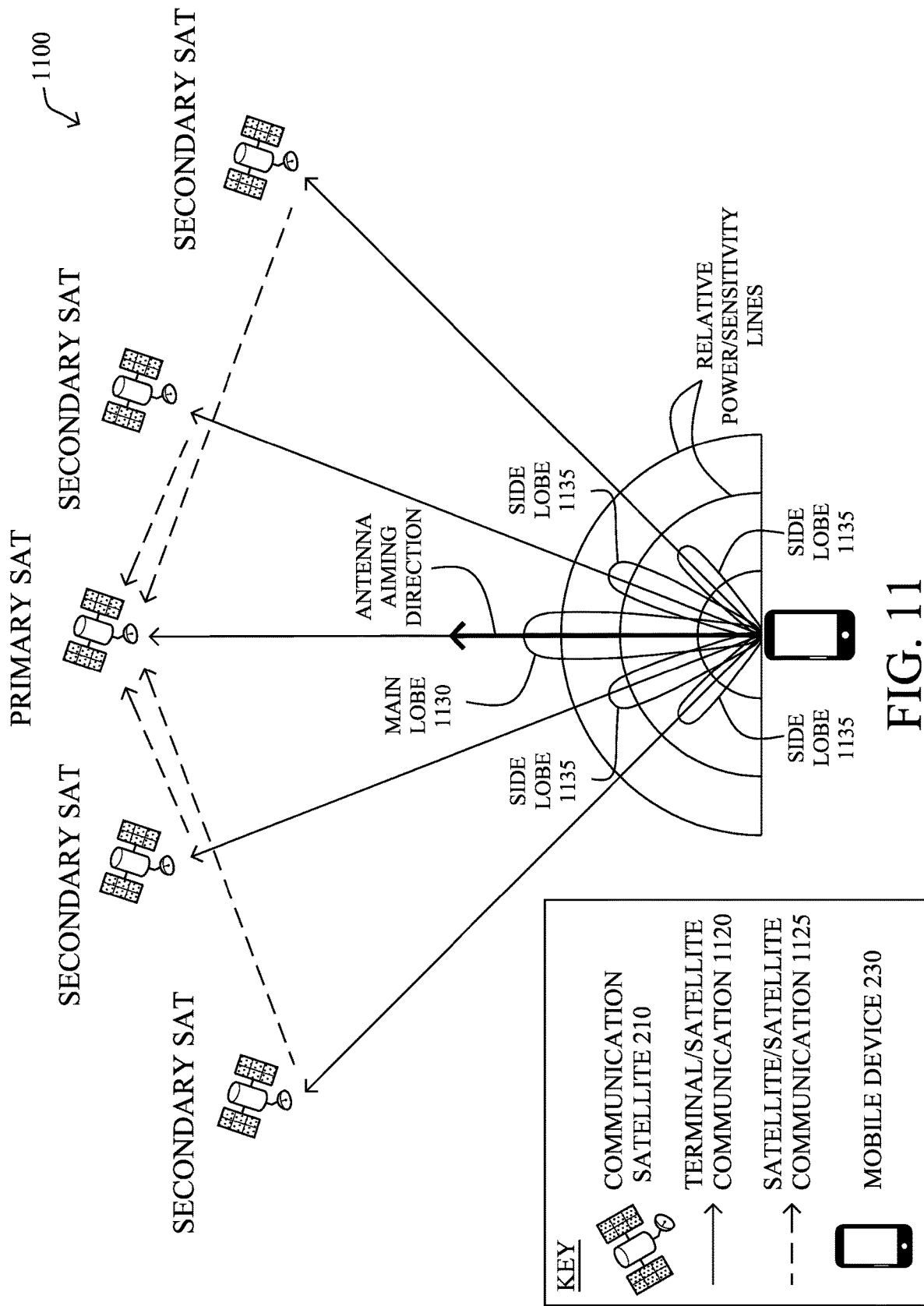
FIG. 11 illustrates an example of a satellite-to-satellite generated echo message in accordance with one or more embodiments herein.

For instance, referring to environment 1100 of FIG. 11, as the mobile device 230 transmits a message as a terminal/satellite communication 1120 towards its primary satellite ("primary sat") (the satellite to which its antenna points with its main lobe 1130), a much weaker signal of the message is received also by secondary satellites (secondary sat) via the energy leak through the mobile device's antenna side-lobes 1135. The primary satellite can easily detect the strong transmitted message. The secondary satellites have highly sensitivity receivers that enable them to detect the much weaker signals of the transmitted message. However, it may not be practical for the secondary satellites to send echo messages directly back to the mobile terminal as the mobile terminal's less sensitive receiver would not be able to detect these echoed/returned messages that would correspondingly be received via the mobile terminal's side-lobes.

To overcome this issue, particularly when time synchronization between the mobile device 230 and the communication satellites 210 is available, the secondary satellites may utilize satellite-to-satellite communication 1125, such that upon reception of a WAI message (with a timestamped transmission time) may forward their received WAI message to the primary satellite (with a timestamp of the secondary satellite's reception time), which then forwards the echoed WAI message to the mobile terminal. Each echoed WAI message includes a field that identifies the ID of the satellite that echoed/forwarded the WAI echo message.

As explained above, in accordance with one embodiment, each intermediate node/satellite that echoes the WAI message (even if relayed through the primary satellite) adds a field to the message that identifies the delay added by the node, including the primary satellite adding additional delay for the relayed message processing. In accordance with an alternative embodiment, the delay is fixed and each node makes sure that it transmits the echoed WAI message exactly at the time that adheres to the pre-configured delay. However, given the fact that the primary satellite needs to send multiple WAI echoed messages to the mobile terminal (its own WAI echoed message as well as multiple WAI echoed messages from multiple secondary satellites), the primary satellite may add a field that describes the integer number of fixed delays used in forwarding a WAI echo message by the primary satellite (from a specific secondary satellite). For example, the primary satellite may send its own WAI echo message with a delay of 10 ms (e.g., indicating "1" in the special field of the message), send an echo message from a first secondary satellite with a delay of 20 ms (e.g., indicating "2" in the special field of the message), send an echo message from a second secondary satellite with a delay of 30 ms (e.g., indicating "3" in the special field of the message), etc.

Upon receiving the echoed messages from the primary satellite, the mobile device determines from the respective delays the distance between the mobile device and each one of the primary and secondary satellites and, based on knowing the locations of each one of the satellites (the IDs of the satellites being conveyed in their WAI echo messages), the mobile device determines its own location.

Again, as described above, those skilled in the art would recognize that for the sake of simplicity of the explanation above, the illustration of FIG. 11 (as well as the flowchart of FIG. 12 below) do not include any communication between the satellite and the ground station, which in some embodiments is an integral part of the overall system. That is, while in some embodiments the satellite may repeat the message directly to the mobile device, other embodiments may require the satellites to forward the message to a corresponding ground station, which then returns the echo message, via the satellite, to the mobile device. Accordingly, while the description herein may simplify this communication to merely "the satellite" performing an operation, those skilled in the art will appreciate that such satellite operation may, in certain embodiments, involve a corresponding ground station. Moreover, when satellite communication does involve ground stations, each satellite may communicate with its own respective ground station, and as such, those multiple ground stations would then establish a connection with each other and would exchange the information required to facilitate the techniques herein (e.g., in this example, returning of the echo messages). In such instances where multiple ground stations are involved, one particular ground station may be selected as a "primary" or "master" ground station, for example, being associated with the primary satellite above, or determined through other selection criteria.

Figure 12:
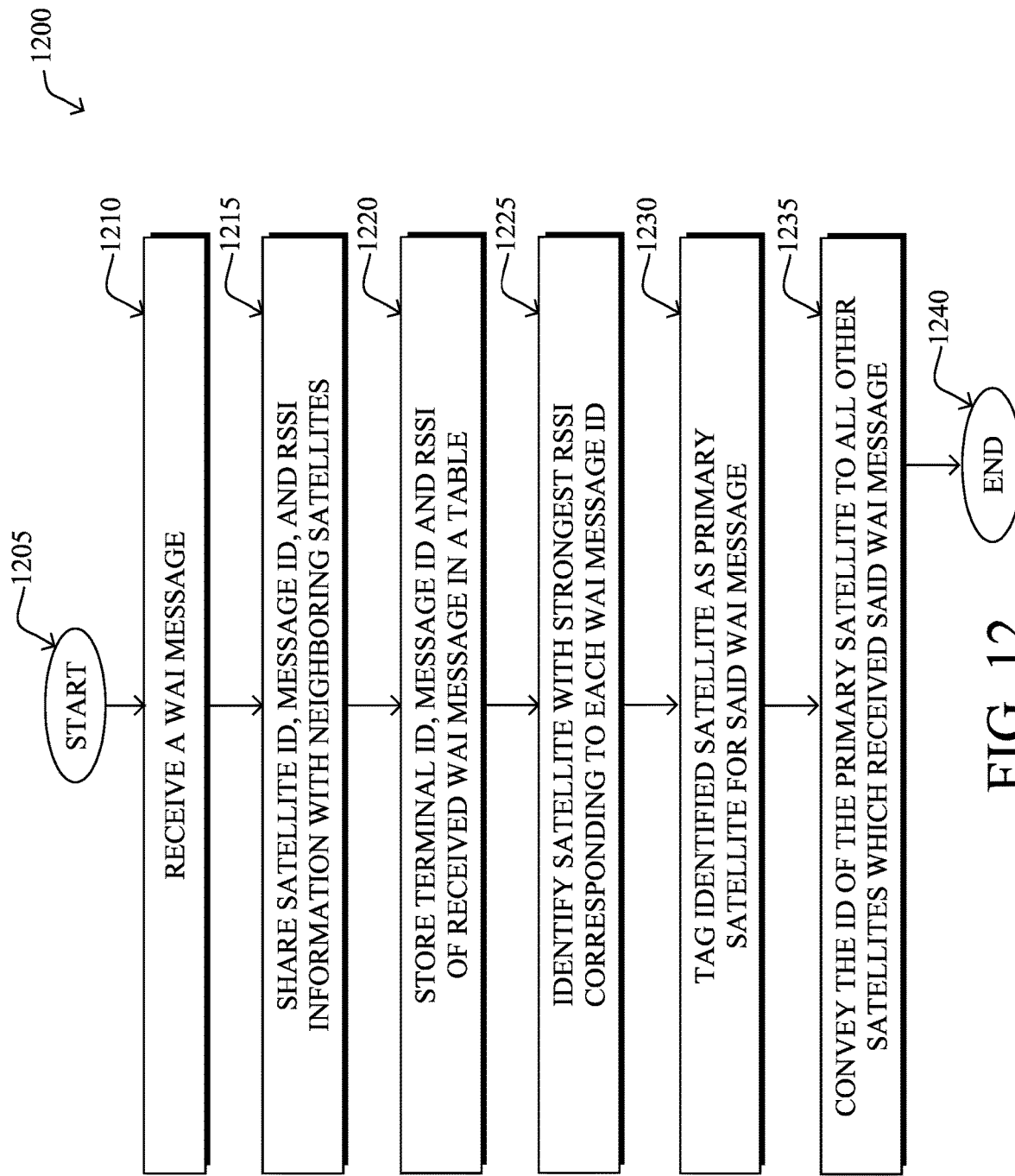
FIG. 12 illustrates an example of selection of a primary satellite for satellite-to-satellite generated echo messages in accordance with one or more embodiments herein.

Referring now to FIG. 12, a process 1200 for the receiving satellites to determine the primary satellite is illustrated. Starting in step 1205, when a satellite receives a WAI message (step 1210), it conveys the ID and the received signal strength indication (RSSI) of the received WAI message to the satellites in its neighborhood (step 1215). In accordance with an example embodiment, the messages are sent to the ground station where the processing and comparison takes place. In step 1220, each satellite (or the ground station) creates a table indicating the originating terminal ID, the WAI message ID, the RSSI associated with the message it received, as well as the IDs of the other satellites that received the same WAI message and the corresponding RSSI associated with the reception of the WAI message by the other satellite. The satellite with the strongest RSSI (determined in step 1225) is selected and tagged to be the primary satellite for that specific WAI message (step 1230) and the other satellites are tagged as secondary satellites. This information may be shared between the satellites, accordingly (step 1235), and the procedure ends in step 1240.

Figure 13:
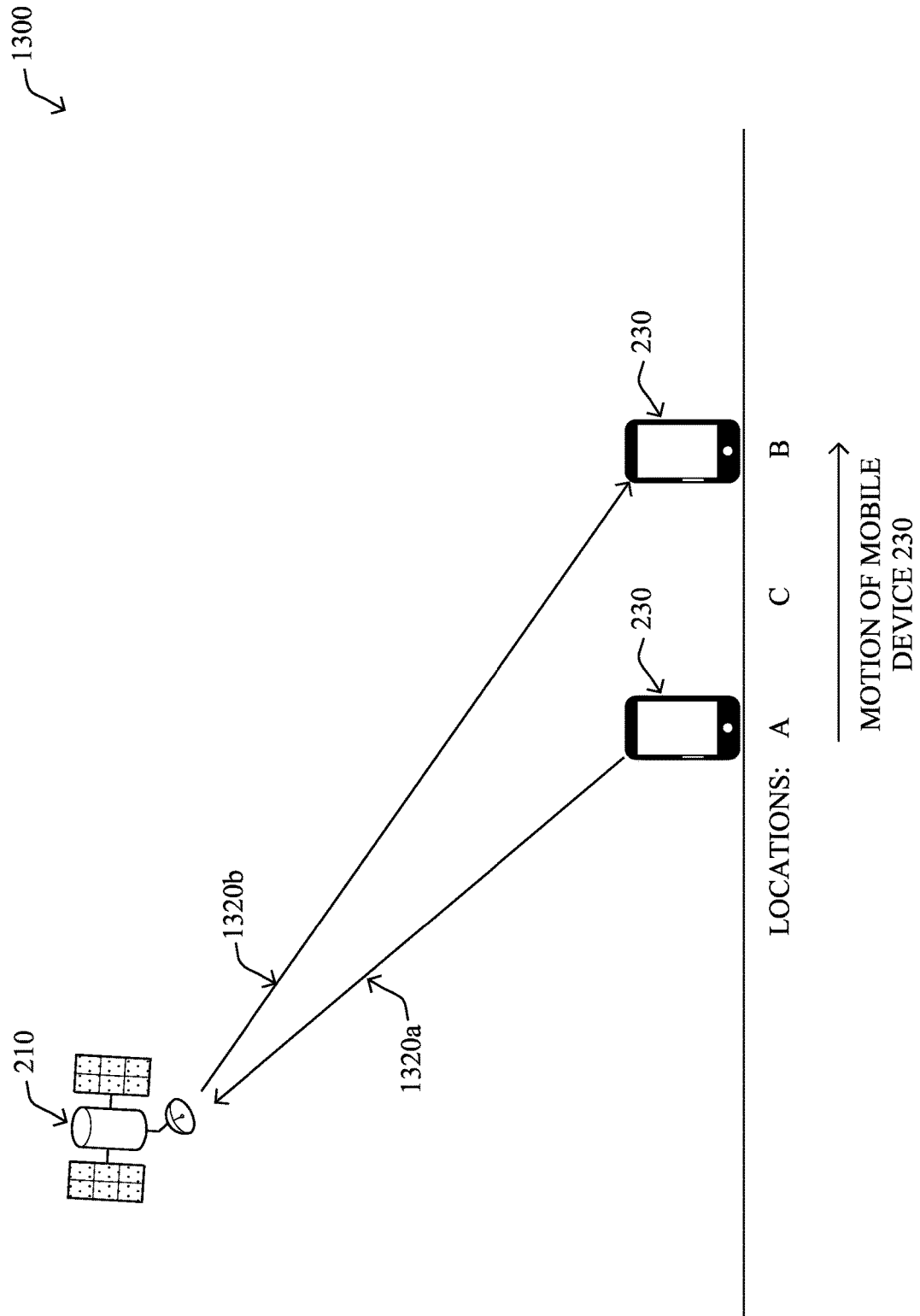
FIG. 13 illustrates an example of motion distance fusion in accordance with one or more embodiments herein.

Regarding the aforementioned compensation for movement of the device during flight of the WAI messages, referring to example 1300 in FIG. 13, the mobile device 230 transmits a WAI message 1320a from a first location "A" towards a communication satellite 210. While the radio message is in flight, the mobile device moves from location "A" to location "B" (not drawn to scale). When the mobile device arrives at location "B" it receives the echoed signal 1320b from the satellite.

Using equation Eq. 1 above, namely dividing the round trip time, less any satellite processing time, in half to determine the one-way flight time, the mobile device would calculate an average location (location "C"). When the mobile device is still (not in motion), location "A", "B", and "C" are the same, and the calculated location reflects the actual location of the device. However, when the device is in motion, equation Eq. 1 reflects a location which is the average between locations "A" and "B" due to their lengths of flight time (to the satellite and from the satellite) being different and averaged. To determine the exact location of the device when it receives the echoed WAI message, one or more embodiments of the system herein may fuse (combine) the estimated traveled distance during the message flight time with the average location "C".

In particular, while the mobile device is in motion it may use an internal accelerometer or other mechanisms (e.g., speedometer) to determine its velocity and the distance it traveled during the total length of time starting at the time the WAI message was transmitted until the echoed message has been received. The direction (e.g., with respect to true north) that the mobile device is travelling can be, and often is, determined using a compass. Alternatively the direction in which the device travels is inferred by drawing a line between the previously estimated location "C" and the currently estimated location "C". In either case, the system herein may thus add half of the estimated traveled distance to the currently estimated location "C" (in the vector space, not merely as a scalar). Specifically:

Estimated Location=Estimated location "C"+
0.5*Traveled distance  Eq. 4, where "traveled distance" is a vector of distance in the direction of motion based on compass or estimated as:

Traveled direction=(Current estimated location−previous estimated location)/|Current estimated location−previous estimated location|  Eq. 5.

(Note that "||" refers to the absolute number operator above.)

In accordance with yet another embodiment herein, the estimated location can be calculated by adding the estimated traversed distance during the last half of the estimated traverse time of the WAI message to location "C".

In accordance with still another embodiment herein, particularly where the satellite and the mobile device are time synchronized, the satellite may timestamp the return message 1320b with the time of transmission, such that upon reception of the message at the mobile device at location "B", the time of flight, and thus distance calculation, between the satellite and the mobile device would be accurately determined for location "B". (Though this embodiment requires precise time synchronization, the benefits of being able to send a bidirectional WAI message on-demand (i.e., from a device and returned to the same device) still offers further benefits, as described herein.)

Figure 14:
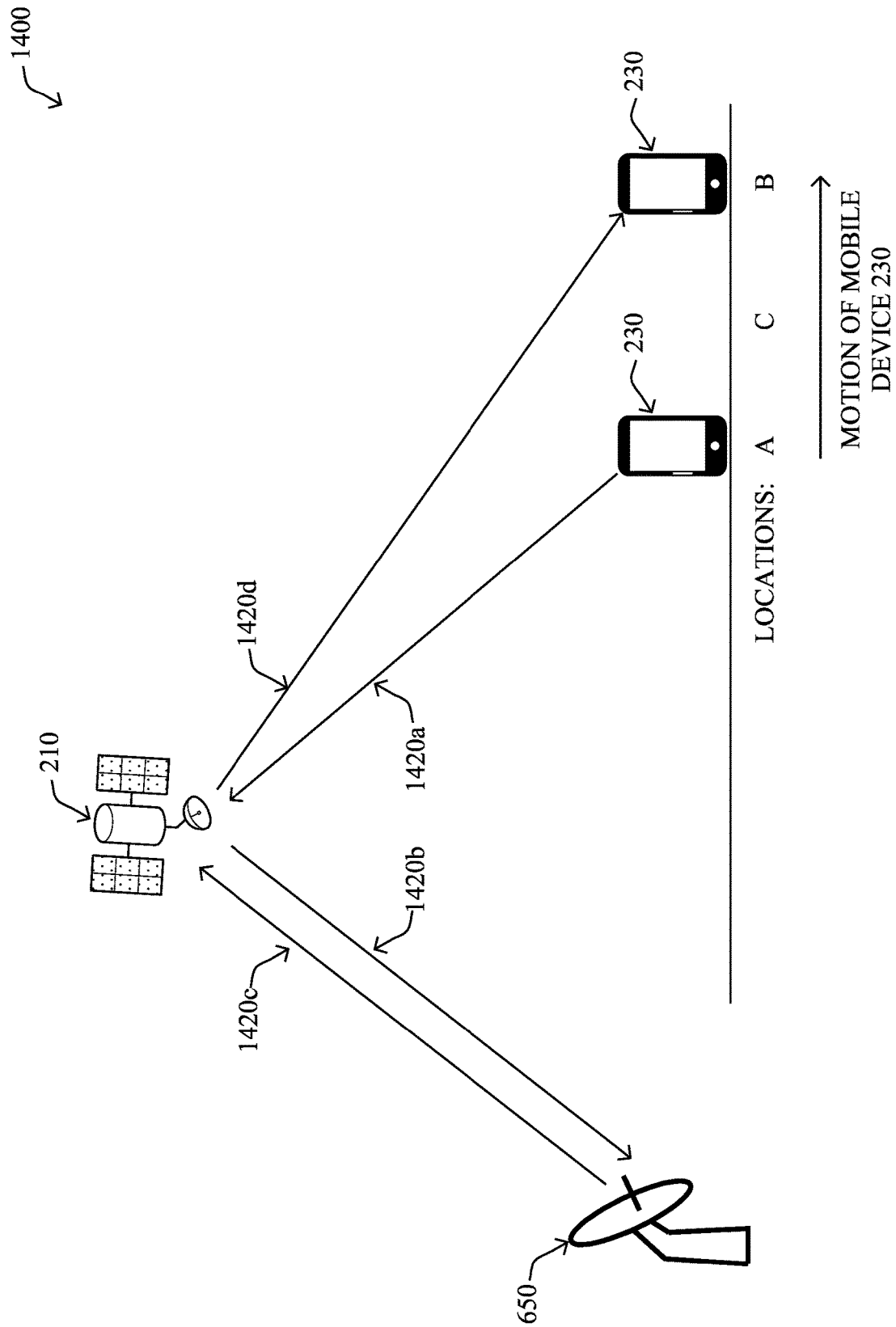
FIG. 14 illustrates another example of motion distance fusion through a ground station based echo message in accordance with one or more embodiments herein.

Example 1400 in FIG. 14 further demonstrates how the same techniques described above for FIG. 13 may also apply to embodiments employing a ground station 650, where the mobile device 230 transmits a WAI message 1420a from a first location "A" towards a communication satellite 210, and while the radio message is in flight through transmission of messages 1420b, 1420c, and then 1420d, the mobile device moves from location "A" to location "B", where it receives the echoed signal 1420d from the satellite. Since again the calculations above for static locations would result in an average computation of location "C", the techniques herein may again address this phenomenon by compensating with distance travelled during that time (e.g., adding half of the travelled distance to the location, once the delays and additional flight times from messages 1420b and 1420c are removed/subtracted from the total time/distance, as discussed in greater detail above).

Note also that where a single satellite is shown in examples 1300 and 1400 above, in multi-satellite location determinations (e.g., two or more satellites for trilateration), additional time may pass between a first range is calculated to a first satellite, and a second range is calculated to s second satellite. As such, the mobile device 230 may actually be in different locations at the time each particular locating message is transmitted and received. To account for such differences, the techniques herein may apply travelled distance compensation as described above to further refine the actual location of the mobile device, or may make additional measurements back to previous satellites to attempt to determine change over time to each particular satellite in order to deduce an approximate location at a given time.

Still further, it is important to note that the techniques herein may determine the speed at which a mobile device is travelling based on measuring successive locations and comparing the difference between the successive locations and the amount of time that passed since the last measurement.

FIGS. 15-20 illustrate alternative embodiments to the "where am I" message communication above that still utilize the bi-directional signaling capability between the mobile devices 230 and satellites 210 (and optionally ground stations 650).

Figure 15:
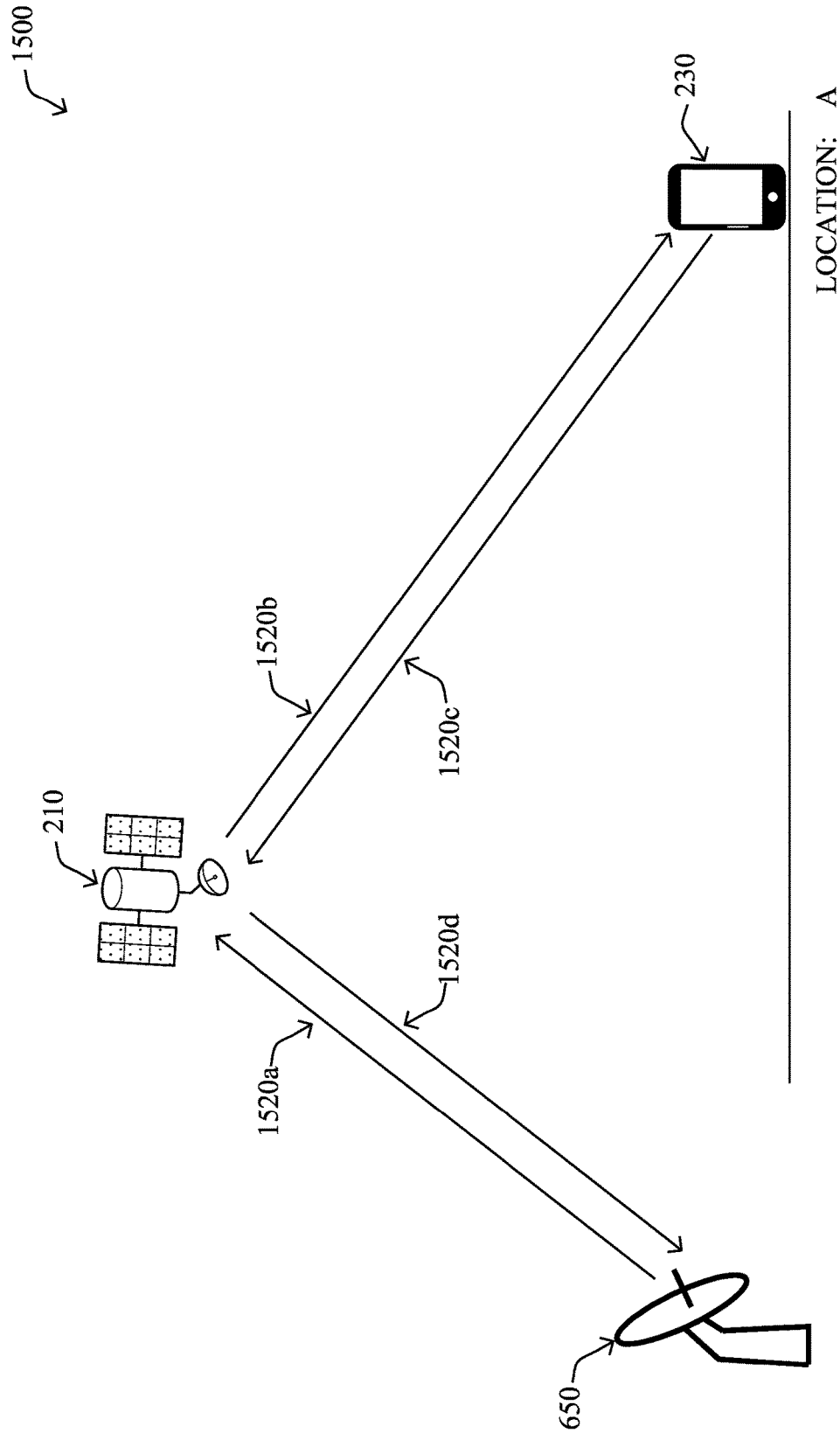
FIG. 15 illustrates an example of a "where are you" (WAY) message system in accordance with one or more embodiments herein.

In particular, FIG. 15 illustrates a first example alternative embodiment comprising a "where are you" (WAY) messaging configuration. In particular, as shown in environment 1500, the ground station 650 initiates the communication path of the locating messages (e.g., WAY messages 1520, generally). That is, in this embodiment, the ground station 650 may sent an initial message 1520a toward the mobile device 230 via satellite 210, and may then forward the message (including any time delay through the satellite), now message 1520b, towards the mobile device as a relayed message. The mobile device may then echo the WAY message (including the associated satellite delay) in return message 1520c toward the ground station while including (in a special field) the delay in the processing and transmission via the mobile device. The WAY echoing then passes via the same satellite (which adds yet another satellite delay field to its relayed message 1520d) towards the ground station.

Similarly to above for WAI messaging, by factoring in a known or determined distance between the satellite 210 and the ground station 650, the ground station may now use the various delays (first and second satellite delays and the mobile device delay) to determine the relative distance between the mobile device's location and the respective satellite in a number of manners similar to Eqs. 2, 2a, 2b, and 2c above.

Note that while the embodiment above has been described as determining the location of a mobile device based on the ground station initiating a WAY message (such that the ground station can determine the location of the mobile device), various triggers may cause the WAY message to be sent. For instance, though the ground station may desire to know the location of the mobile device without the mobile device needing to know its own location (e.g., for Internet of Things or "IoT" devices in the field, inventory tracking, etc.), the mobile device, instead, may initiate a locating request to the ground station to determine the mobile device location for itself (e.g., since the ground station may have greater computation power than the mobile device). In this scenario, the ground station is triggered to send a round trip WAY message to the mobile device, echoing back to the ground station, such that the location of the mobile device can be determined by the ground station. The estimated location may (though need not) then be sent back to the mobile device as a response to the original request message.

Figure 16:
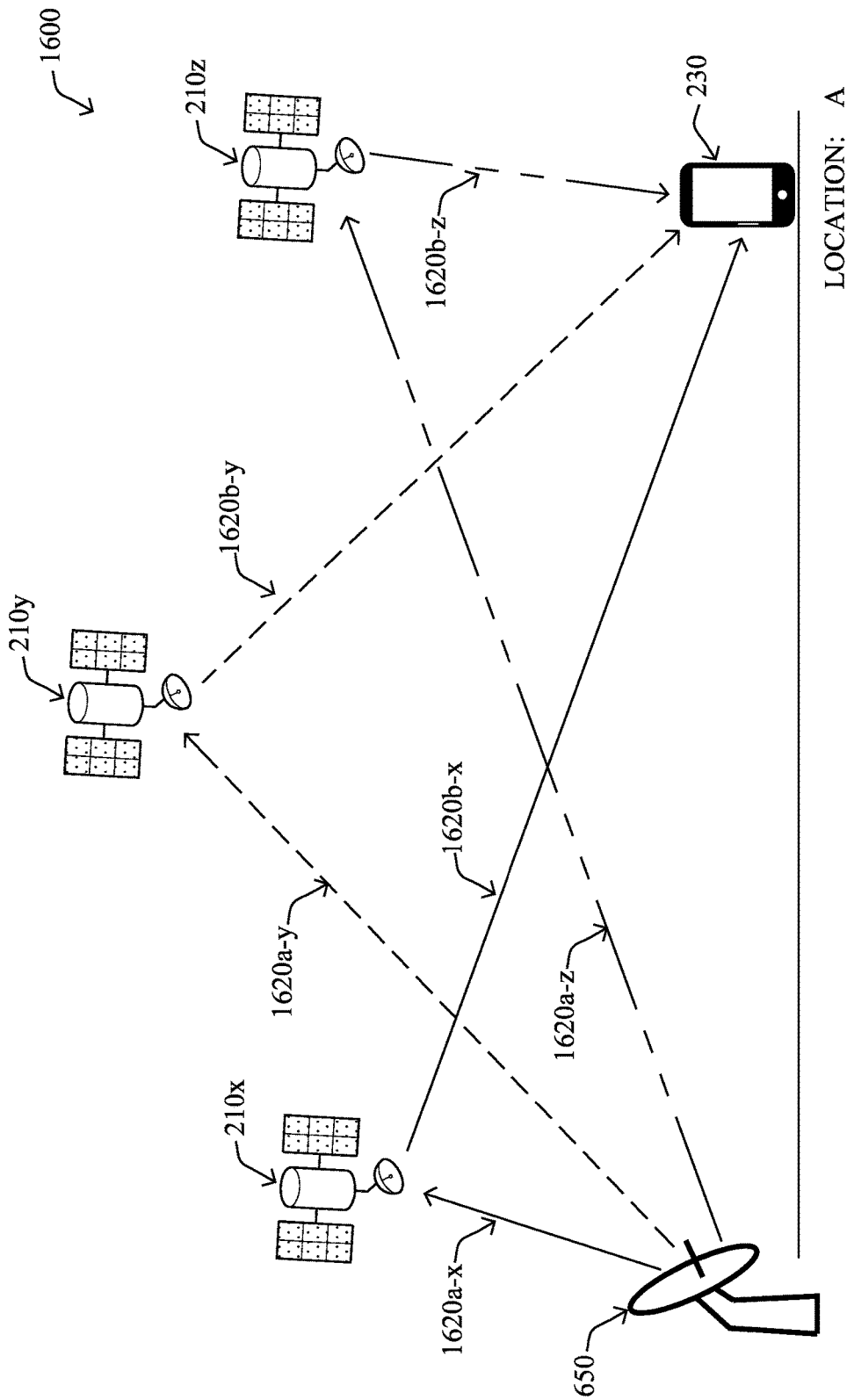
FIG. 16 illustrates an example of a trilateration for directional receiver antennas in accordance with one or more embodiments herein.

Additionally, it is important to mention that directional antennas found on many implementations of mobile devices would require that the mobile device be ready and able to return messages relayed through a satellite (i.e., aimed at the satellite in question and listening at the right time), increasingly difficult when a plurality of satellites are being used for trilateration. For instance, FIG. 16 provides another illustration of a trilateration environment 1600, in which the ground station 650 sends three sets of locating messages 1620 (e.g., WAY messages 1520 above) toward the mobile device 230 through three corresponding satellites, namely satellites 210x, 210y, and 210z. Specifically, a first message 1620a-x is sent from the ground station 650 toward satellite 210x, which then relays message 1620b-x to the mobile device 230. Then a second message 1620a-y is sent from the ground station toward satellite 210y, which then relays message 1620b-y to the mobile device. Finally, a third message 1620a-z is sent from the ground station toward satellite 210z, which relays message 1620b-z to the mobile device, completing the three messages needed for trilateration. (Note that with proper configuration and different antennas of the ground station pointing at different satellites, a single message 1620a may be transmitted from the ground station to reach each of the satellites 210x, 210y, and 210z for relaying of their respective 1620b messages (b-x, b-y, and b-z) toward the mobile device, accordingly.) Specifically according to the WAY message embodiment in FIG. 15 above, in particular, the mobile device 230 returns an echoed response for each of the three messages (not shown in FIG. 16 for clarity), such that the ground station may compute the location of the mobile device.

Note that when multiple satellites are used in any technique as mentioned herein, such satellite communication may correspondingly involve multiple ground stations as well (e.g., each satellite may communicate with its own respective ground station). According to one or more embodiments herein, therefore, such multiple ground stations may be configured to establish a connection with each other in order to exchange information required to facilitate the techniques herein (e.g., in this example, initiating echo messages with the mobile device, and then sharing determined times of flight or distances in order to determine a location of a target device). In such instances where multiple ground stations are involved, one particular ground station may be selected as a "primary" or "master" ground station, for example, being the one initiating the locating operation, or determined through other selection criteria.

Notably, as described below, the ability for a mobile device with a directional antenna to aim at different satellites rests in the ability to instruct a user to aim the device in the proper direction at specific times (and beneficially at different times in certain circumstances), or else to cause motors/gimbals of the device to aim the device as required. In environments where directional antennas are used, therefore, in order to address the difficulty in aiming the directional antenna in the correct direction and at the correct time, particularly the three or more correct directions at the three or more correct times for trilateration as demonstrated in FIG. 16, such embodiments herein may be based on either "configured coordination" or "opportunistic beaconing reception". (Note, too, that either of these embodiments may work for periodic operation of the mobile device, particularly for mobile users who inquire about their location sporadically or for IoT devices that conserve energy or other devices that do not operate in "receive mode" consistently.)

Configured coordination, for instance, may be based in one embodiment on a pre-configured timing schedule of messages being sent to generic mobile device receivers from the ground station via particular satellites, and having the mobile devices listening at specific times to those particular satellites according to that schedule (e.g., listening at each configured time, listening at only certain of the configured times, or deciding when a location is needed and waiting for the next expected transmission from the correspondingly expected satellite according to the schedule, and so on). For instance, for configured mobile devices (and generally not user-controlled devices), example schedules between the ground station and the mobile device may be set in a number of ways, such as, e.g.:

Sending messages from the ground station in rotating succession to each satellite every hour on the hour for up to five minutes (e.g., from 1:00-1:05, sending to: x, y, z, x, y, z, x, y, z, . . . , then again from 2:00-2:05, 3:00-3:05, etc.), so a mobile device would attempt to listen to each of satellites 210x, 210y, and 210z within that five-minute period every hour to receive (e.g., and echo) the messages;

Sending messages from the ground station in rotating succession to each satellite for an hour during a particular hour each day (e.g., from 1:00-2:00 every day, sending to: x, y, z, x, y, z, x, y, z, . . . ), optionally with each receiver using a random time within that hour to listen and echo a reply for WAY messaging to avoid congestion;

Sending messages from the ground station in rotating succession to one satellite every twenty minutes (e.g., sending to: x at 1:00, y at 1:20, z at 1:40, x at 2:00, y at 2:20, z at 2:40, . . . ), which notably may require the use of geostationary and/or geosynchronous satellites to coordinate measurements made at different times into an accurate location;

Embedding a sequence of satellites in a WAY message to a specific mobile device;

and so on, and in other combinations.

Other configurations may be made based on additional considerations, such as mobility of the mobile device, tracking needs for locations (e.g., once-a-day IoT sensor tracking versus real-time fleet vehicle or military personnel tracking), deployment rate of new mobile devices, relocation frequency of mobile devices, battery levels and energy sources, rate of data collection, and so on. The schedules and corresponding satellites may also be reconfigured, such as based on need, security, and so on, and may be based on various algorithms (e.g., hashes) such that only certain mobile devices would receive (and echo) a location message at any given time. Furthermore, where clocks are merely generally calibrated and not perfectly synchronized between the ground station and the mobile devices, additional messages may be sent by the ground station (e.g., sending a series of messages to satellite 210x at or around 1:00, not just a single message) and/or a wider window of listening time may be employed by the mobile devices (e.g., configured for listening from 12:58-1:02 for a message expected to be received from satellite 210x at 1:00).

Configured coordination may also be based in another embodiment on a preliminary message indicating an on-demand timing schedule of messages being subsequently sent to one or more mobile device receivers from the ground station via particular satellites, such that those mobile devices may listen at those specific times to those particular satellites according to that schedule. The difference here, for example, is that the preliminary message may be sent as an instruction either on a channel the mobile device is expected to be listening to, at a time the mobile device is expected to be listening, or in response to communication being initiated by the mobile device and during the course of that opened communication. (Note that certain configurations of this embodiment may work for both configured mobile devices and user-controlled devices.) For instance, example scenarios here may include, among many others:

The ground station sends a preliminary message to a set of mobile devices (e.g., on a broadcast channel) indicating that those mobile devices should listen to a set of certain satellites (e.g., tune to a certain frequency and aim in a certain direction) at certain corresponding times (e.g., to listen to satellite 210x at 1:00, 210y at 1:05, and 210z at 1:10) if they would like to share or know their location;

The ground station sends a preliminary message to a specific mobile device indicating that this mobile device should listen to a certain satellite at a certain time, and then every 30 seconds after reception (e.g., and echoing) of a locating message to move to listen to a next satellite (e.g., to listen to satellite 210x at 1:00, 210y at 30 seconds after that, and 210z at another 30 second after that);

A mobile device sends a communication to the ground station, which during that communication sends a first locating message to the specific mobile device, and then sends instructions for the mobile device to move to a second satellite. Then, after a second locating message is sent to the mobile device via the second satellite, the ground station sends another set of instructions for the mobile device to move to a third satellite to receive (e.g., and echo) a third locating message;

A mobile device sends instruction to the ground station to send a first locating message now, and then in one-minute intervals afterward to a series of satellites selected by the mobile device;

and so on, and in other combinations.

Opportunistic beaconing reception, on the other hand, is an embodiment according to the techniques herein where coordination exists as a cyclical transmission of beacon messages, optionally at a known periodicity (e.g., once every 10 seconds via/from each of twenty possible satellites) or at any reasonable rate (e.g., at least once a minute via/from any particular satellite). As such, one or more ground stations may be configured to send out a beaconed location message (e.g., a generic WAY message to any listening receiver) via one satellite to receive and process responses, then to another satellite to receive and process responses, and so on. For example, a signal takes approximately 250-280 ms round-trip to travel from an earth-based device to a GEO satellite and back to another earth-based device (approximately 130 ms each direction or "leg", plus any satellite processing delay). The return signal takes approximately the same amount of time, thus for a grand total of about 0.5 seconds (i.e., two round-trips, or four total legs, between the earth and the satellite, plus any echo processing delay) from when a ground station sends a location message (e.g., a WAY message) and receives an echo response from one or more responding mobile devices. At this rate, assuming an "M"-second processing time for storing response time differentials (total round trip time of flight) or computed distances (as described above) for each response (e.g., hundreds or thousands of responsive IoT devices, inventory, fleet vehicles, or personnel), which notably may include random or configured delays by the mobile devices to avoid echo reply congestion, the ground station may cycle to a new satellite every M+0.5 seconds. Alternatively, the periodicity of the cycle may merely be set to whatever time allows for adequate processing by the ground station and congestion control, and an acceptable amount of time a mobile device would be expected to listen to a given satellite until a beacon is received (e.g., 10-15 seconds for user-controlled implementations, up to minutes or even hours for IoT devices that mechanically aim and hold their antenna).

In this manner, a mobile device need only aim and listen to a given satellite at any time for a next beacon message received via that given satellite, return an echo (in the WAY message example), and then move on to any other suitable satellite to repeat the process until a sufficient number of satellites have been received (e.g., and echoed). Each beacon message sent by the ground station need not be responded to by a mobile device, but after some length of time, the ground station may eventually receive a sufficient number of responses from each mobile device to formulate a location, accordingly. (Note that in the event of a significant number of responses being returned, one or more mitigation techniques may need to be implemented to avoid congestion and/or collisions at the receiving ground station, such as randomized delays, frequency shifts, back-off timers, etc., as may be appreciated by those skilled in the art, and in a manner that preserves the necessary timing measurements used for distance calculations, accordingly.)

FIG. 17 illustrates an example table 1700 showing a collection of determined measurements based on returned echo messages from a plurality of mobile devices (terminal ID 1705) corresponding to a plurality of satellites (e.g., measurement entries 1710*x*, 1710*y*, and 1710*z*). Note that many other configurations of table 1700 are possible here, and the format shown herein is merely an illustrative example. For instance, measurements stored may be flight times, total round trip times (with or without delays accounted), a converted distance between the satellite and the mobile device, and so on. Once a sufficient number of satellite-based flight times (or distances, etc.) to the mobile device is received, a location 1715 (calculated as described above) may be stored, accordingly. For example, as shown, mobile devices/terminals "A" and "B" have complete data sets (three measurements), resulting in locations "X" and "Y", respectively, while terminal "C" has yet to return a third satellite echo needed for locating. Note that more than three satellite columns 1710 may be used for a larger number of available satellites, and whenever any three or more satellites have determined responses, a location can be determined. Also note that the data in the table 1700 may be set to expire after a certain length of time (e.g., depending on configuration, mobility, etc.), and other information, such as "freshness" of the data, accuracy, and so on, may also be stored therein.

It is important to note that the "where am I" (WAI) and "where are you" (WAY) messaging techniques described above generally do not require precise synchronization of time between the ground station and the mobile device, since the transmission and reception times are self-clocked, i.e., comparing timestamps of transmission and reception time to determine a total round trip flight time regardless of any actual agreed-upon time between the devices. However, in addition to satellite-based echoing for geolocation, the present disclosure also provides for satellite-based relaying for geolocation in embodiments where precise clock synchronization is possible (e.g., using atomic clocks or other synchronization techniques). In particular, FIGS. 18-21 below illustrate techniques where the use of a synchronized timestamp allows for one-way messaging to provide "where I am" (WIA) messaging and "where you are" (WYA) messaging (e.g., a form of TDOA calculation). That is, as described in greater detail below, a transmitter transmits a one-way timestamped message to a receiver via a satellite, such that the receiver can determine the travel time of the message based on the difference in the transmit and receive times. Notably, for WIA messaging when the initial message is coming from the mobile device, the receive time may be at the satellite or the ground station. Moreover, for WYA messaging when the ultimate receiver is the mobile device, the transmit time may be from the ground station or the satellite. In either case, when ground station times are used, based on knowing that portion of the travel path (e.g., a time or distance that is known from the ground station to the satellite), the receiver can then remove the known portion (and any delay incurred at the satellite) to determine the remaining unknown portion (time or distance) of the travel path (e.g., the time or distance that is unknown from the satellite to the mobile device).

Note for clarity herein, that the present disclosure thus addresses four different types of illustrative location determination messages:

Where Am I (WAI) messages: e.g., a device echoing a message back to itself through a satellite to determine its distance to the satellite;

Where Are You (WAY) messages: e.g., a device echoing a message via a satellite through to a remote device of unknown location to determine the distance between the satellite and the remote device;

Where I Am (WIA) messages: e.g., a transmitting device sending a message to a remote receiving device so that the remote receiving device can determine the distance between the satellite and the transmitting device; and Where You Are (WYA) messages: e.g., a transmitting device sending a message to a remote receiving device so that the remote receiving device can determine its distance from the satellite.

Figure 18:
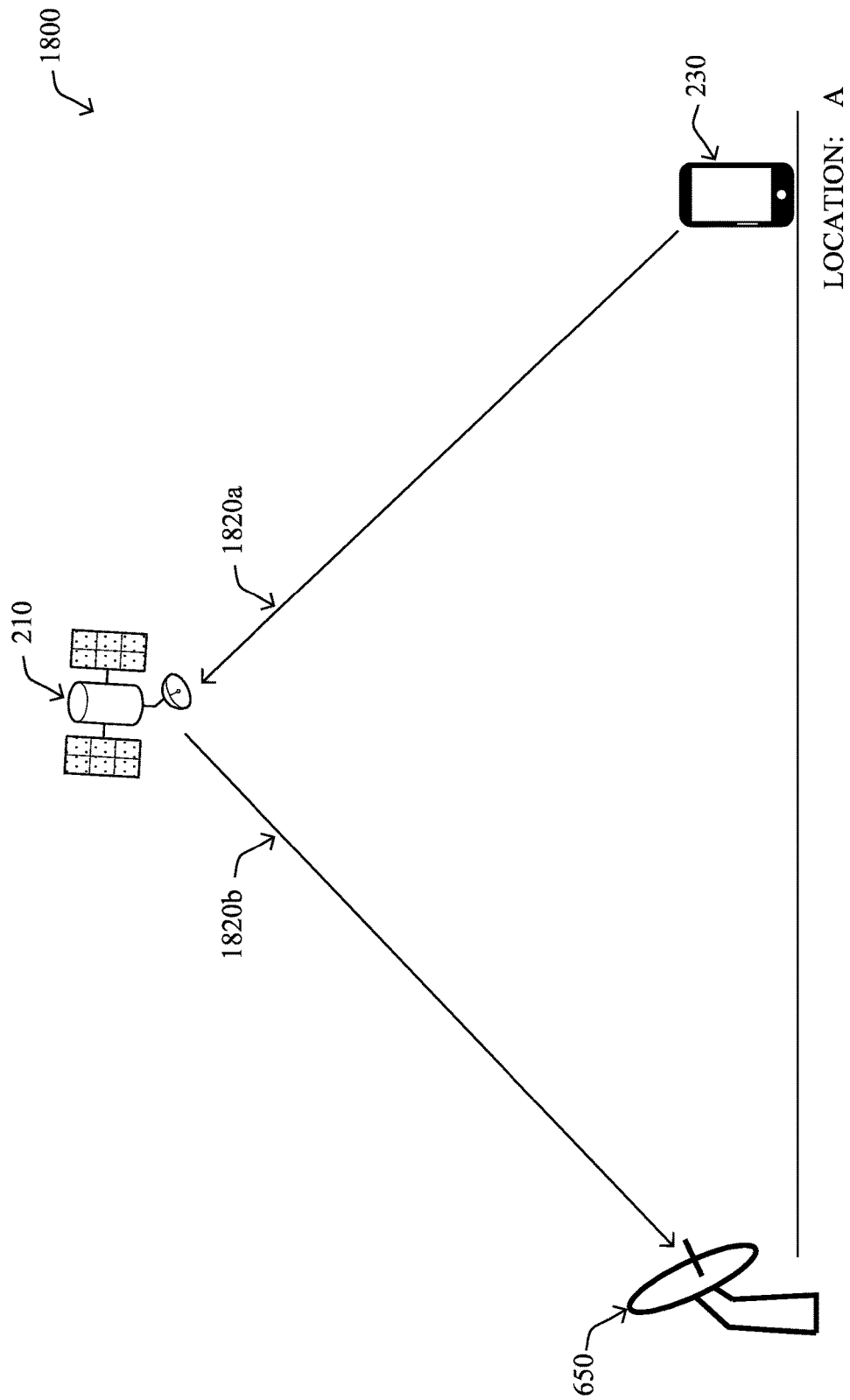
FIG. 18 illustrates an example of a "where I am" (WIA) message system in accordance with one or more embodiments herein.

Specifically, in further detail, as shown in the environment 1800 of FIG. 18, "where I am" (WIA) messaging may be based on the mobile device 230 initiating the transmission of a WIA message 1820*a*, which now specifically includes a transmission timestamp, toward a satellite 210. In one embodiment, where the satellite 210 and mobile device 230 are time synchronized, the satellite marks the receive time, and forwards the WIA message 1820*b* with either the transmit and receive times, or simply the difference between the two (or for sophisticated systems, the calculated distance value). Alternatively, in another embodiment, where the ground station 650 and mobile device 230 are time synchronized, but the satellite 210 need not be (or perhaps is not configured to perform operations other than relaying messages), the satellite 210 receives the WIA message 1820*a* and relays it toward the ground station 650 as message 1820*b*, which may now either include an indication of any processing delay incurred at the satellite, or which may be followed-up with a message indicating the delay, as mentioned above. (Note that WIA messaging may also take advantage of ASI spillover as in FIG. 7 above, as well as satellite-to-satellite configuration of FIG. 11 above, where the primary satellite relays the timing information to the ground station, accordingly.)

Accordingly, for WIA messaging, the ground station 650 may compute the flight time between the mobile device 230 and the satellite 210 as either:

Flight time=(satellite receive time−mobile device transmit time)   Eq. 6a;

Or:

Flight time=(ground station receive time−mobile device transmit time)−(satellite processing time)−(known flight time between satellite and ground station)   Eq. 6b.

Known computation techniques may then convert the flight time between the mobile device and the satellite into a distance, and then the distance (along with other distances to objects with a known location) may also be used to compute a location of the mobile device using known techniques. Alternatively to equation Eq. 6b, the total distance between the mobile device and the ground station may be computed first (e.g., based on ground station receive time—mobile device transmit time—satellite processing time), and then from that distance, the known distance between the satellite and the ground station may be removed/subtracted, accordingly.

Note that in one embodiment, the ground station 650 may return the determined location to the mobile device 230, though it is not necessary, such as for inventory tracking, IoT device locating, fleet or personnel tracking, and so on. Also, while the ultimate receiver of the WIA messages is shown as the ground station, any device may receive a WIA message from the satellite, where either the satellite marks the synchronized receive time (or flight time or distance), or where the receiving device has a known distance to that satellite (e.g., a local command center, building, another mobile device that knows where it is in relation to the satellite, etc.).

Figure 19:
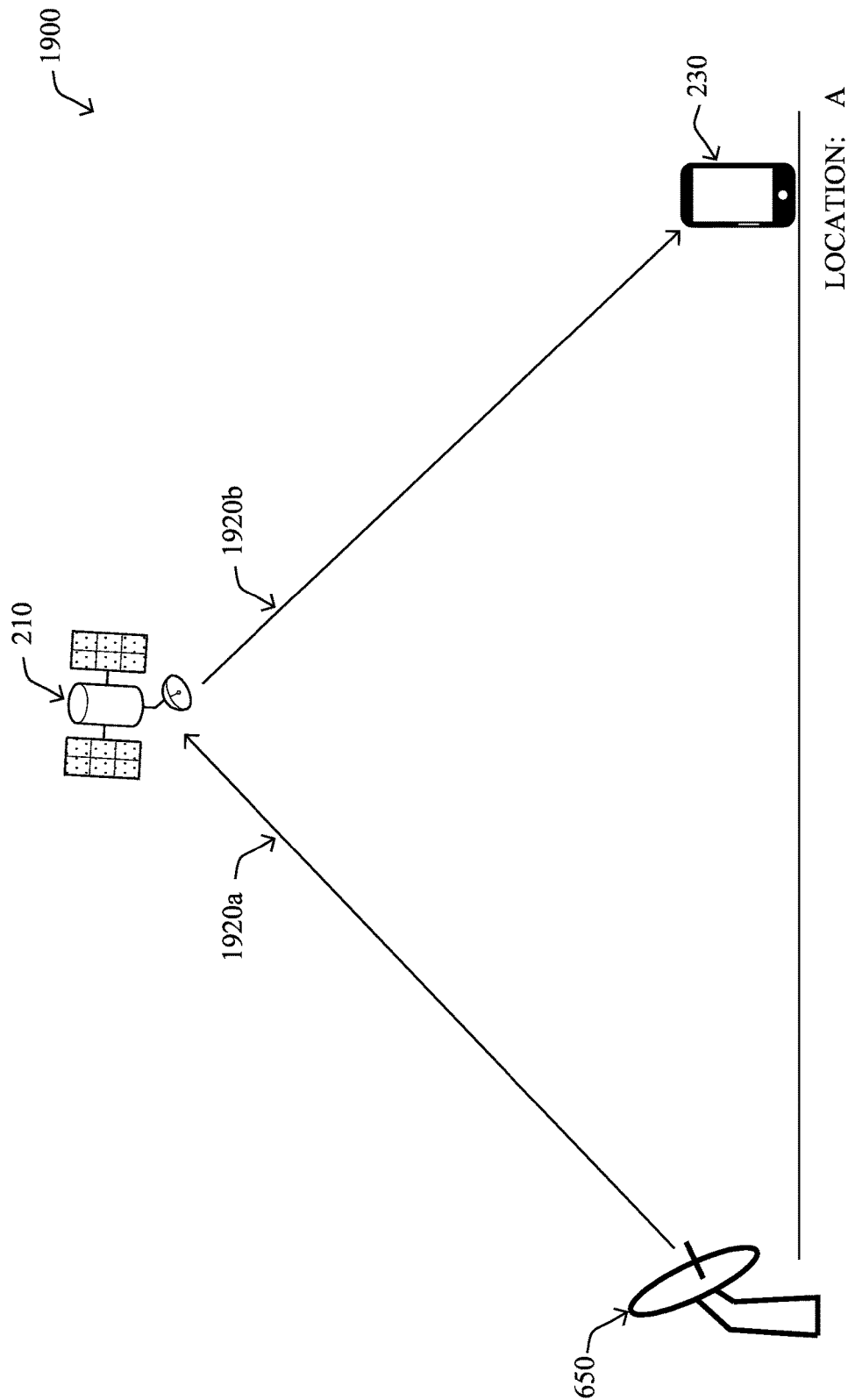
FIG. 19 illustrates an example of a "where you are" (WYA) message system in accordance with one or more embodiments herein.

As mentioned above, in still another embodiment according to the techniques herein, as shown in the environment 1900 of FIG. 19, "where you are" (WYA) messaging may instead be based on the ground station 650 initiating the transmission of a WYA message 1920*a*, which may include a transmission timestamp, toward a satellite 210, where again the ground station 650 and mobile device 230 are time synchronized, and the satellite 210 need not be. Here, the satellite 210 receives the WYA message 1920*a* and relays it toward the mobile device as message 1920*b*, which may again either include an indication of any processing delay incurred at the satellite, or which may be followed-up with a message indicating the delay, as mentioned above. In one embodiment, the WYA message may also include the known flight time or distance between the ground station 650 and the satellite 210, while in another embodiment the mobile device is configured with an up-to-date flight time or distance between the ground station 650 and the satellite 210 via communication or configuration outside of the WYA messaging. Alternatively, where the satellite 210 and mobile device 230 are time synchronized, the satellite may either mark the transmit time of WYA message 1920*b*, and forwards it on to the mobile device, accordingly.

For WYA messaging, the mobile device 230 may now compute the flight time between the satellite 210 and itself as either:

Flight time=(mobile device receive time−satellite transmit time)     Eq. 7a;

Or:

Flight time=(mobile device receive time−ground station transmit time)−(satellite processing time)−(known flight time between ground station and satellite)     Eq. 7b.

Similar to as stated above, known computation techniques may then convert the flight time between the mobile device and the satellite into a distance, and then the distance (along with other distances to objects with a known location) may also be used to compute a location of the mobile device using known techniques. Also similarly above, alternatively to equation Eq. 7b, the total distance between the mobile device and the ground station may be computed first (e.g., based on mobile device receive time—ground station transmit time—satellite processing time), and then from that distance, the known distance between the satellite and the ground station may be removed/subtracted, accordingly.

In one embodiment, the mobile device 230 may simply use its determined location for its own local application (e.g., navigation, artillery delivery, etc.). In another embodiment, however, the mobile device 230 may return its determined location to the ground station 650, though it is not necessary (e.g., useful for such things as inventory tracking, IoT device locating, fleet or personnel tracking, search and rescue, and so on). Also, while the initiator of the WYA messages is shown as the ground station, any device may initiate a WYA message via the satellite, including the satellite itself (if so configured, such as for future satellites being deployed with such capability), where either the satellite marks the synchronized transmit time, or where the initiating/transmitting device has a known distance to that satellite (e.g., a ground station, a local command center, building, another mobile device that knows where it is in relation to the satellite, etc.).

Figure 20:
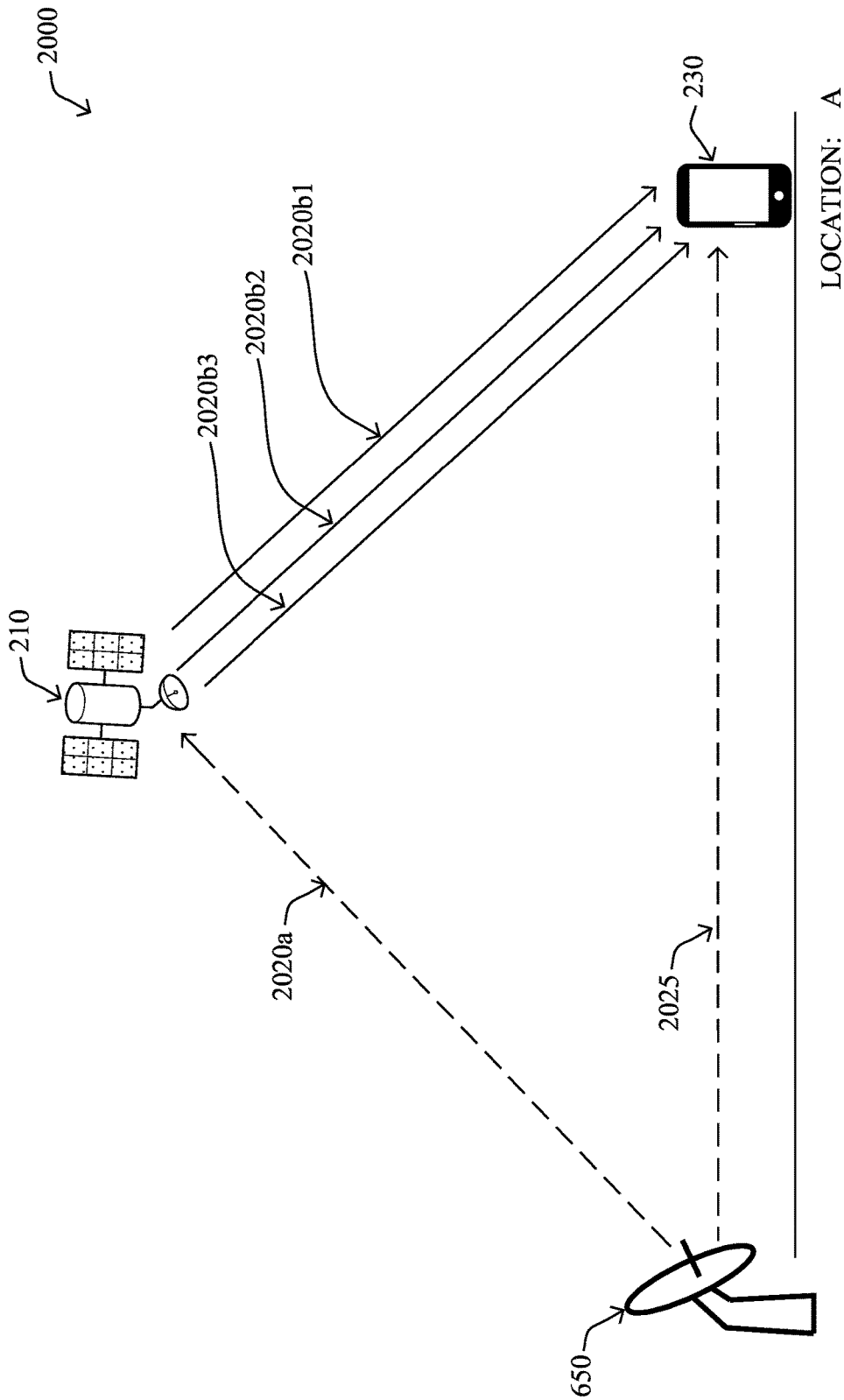
FIG. 20 illustrates an example of a satellite control signal implementation for WAY and/or WYA beaconing in accordance with one or more embodiments herein.
Figure 21:
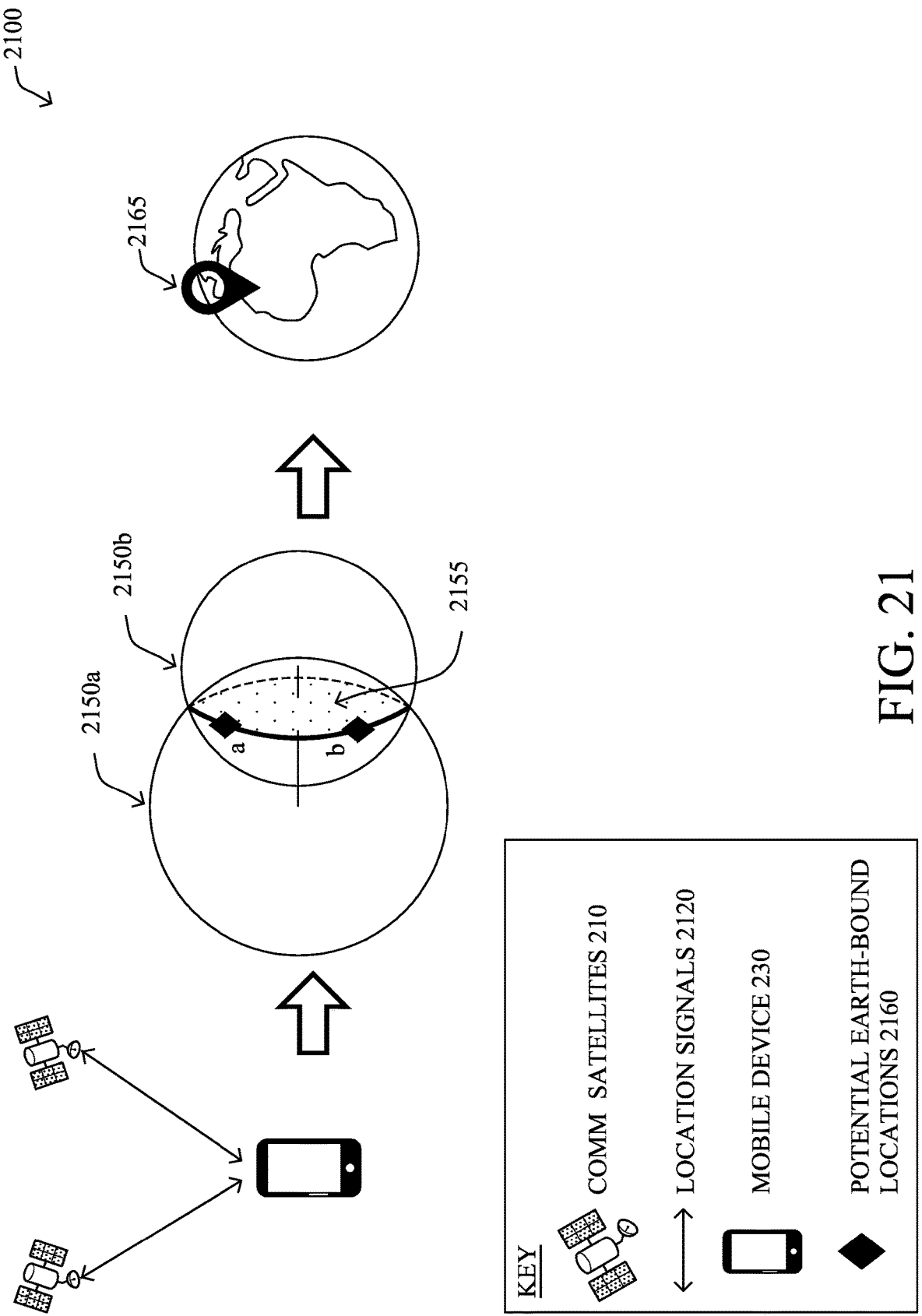
FIG. 21 illustrates an example of a two satellite trilateration in accordance with one or more embodiments herein.

Regarding the satellite being able to initiate WYA messages, the techniques herein offer advantages over traditional GNSS technologies in that the messages are self-defined and configurable, so frequencies can be changed, encryption can be changed, the timing of messages can be changed, and so on. FIG. 20 illustrates an example environment 2000 in which the initial WYA message 2020*a* sent from the ground station 650 is embodied as a control message, which may provide instructions for the format of messages 2020*b* to be repeatedly sent (e.g., 2020*b*1, 2020*b*2, 2020*b*3, etc.) by the satellite 210 to be received by one or more mobile devices 230 (where, notably, a header of the message designates the intended recipient(s) or a particular spread spectrum code allows only the intended recipient(s) to decode the message). For instance, the instructions may comprise a copy of a message to be repeatedly sent (e.g., the satellite repeats sending/relaying the message 2020*a*), control signals to dictate various parameters for messages to be sent (e.g., the satellite generates its own messages under a configuration set by the ground station, such as the frequency, periodicity, encryption, and so on), or other combinations thereof (e.g., a copy of the message is first sent, and then updated configuration for that message may be sent as a follow-on control message, etc.). Other information may also be updated, since as up-to-date accurate satellite locations, and so on.

As noted above, time synchronization with the mobile device is required for embodiments herein that are not self-clocked (e.g., the WYA messages), and for the satellite 210 to provide beacon signals, it must be time synchronized with the mobile devices 230 accordingly. Unlike traditional GNSS signals, however, control of the WYA beaconed messages 2020*b* from the satellite as described herein are ground-controlled, and are thus configurable on-demand. For instance, as described below, to avoid jamming or spoofing, or specifically in response to detecting such signal denial, the techniques herein can use secure ground-based control messages 2020*a* to adjust the beacon parameters being sent to the mobile devices 230. To accomplish this, it may also be necessary to transmit a corresponding control message 2025 from the ground station 650 to the mobile device(s) 230 in order to instruct the mobile device(s) on how to receive/interpret the received signals 2020*b* from the satellite 210. Note that control message 2025 is shown in FIG. 20 as being transmitted directly from the ground station 650 to the mobile device 230. This is a simplification, however, and in implementation, the message 2025 will either be sent via the satellite 210, or via another network (e.g., via another satellite, wirelessly direct, wirelessly through a computer network, via a cellular network, and so on). Additionally, unlike traditionally GNSS technology, the techniques herein use directional receiver antennas on the mobile devices, increasing the general robustness of the systems herein against jamming and/or spoofing, as described below.

"Where you are" (WYA) messages, in particular, are not only helpful in general, but specifically so in situations where the mobile device is unable to transmit (or where it is better not to transmit) any initiated or echoed messages, such as to avoid interference, to conserve energy, or even to avoid giving away its location (e.g., by an enemy listening for transmissions). In this instance, therefore, the mobile device merely needs to listen for the beaconed WYA messages passing through a number of satellites (e.g., point and listen to a first satellite until its beacon is received, point and listen to a second satellite until its beacon is received, and so on). As described below, WYA messages are differentiated from standard GNSS messages in that they are ground-configurable, and can be adjusted as needed (e.g., for encryption, spoofing or jamming mitigation, additional data delivery, different frequency band, etc.)

Note that the WYA messages may be a primary mechanism for a mobile device to locate itself, or as a secondary mechanism (e.g., for confirmation of a different primary system, as described below). For instance, as a primary mechanism, the WYA messages may be configured for less time between beacons, such that any time a mobile device desires its location, it can listen briefly for the next beacon from each satellite (e.g., a beacon every minute, 30 seconds, 10 seconds, or less). For a secondary mechanism, on the other hand, the WYA messages may be transmitted as frequently, or also far less frequently, such as, e.g., a beacon every minute, five minutes, ten minutes, 30 minutes, 60 minutes, and so on. For longer time between beacons, the mobile device may be configured to know the next time a beacon will be transmitted, or may simply point in a particular direction long enough to receive the next beacon. Various considerations, such as whether the WYA messages are intended for user-controlled devices, slow-moving inventory devices, stationary IoT devices, fast-moving vehicle tracking, and so on, may be factored into an appropriate configuration of the WYA message timing.

Note also that while the techniques above generally mention that a minimum of three satellites are needed for trilateration, certain embodiments herein may be configured to allow for the use of signals from only two satellites. For instance, with reference to illustration 2100 of FIG. 21, once a mobile device 230 receives the location signals 2120 as described above (e.g., a WAI message 320/620, WAY message 1520, WIA message 1820, WYA message 1920) from two satellites 210, each resultant range measurement may be considered as a sphere of location uncertainty (sphere 2150a for a first satellite and sphere 2150b for a second satellite), where the center of each sphere is the corresponding GEO satellite. The mobile device 230 is somewhere on the surface of each sphere, and through ranging to two different satellites, two intersecting spheres are thus created where the intersection of these two spheres defines a 2D virtual disk 2155 at the intersection of the 3D spheres, where the mobile device may possibly be located anywhere along the perimeter of this intersection disc 2155. Now, then this virtual disk 2155 intersects with the surface of the Earth (i.e., another sphere), this further reduces the points of intersection to define just two possible geolocation points for the mobile device, illustratively potential Earth-bound locations 2160 "a" and "b", as shown. The techniques herein may then select a final correct position (location 2165) from among the northern and southern hemisphere fixes (2160-a and 2160-b) using a corresponding satellite ID and known hemispheric reach (e.g., satellites specifically for northern hemisphere communication versus satellites for southern hemisphere communication). (Note that equatorial satellites may be used (e.g., GEO satellites that orbit above the equator), but either the addition of at least one hemispherically identifiable satellite may need to be used (that is, a satellite that may be identifiably visible/used for one specific hemisphere, either the northern hemisphere or the southern hemisphere), or else extrinsic knowledge of general hemispheric location (e.g., the mobile device knows it is in either the northern or southern hemisphere) may be required.) Without a third satellite, and by only using the Earth's surface as a third sphere for trilateration (i.e., assuming that the mobile device as at 0 altitude), the actual altitude of the mobile device can be supplemented through measurement of barometric pressure (cross referenced to atmospheric data), or other mechanisms (e.g., Light Detection and Ranging (LIDAR), Radio Detection and Ranging (RADAR), etc.). Note that in this case, where the mobile device is not at sea level (0 altitude) or known ground level for a given location, the location may have an associated error that may be either accounted for based on the determined altitude, or else merely noted as an estimated error in the location.

With regard to message formatting, FIG. 22 illustrates an example simplified format of a message 2200 that may be used according to any of the techniques herein, with generally minor differences based on need and/or configuration (e.g., as a WAI message 320/620, WAY message 1520, WIA message 1820, WYA message 1920, or other messages herein, whether for locating, configuring, or communicating). Notably, other formats, including more or fewer fields, may be present in a message used in accordance with the scope of the present disclosure, and the example shown in FIG. 22 is not meant to be limiting in any manner. Note also that the message 2200 may be a dedicated locating message, or may be a communication message with one or more fields contained therein that may be used for locating services as described herein.

Illustrative message 2200 may include various header information 2210, such as a source ID (e.g., address, identifier, name, etc.) and destination ID (e.g., a broadcast indicator, a specific recipient device ID, a multicast group ID, a message type identifying the message as an WAI message, and so on), as well as other fields for receiving and decoding the message. As will be appreciated by those skilled in the art, the actual ID in instances where the satellite is a relay device between a mobile device and ground station (in either direction), source and destination fields may correspond to either the initiating device or the relaying satellite, depending upon configuration.

In addition, in one embodiment the message 2200 may comprise one or more node-specific fields, such as depending on the number of nodes/devices the message passes through to reach the final destination receiver. For instance, assuming that the illustrative message 2200 is an echoed message utilizing ground stations, the message would start at a transmitter, pass through a first relay/satellite, reach an echo device, then be returned through a second relay/satellite before being returned to the transmitter. Populated information fields may then be transmitter information 2220, first relay/satellite information 2230, echo device information 2240, and second relay/satellite information 2250.

The transmitter information 2220 may comprise a transmitter ID 2222 (e.g., the source ID), a transmit timestamp ("TX time") 2224*t*, and if known (e.g., if coming from the ground station), a known measurement 2226, such as the time of flight or actual distance between the transmitter and the satellite. First relay/satellite information 2230 may comprise an ID 2232, a receive timestamp ("RX time") 2234*r* for when the message was received, a TX time 2234*t* for when the messages was transmitted/relayed, and/or a delay field 2238, indicating the processing delay incurred at the relay/satellite between the receipt and transmission, accordingly. Echo device information 2240 may comprise an ID 2242, RX time 2244*r*, TX time 2244*t*, a known measurement 2246 (depending on the direction of the echoed message), and/or a delay field 2248, indicating the processing delay incurred at the echoing device. Second relay/satellite information 2250 may comprise an ID 2252, RX time 2254*r*, TX time 2254*t*, and/or a delay field 2258. Other controls and/or data may be contained in additional field(s) 2260 (e.g., for sending timing information and other data, whether related to location or other communications). Also, in one embodiment, the relay/satellite may have a single information field 2230, but the relay/satellite may increase the delay value 2238 on the return trip (and timestamps may not be used or additional timestamp sub-fields may populate the singular relay/satellite information field 2230).

Other configurations are possible, such as the example message format 2300 shown in FIG. 23, where minimal data is stored based on a single "accumulated delay" field that is increased by each node adding a delay to the transmission of the message. Specifically, in this simplified message format 2300, a header field 2310 again provides basic information for transmission and reception of the message, while accumulated delay field 2320 comprises a single total delay value, where each processing device adds their delay to the last value within the field 2320, or else each processing device appends their delay as another value within the field, for later summing by the ultimate receiver. In instances involving a ground station, a known measurement field 2330 may indicate the distance or time between the ground station and the satellite that needs to be removed/subtracted from the calculations by the mobile device, as described above. Also, other useful information, such as accurate satellite location information 2340 or other controls/data 2360 may also be included within the message format 2300.

Those skilled in the art will understand that additional information or less information may be carried in either messages 2200 or 2300, and the views shown herein are merely for discussion, and are not meant to be limiting to the scope of the embodiments herein. Moreover, certain information from one example format may be used in another format, and vice versa, and certain information may be sent in separate messages at different times (e.g., follow-up messages with delay information, control instructions, and so on). Additionally, the ordering of the fields is also merely for illustration, and is not meant to be limiting, either.

According to one or more embodiments of the present disclosure, the novel location messaging techniques described above (e.g., the WAI, WAY, WIA, and WYA messages above) may be configured for use independently from one another, or in various combinations, such as based on need, availability, opportunity, or other policy-based determinations. Additionally, the techniques described above may be used as a primary location determination mechanism, a secondary or backup location determination mechanism, or as a confirmation mechanism. In particular, as described in greater detail below, the use of the techniques described above can be triggered to detect a primary GNSS issue (e.g., jamming, spoofing, or other GNSS denial) and/or to be used specifically in response to such detected (or suspected) GNSS denial, as one possible mitigation mechanism. (Generally, the primary GNSS location may be more accurate than the secondary location based on communication satellites using the WAI, WAY, WIA, and WYA messages above.)

Specifically, in accordance with yet another aspect of the present disclosure, the systems described above may be used to determine whether a GNSS (e.g., GPS) signal is spoofed or manipulated to provide misleading locations to mobile devices, and to mitigate any type of GNSS denial, accordingly.

Figure 24:
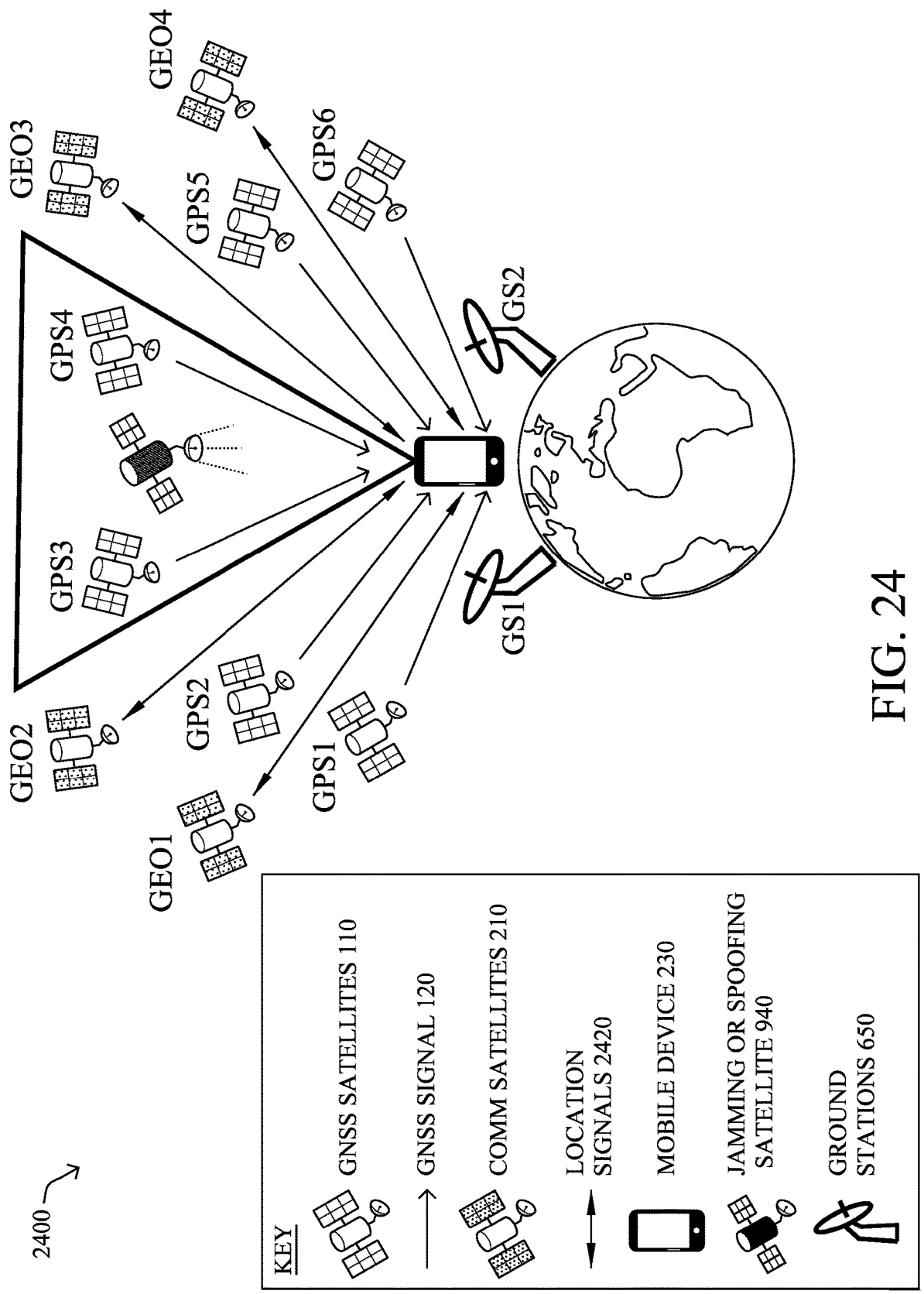
FIG. 24 illustrates an example of hybrid satellite operation in accordance with one or more embodiments herein.

FIG. 24 provides a simplified illustration demonstrating an environment 2400 for the techniques used to precisely determine the location of a mobile device 230 such as a hand-held device, according to one or more embodiments herein, where GNSS satellites 110 (e.g., GPS satellites GPS1-GPS6) and communication satellites 210 (e.g., GEO satellites GEO1-GEO4) are configured to communicate with their respective location signals, i.e., GNSS signals 120 and location signals 2420 (such as any of the WAI, WAY, WIA, and WYA messages above), respectively. Under normal conditions, the mobile device 230 receives unaltered signals from GNSS satellites such as GPS1 through GPS6. However, when the GNSS system is either jammed or spoofed by an adversary actor such as a jamming or spoofing vehicle (e.g., plane, satellite, drone, etc.), such as satellite 940 in FIG. 24 blocking or altering the signals 120 from GNSS satellites GPS3 and GPS4, the mobile device may be unable to determine its location using GNSS signals, or may determine its location incorrectly.

According to the techniques herein, therefore, it is necessary to be able to detect that the GNSS signal is either unavailable or unreliable, and optionally to trigger one or more mitigation operations described herein to account for such GNSS denial, accordingly. While jamming of a GNSS signal (or other mechanisms for complete obscurity, such as GNSS satellite destruction) may be easily detected based on an inability to locate or decipher a particular GNSS signal or based on detecting overpowering signals that are creating too much noise to separate out the GNSS signals, GNSS spoofing is a more disguised attack against GNSS, and requires more astute detection measures.

Accordingly, in one particular GNSS denial detection embodiment herein, the mobile device 230 (or ground station 650) uses a primary GNSS-based geolocation (e.g., using GPS signals), and periodically measures a position according to the techniques herein as a secondary geolocation measurement (e.g., using any of the WAI, WAY, WIA, and WYA messages above), and makes use of the secondary determined location to detect tampering with the primary GNSS. That is, if the primary GNSS signals are jammed and become unavailable, the system may default to determining its location using communication satellites and the secondary geolocation methods described above. Additionally, however, the techniques herein may also (or alternatively) periodically (or continuously) determine the secondary location, and may compare the secondary location against the primary GNSS location to detect an apparent error (e.g., an unacceptably large difference in locations), and to thus declare an alleged primary GNSS spoofing, and optionally mitigate against such an occurrence.

Figure 25A:
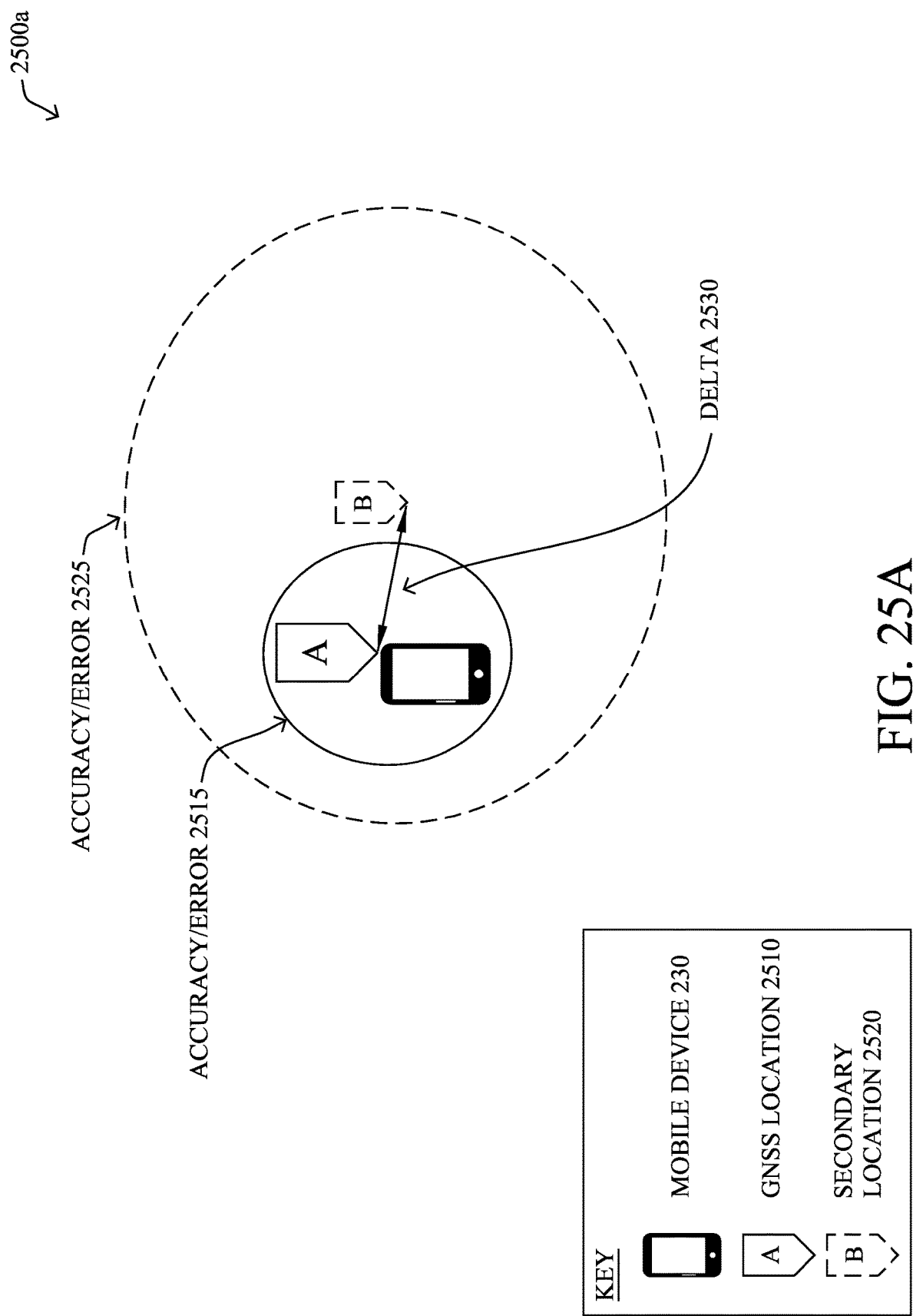
FIGS. 25A-25B illustrate an example of GNSS spoofing detection based on secondary locations in accordance with one or more embodiments herein.
Figure 25B:
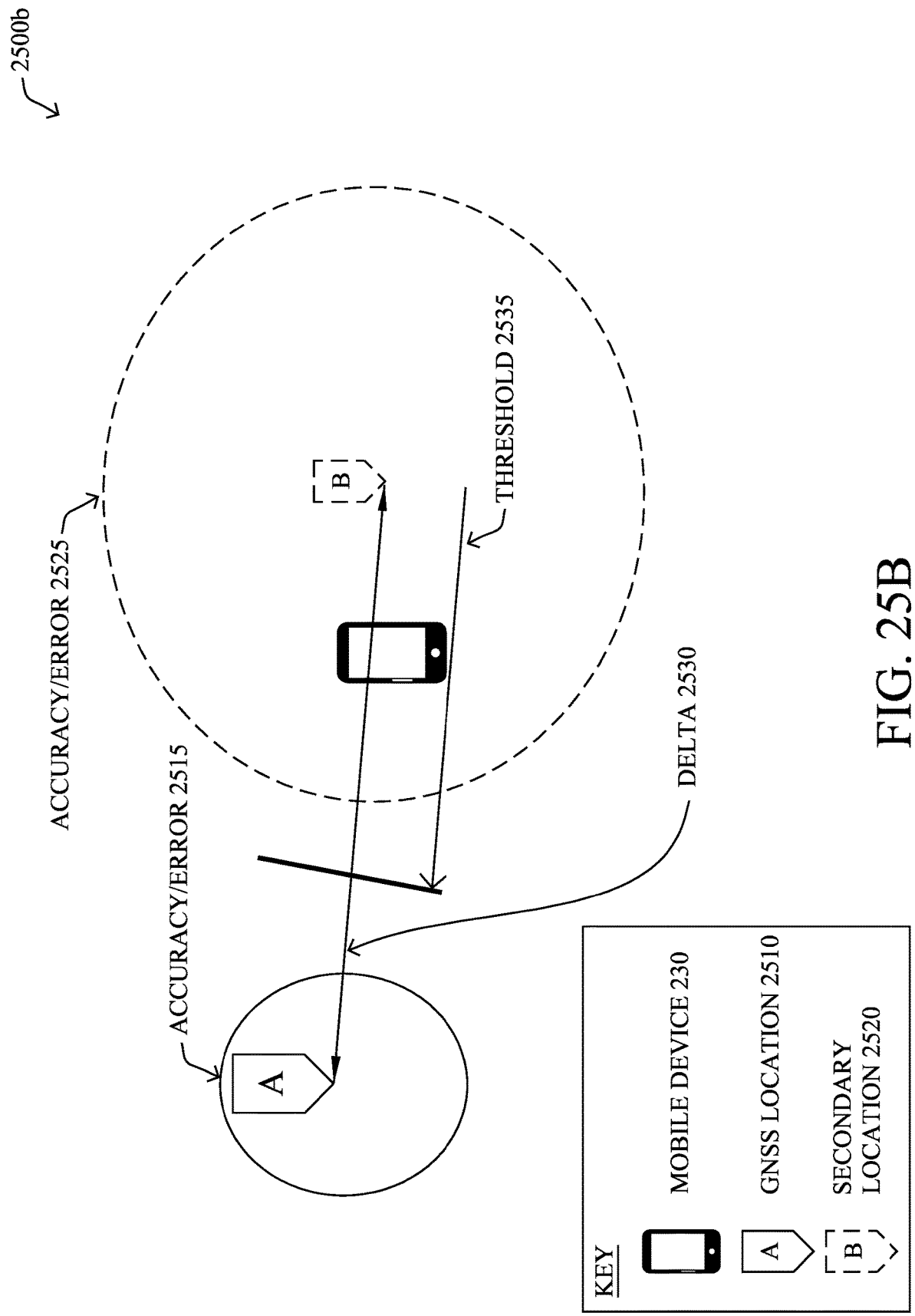

FIGS. 25A-25B illustrate example simplified geolocation comparison environments 2500a and 2500b, respectively, demonstrating this concept. For instance, as shown in FIG. 25A, the GNSS location 2510 of mobile device 230 is determined as "Location A", with an accuracy error 2515, and the secondary location 2520 is determined as "Location B," with an accuracy error 2525 (e.g., shown as a larger error than the GNSS error, though not necessarily so). Assuming that the "Delta distance" 2530 between Location A and Location B is maintained below a predetermined threshold distance, then the GNSS location 2510 may be used. (Alternatively, in response to the difference in locations being less than or equal to an acceptable threshold, an accurate location determination may be calculated as a weighted average between the first and second location determinations, i.e., between Location A and Location B, with more weight given to the primary location A.)

However, as shown in FIG. 25B, in the event that the GNSS location 2510 is located beyond the acceptable distance from the secondary location 2520 (i.e., Delta 2530 is larger than the threshold 2535), then it may be determined that the GNSS signals are being spoofed/altered, and the secondary location may be used instead. In particular, despite potentially being less accurate overall, in this instance, the secondary location may be assumed to be more trustworthy, and not jammed or spoofed. Notably, the threshold level of acceptable difference/delta between primary and secondary locations may be statically configured, dynamically configured, adjusted per specific situation, based on general or real-time determined accuracy of either the primary or secondary locations (e.g., whether they overlap with each other), and so on. For instance, this threshold, as well as others described herein, may be dynamically determined based on a level of accuracy that can be determined based on various factors. For example, such thresholds herein may be dynamically adapted based on an expected error in the calculated location of the communications satellite or of the target/mobile device, where the expected error itself may be based on such things as: a number of GNSS satellite signals being used, an error or uncertainty of a reference datum location (e.g., a communication satellite that is "somewhere" within a certain known area in space), which locating hardware system is being used (e.g., certain systems being more accurate than others), GDOP based on selected antennas/satellites, and so on.

Figure 26:
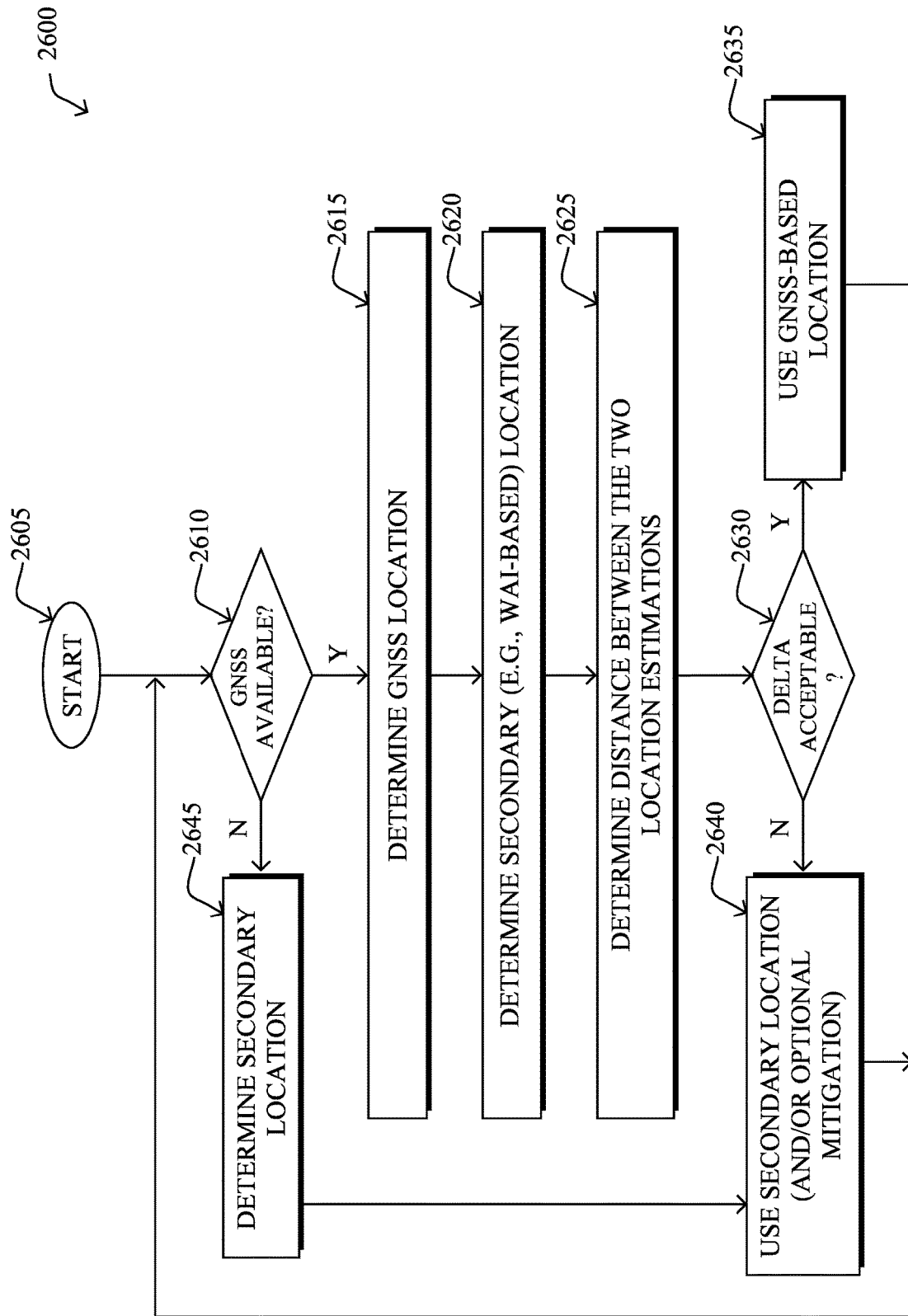
FIG. 26 illustrates an example procedure for GNSS spoofing detection based on secondary locations in accordance with one or more embodiments herein.

FIG. 26 illustrates an example simplified procedure 2600 further demonstrating the techniques herein according to this concept. In particular, the procedure starts in step 2605, and in step 2610 the mobile device determines first whether the primary GNSS is available (e.g., whether a sufficient number of GNSS signals can be received). If so, then in step 2615 the mobile device determines its GNSS location. In addition, in step 2620, the mobile device also (e.g., continuously, periodically, or as requested) determines its secondary location based on any of the WAI, WAY, WIA, and WYA message techniques described herein.

According to this technique, in step 2625, the device determines the delta/distance between the two location estimations. If in step 2630 the delta is acceptable (e.g., less than a certain threshold), then in step 2635 the device may use the GNSS-based location with a degree of confidence (within the threshold). That is, if the GNSS location and the secondary-based (e.g., WAI message-based) location are within a predetermined (configured threshold) distance, e.g., less than 500 meters, the system may determine that use of the GNSS location is acceptable. However, if the delta is unacceptable, such as when the GPS location drifts more than the threshold distance (e.g., more than 500 meters) away from the secondary location, the system determines that the GNSS-based location has been manipulated (jammed or spoofed), and it then defaults to using the secondary-based location in step 2640 (and/or optionally any other mitigation mechanism, such as those described below).

Note also that if the primary GNSS is unavailable in step 2610, then in step 2645 the device may resort to determining the secondary-system-based location, and simply uses that secondary location in step 2640 as the only available option.

In accordance with another particular GNSS denial detection embodiment herein, the mobile device 230 (or ground station 650) may still use a primary GNSS-based geolocation, but in this embodiment may use those existing GNSS satellites to detect a potential spoofing. In accordance with this embodiment, when the navigation system (e.g., the mobile device) is able to receive GNSS signals from more than a sufficient number of GNSS satellites (e.g., three or preferably four, as described above), in addition to being able to use the received signals from the satellites to increase the accuracy of the GNSS-based position, the system herein may create multiple subsets of signals (datums from the signals) in order to determine whether any of those satellite signals have been spoofed or altered, based on determining multiple GNSS computed solutions (e.g., locations, local time, etc.) according to the different subsets of received signals. Example datums may include time of flight, time delay, computed distances, time of arrival, and so on.

Figure 27:
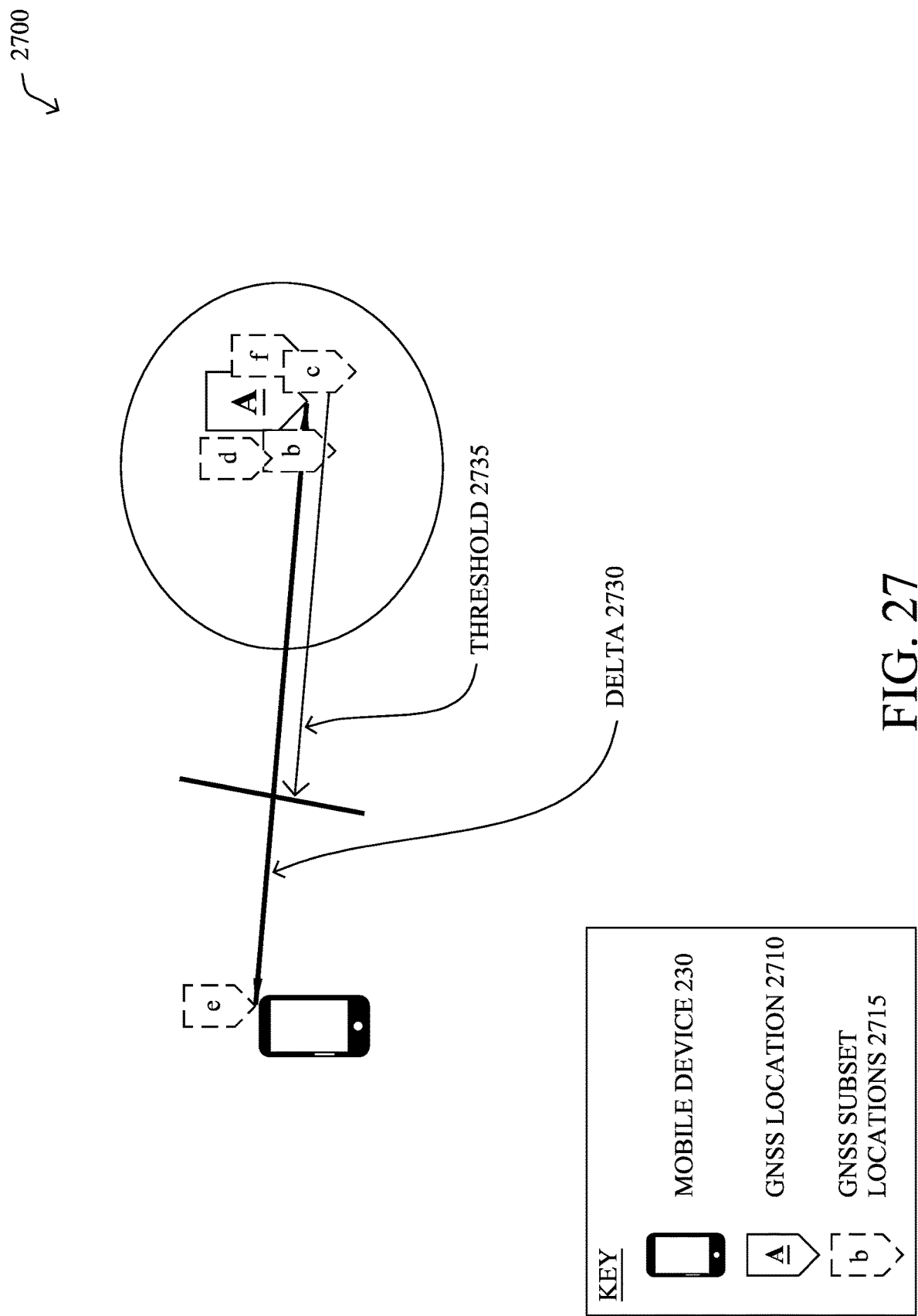
FIG. 27 illustrates an example of GNSS spoofing detection based on GNSS signal subsets in accordance with one or more embodiments herein.

For example, as shown in FIG. 27, assume that the mobile device 230 receives GNSS signals from, e.g., five different satellites: $S_1$, $S_2$, $S_3$, $S_4$, and $S_5$ (not shown). In addition to determining the location 2710 of the mobile device based on the complete set [$S_1$, $S_2$, $S_3$, $S_4$, and $S_5$], denoted as location "A", the system also creates multiple subsets of a sufficient number of signals (e.g., four or more signals in each subset) and determines multiple GNSS subset locations 2715 based on each one of the plurality of GNSS signal subsets such as, for example, subset [$S_1$, $S_3$, $S_4$, and $S_5$] (location "b"), subset [$S_1$, $S_2$, $S_4$, and $S_5$] (location "c"), subset [$S_1$, $S_2$, $S_3$, and $S_5$] (location "d"), subset [$S_1$, $S_2$, $S_3$, and $S_4$] (location "e"), subset [$S_2$, $S_3$, $S_4$, and $S_5$] (location "f"), etc.

The plurality of location estimates may then be compared, and a determination may then be made as to whether the location estimates based on the plurality of GNSS signal subsets are consistent with each other. For example, if all of the location estimates are within a small distance from each other, then it can be assumed that the location is accurate. If, however, it is determined that signals from one or more satellites of a particular subset provide or cause a GNSS location determination which is different (delta 2730) by more than a predetermined threshold (2735) from the location estimates according to the other GNSS location estimates (i.e., made based on the other GNSS signal subsets), then the system herein can determine that at least one of the GNSS signals is incorrect (e.g., being spoofed). For example, as shown in FIG. 27 (not to scale), subset location "e", which does not include the signal from GNSS satellite $S_5$ in the subsets defined above, is notably different than the remainder of the subset locations 2715 or the complete location 2710. Not only can it be assumed that a GNSS signal is being spoofed or altered, but it may also be determined that the signal from GNSS satellite $S_5$ is likely the spoofed or erroneous signal, as all other locations based on GNSS satellite $S_5$ are quite different from the location determined without that signal.

Many other possibilities of combinations and locations may exist, especially where multiple GNSS satellite signals are spoofed or erroneous, and the example shown herein (e.g., the location of the mobile device 230, as shown, being relative to subset location "e") is merely meant as an illustrative demonstration and possible conclusion. For instance, where multiple GNSS satellite signals are spoofed or erroneous, various weighted errors may produce a plurality of outliers of possible locations, based generally on how much "weight" each combination of erroneous distances contributes to the location calculation. As such, determining which distances to exclude from a location determination, when possible, may be based on a number of situation factors, accordingly. Also, while location is shown as the example datum, other datums may be used as mentioned above in order to compute a given solution from each subset in order to determine any corresponding differences in such computed solutions. (Further, while this technique generally references GNSS spoofing, any locating hardware system may create subsets in a similar manner for detecting spoofing, accordingly.)

Figure 28:
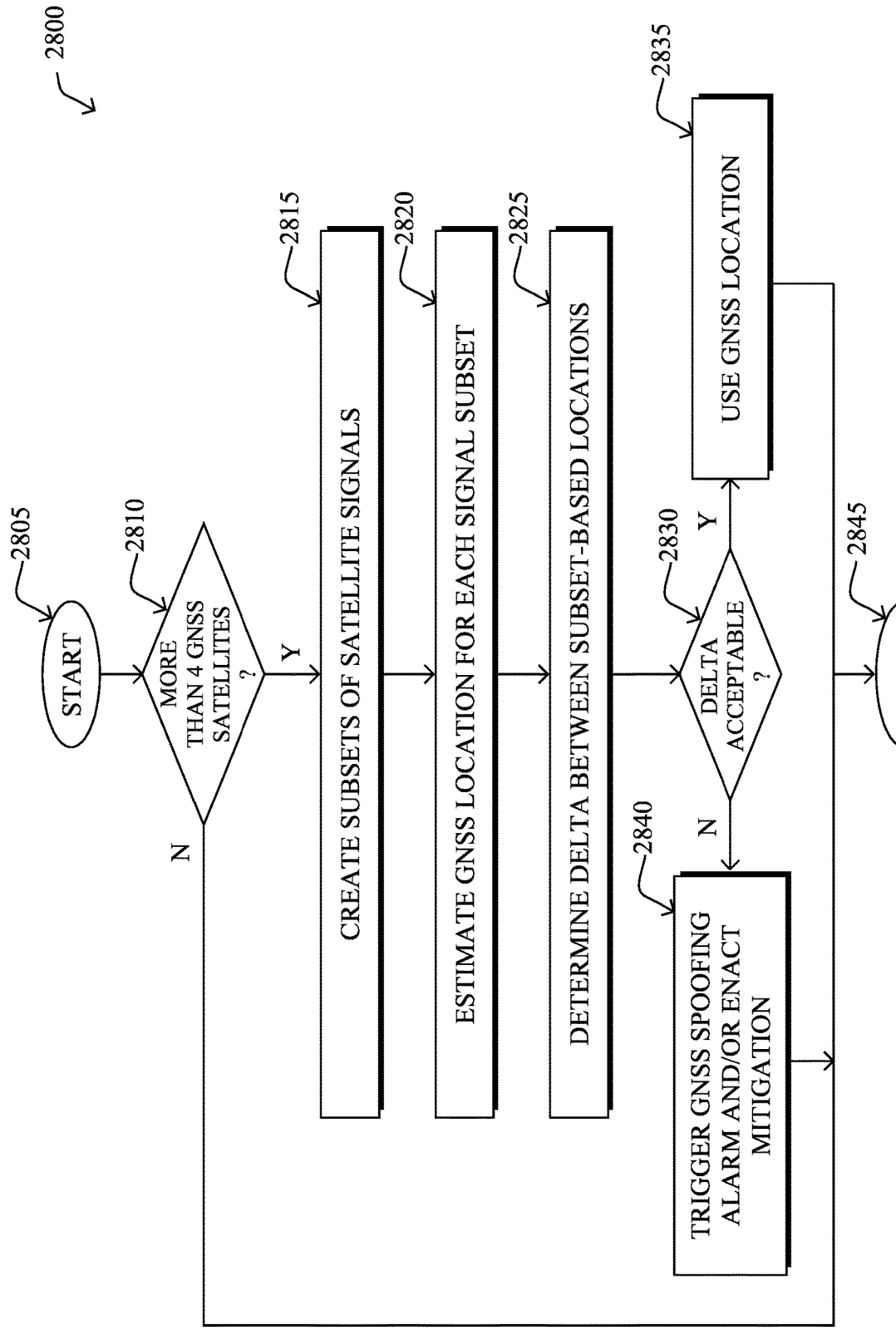
FIG. 28 illustrates an example procedure for GNSS spoofing detection based on GNSS signal subsets in accordance with one or more embodiments herein.

FIG. 28 is a simplified illustration for a process for detecting GNSS spoofing according to this particular embodiment. The procedure 2800 starts in step 2805 and proceeds to operation 2810 where it is determined whether there are more than a sufficient number of GNSS satellites available (e.g., four, though at least 3 or more satellites at a minimum, such as with synchronized clocks or with other ranging techniques, such as the echo messages described herein). If there are only a sufficient number (e.g., four) GNSS satellites available in step 2810, then the procedure ends in step 2845 (i.e., GNSS location determinations based on subsets of measurements cannot be made and compared according to this embodiment). Note that if there are a sufficient number, a GNSS location can be determined, but if there are less than a sufficient number, then a GNSS location cannot be determined (at which time other mitigation techniques herein may take place to use a secondary location, accordingly).

However, if more than a sufficient number of GNSS satellites are available in step 2810 (e.g., more than four), the techniques herein may then proceed to step 2815 where a plurality of GNSS signal subsets with a sufficient number of signals are created as described above. These subsets are utilized in operation 2820 to estimate a plurality of GNSS-based locations, where each location is determined based on the corresponding subset of GNSS signals, accordingly.

Next, in step 2825, the techniques herein determine the distances (deltas) between the various location estimations, such that in step 2830 it can be determined whether the estimated locations are within a predetermined threshold distance from each other. If it is determined that the locations are in close proximity to each other, the techniques herein may thus determine that the GNSS signals have not been spoofed and proceeds to step 2835 where the location is estimated based on the complete set of GNSS signals. However, if step 2830 determines that the estimated locations based on the plurality of GNSS signal subsets are different by an amount greater than the predetermined threshold (e.g., each spread out across too large an area, or at least one or more specific outliers), the procedure continues to step 2840 where an alert may be triggered to invoke operations under GNSS spoofing (e.g., enacting one or more mitigation mechanisms), such as employing the operations described with respect to the secondary location determination operations described herein, or other mechanisms. The procedure then ends in step 2845.

Additionally, certain embodiments herein may also be further directed to a hybrid technique, where different location systems/hardware are used in fused combinations to determine one or more outlier (and potentially spoofed) systems. For instance, a first location determination may be made based on a first fusion algorithm using input from a first plurality of location hardware/systems (e.g., US GPS and WAI messages), and a second location determination may be made based on a second fusion algorithm using input from a second plurality of location hardware/systems (e.g., the European Galileo positioning system and WAI messages), specifically where at least one hardware device from the second plurality of location hardware is not within the first plurality of location hardware. Additional combinations (e.g., GPS and Galileo) may also be used, such that in a manner similar to that described above, a likely erroneous system (e.g., compromised, spoofed, or otherwise) may be detected in the event that the subset combinations of fused system location determinations do not properly align.

Note that in each embodiment described above for GNSS spoofing detection, other criteria may be used in accordance with various methods described herein, such as, e.g., a boat determining its position on land rather than in the water, a car determining its position off the road or in the water, a device exhibiting a substantial step change in its estimated location which cannot be explained just by fast movement, other anomalous locations or behaviors, etc. As such, GNSS spoofing detection, in general, may use the specific embodiments detailed above, or also other techniques, such as those mentioned herein or otherwise, to create a determination that the GNSS based location is likely inaccurate, and to optionally trigger one or more mitigation reactions, accordingly.

Mitigation of GNSS denial, according to the present disclosure, can take many forms once a GNSS denial (jamming, spoofing, or otherwise) is detected and declared, in addition to alarms/alerts/notices/etc. For instance, in one embodiment where a primary location system (e.g., GNSS) and secondary location system (e.g., WAI messages, etc., from above) are used, a mitigation technique may be to switch from the primary location to the secondary location system. Note that secondary location systems may also include other satellite systems (e.g., switching from the US GPS to the European Galileo positioning system, etc.), as well as non-satellite systems, such as pilotage, vision-recognition-based navigation, long range navigation (LORAN), enhanced LORAN (eLORAN), very high frequency (VHF) omni-directional range (VOR) navigation, "signals of opportunity", celestial navigation, map and compass, and so on. Where a secondary location system doesn't exist, the mitigation instructions may instead merely be to stop using the primary location system as it is untrustworthy.

According to one or more embodiments herein, once a primary location system is switched over to a secondary location system, the techniques herein may continue to occasionally check the location of the mobile device based on the primary system, and based on the confirmations and comparisons described above to detect spoofing, or in the absence of a jammed signal (i.e., in the presence of a non-jammed signal), may resort back to the primary location system, accordingly.

In another embodiment herein, when it is determined that any particular GNSS satellite is being jammed or spoofed, the techniques herein can account for this in the future (and/or report it to other devices), such as to remove this satellite from location calculations (e.g., specifically excluding GNSS satellite $S_5$ from the example above in FIG. 27). In one embodiment, such as where the removal of a single satellite (or multiple satellites) from a GNSS calculation would result in an inability to calculate a location, or where the accuracy of the calculation is too greatly diminished, the techniques herein may use various system fusion algorithms to complete a location determination, accordingly. For instance, in this example, where GNSS satellite $S_5$ has been jammed/spoofed, the techniques herein may replace this satellite input (for use in a trilateration location computation) with a different GEO/LEO communication satellite through the use of a WAI message (e.g., in a direction near GNSS satellite $S_5$, or at least in a direction diverse from the other remaining GNSS satellites being used in the calculation). In general, resilience in radio communications comes from diversity, which can be in the form of many channels, switching between multiple frequency bands, many satellites, different antennas, using encrypted WAI messages, and different modulations. That is, if one signal cannot get through to the desired target via one path, then having a diversity of choices, including through different hardware systems and operations, is likely to permit a different measurement to get through.

Figure 29:
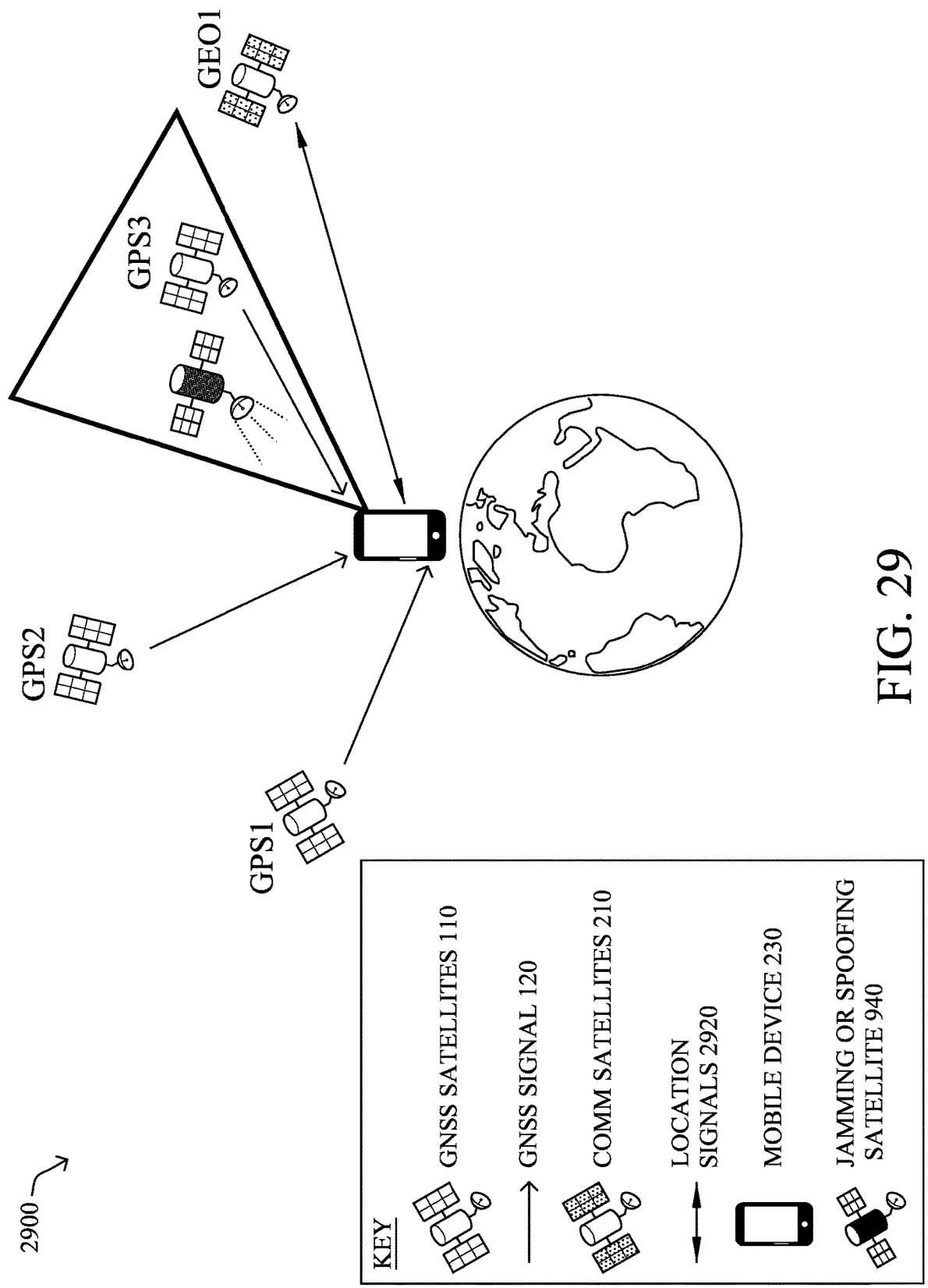
FIG. 29 illustrates an example of location signal replacement in accordance with one or more embodiments herein.

An example of this "replacement" embodiment is shown in FIG. 29, where simplified environment 2900 shows illustrative GNSS satellites 110 (GPS1, GPS2, and GPS3), and at least one communication satellite 210 (GEO1). As shown, assume that a jamming or spoofing satellite 940 is blocking the GNSS signal 120 from GPS3 from being received or deciphered by the mobile device 230 (again, as noted, figures not drawn to scale). According to the techniques herein, therefore, the mobile device may use GNSS signals from GPS1 and GPS2, and may use location signals 2920 (e.g., WAI messages or otherwise, as described above) from a similarly situated communication satellite, such as GEO1. In this manner, the location of mobile device 230 may be determined through trilateration of two GPS signals and one WAI message signal, in the example. (Note that any combination of systems may be used, and any number of satellites may be used, such as, e.g., for four satellites, three GNSS satellites and one GEO satellite, two GNSS satellites and two GEO satellites, one GNSS satellite and three GEO satellites, and so on for greater numbers of satellites or even the inclusion of other systems entirely, including earth-bound distancing to objects of known locations.)

Notably, unlike GNSS signals that are static and not configurable (e.g., GPS signals that are limited within a specific ~10 MHz bandwidth), the dynamically configurable system in accordance with the techniques herein allow for on-demand adjustments to the location messages on a number of parameters. For instance, through the use of two-way ranging instead of one-way receiving, the system is no longer limited to a single, fixed-frequency broadcast like GNSS. In addition, control messages may be sent and/or schedules may be set in advance to provide for negotiated frequency reassignments, allowing for dynamic frequency choices, even where one-way ranging is used. Notably, since GEO satellites are "bent pipes" (i.e., the "u-bend" principle, sending back to Earth what goes into the conduit with only amplification and a shift from an uplink to a downlink frequency) and provide 500 MHz of frequency availability, a 4 MHz-wide ranging signal can be placed almost anywhere within that spectrum. In accordance with another embodiment herein, therefore, when it is determined that any particular communication satellite 210 is being jammed or spoofed, the techniques herein can account for this through cognitive measures that autonomously move to other frequencies, whether on-demand or via frequency-hopping schedules, to continue to operate on that frequency uninterrupted. Other dynamic parameters, such as encryption, timing of messages, embedded signatures, and so on may also be adjusted in response to detection of spoofing or jamming. In particular, as mentioned above, mobile devices and ground stations may cooperate to exchange messages that would update the communication parameters in a way to avoid spoofing or jamming, such as by changing bandwidth, band, spread spectrum code, encryption, etc. Note that such reconfiguration messages may be initiated by either the mobile device or the ground station, and may be initiated by the device detecting the spoofing/jamming or by the device learning of such detection of spoofing/jamming (e.g., the mobile device detects spoofing and notifies the ground station, and the ground station initiates a change in communication parameters).

Figure 30:
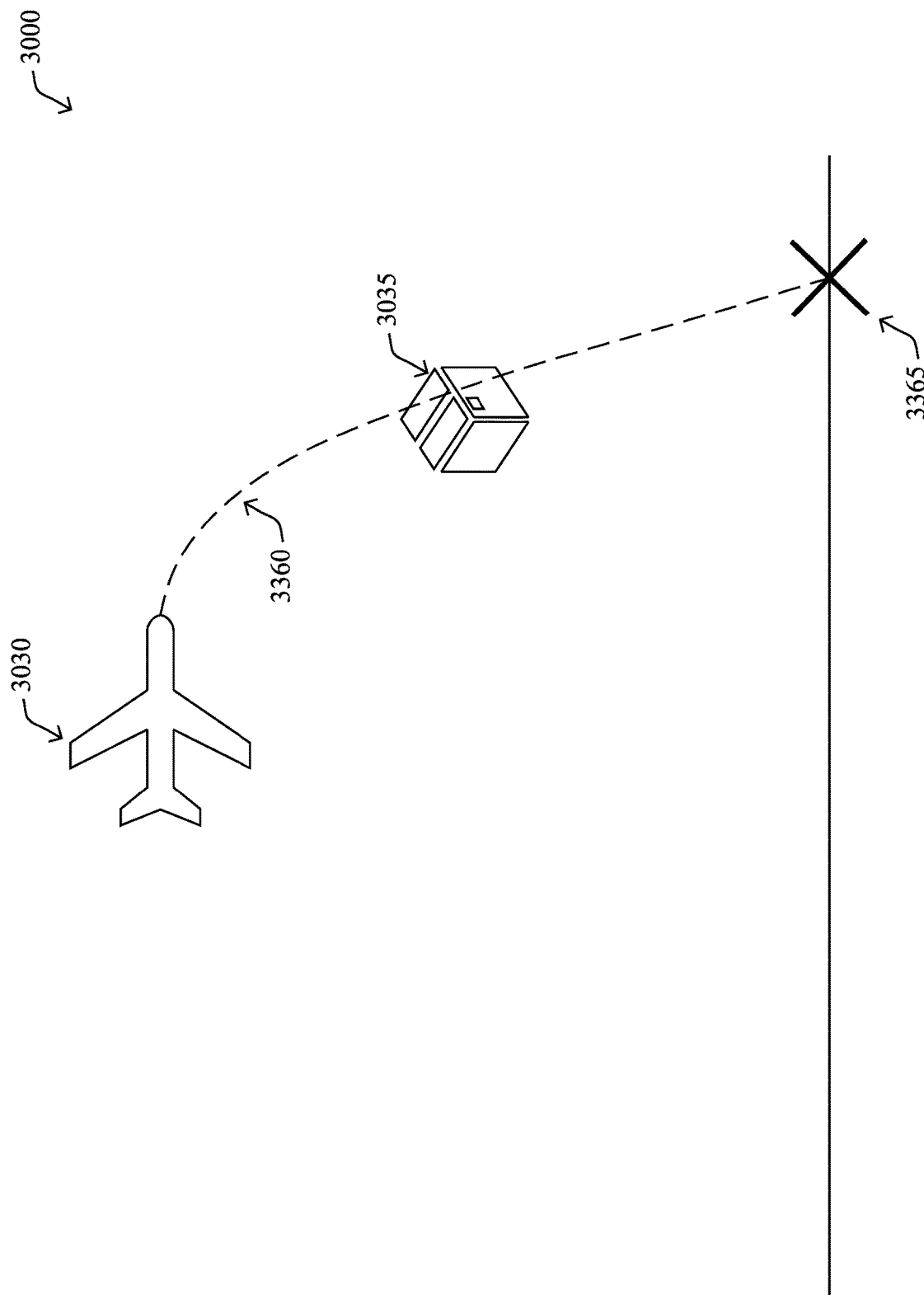
FIG. 30 illustrates an example of autonomous cargo delivery in accordance with one or more embodiments herein.

Mitigation responses to jamming and/or spoofing may also involve physical reactions, such as deciding to perform or not perform a particular action. For example, and with reference to environment 3000 of FIG. 30, an aircraft 3030 (e.g., airplane, drone, etc.) may be prepared to drop cargo 3035 onto an intended target location 3065 (e.g., manually released or due to autonomous deployment of cargo). In some instances, the cargo is expected to traverse a path 3060 to target location 3065 based on momentum, gravity, wind direction, and so on (e.g., with a parachute or not), while in other instances, the cargo has one or more on-board directional control mechanisms to manipulate its trajectory along the path 3060 based on wind, GNSS location, visual guidance, and so on, to reach the intended target location 3065. According to the techniques herein, various mitigation measures may be taken based on detection of spoofing/jamming according to the configuration of the cargo 3035. For instance, the aircraft 3030 may detect a GNSS denial situation, and may decide that the cargo 3035 should not be dropped at all, especially if the cargo uses the same GNSS-based locating to guide itself toward the target. Alternatively, the aircraft 3030 may instruct the cargo 3035 that GNSS denial is occurring, and that the cargo should use its secondary locating system (where the cargo has such an alternate on-board navigation system), whether satellite-based as described above, or based on vision only, or accelerometers, etc. Other physical reactions may be based on detection of jamming/spoofing, and FIG. 30 is meant merely as one possible implementation of the techniques herein.

Additionally, another mitigation action that may be taken according to the techniques herein involves detection of the spoofing/jamming by one device, and alerting and/or instructing one or more other devices based on the spoofing/jamming. For instance, often times, such as in the example above, one primary device may have more processing capability or may have a secondary location system whereas another secondary device has less capability or no secondary location system. As such, the techniques herein allow for coordinated communication and control between the devices to react to detected GNSS denial.

Figure 31:
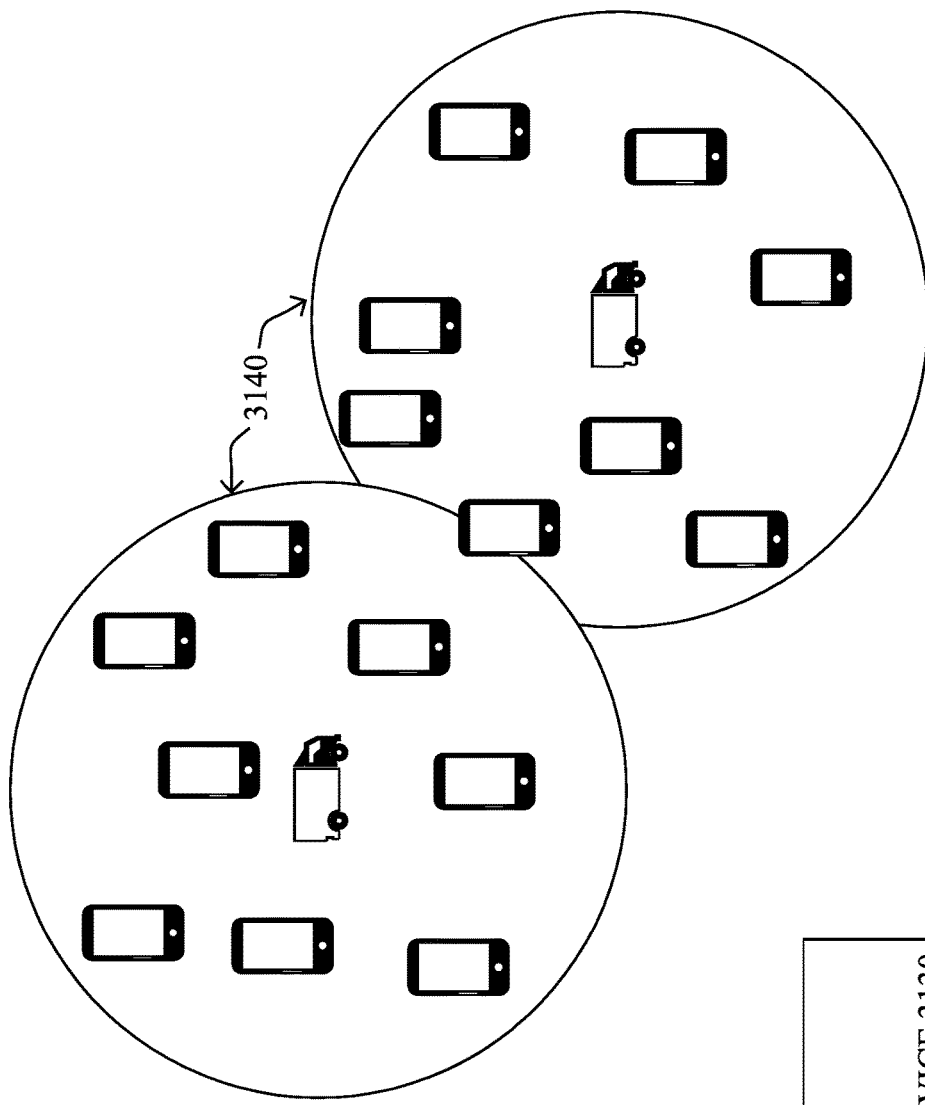
FIG. 31 illustrates an example of a primary device controlling location behavior of secondary devices in accordance with one or more embodiments herein.

As an example, FIG. 31 illustrates an environment 3100 in which a plurality of primary devices 3130 and a plurality of secondary mobile devices 3135 dispersed throughout a particular region (note that one or more of the primary devices 3130 and/or secondary mobile devices 3135 may be a mobile device 230 generally herein). In accordance with the embodiment mentioned above, assume that primary devices 3130 has a first locating system and a second locating system, as described above, where the primary device may be mobile (e.g., a vehicle as shown, or other devices, such as designated mobile devices that are the same as secondary mobile devices, etc.) or stationary (e.g., an installed device within a building or command post, an installed communication tower, etc.). The secondary mobile device(s) 3135 may be handheld devices as shown, or may be other vehicles, IoT devices, and so on, and may, though need not, have both a primary location system and a secondary location system. The primary devices 3130 may be in communication with any number of secondary mobile devices within respective communication ranges 3140 through local communication as shown (e.g., wireless peer-to-peer communication, wireless mesh network communication, near field communication, etc.) or in certain configurations, through longer communication protocols (e.g., cellular, wireless networking, etc.).

Based on one or more of the techniques herein, the primary device(s) 3130 may detect a jamming and/or spoofing situation, such as by using any of the techniques described in detail above, such that in response to such a situation, may alert other nearby (within range 3140) secondary mobile devices 3135. The alert may then cause and/or instruct the secondary mobile devices to perform mitigation actions, such as to invalidate primary location system locations, revert to a secondary location system location (if equipped), listen for secondary location information shared by the primary device, and so on. In this manner, the secondary mobile devices 3135 need not monitor for jamming or spoofing situations, but instead may rely on their primary locating system (e.g., GNSS) until told otherwise by a primary device. (Those skilled in the art will appreciate that the communication between the primary and secondary devices may be secured to further prevent tampering, and that the description above is merely a simplified example of operation demonstrating one of the many mitigation capabilities of the techniques within the scope of the present disclosure.)

One important consideration for the techniques herein is that for a directional antenna on a mobile device 230, an assumption to communicate with a communication satellite 210 in a given location is that the mobile device knows its location at least approximately, even if not accurately (e.g., due to the typically wide-lobe antenna pattern of illustrative mobile device antennas herein). As such, if a mobile device is being GNSS denied (jammed or spoofed) at a particular time, it may not know specifically where it is located at that particular time, accordingly. The techniques herein thus also provide one or more mechanisms to address this concern.

Figure 32A:
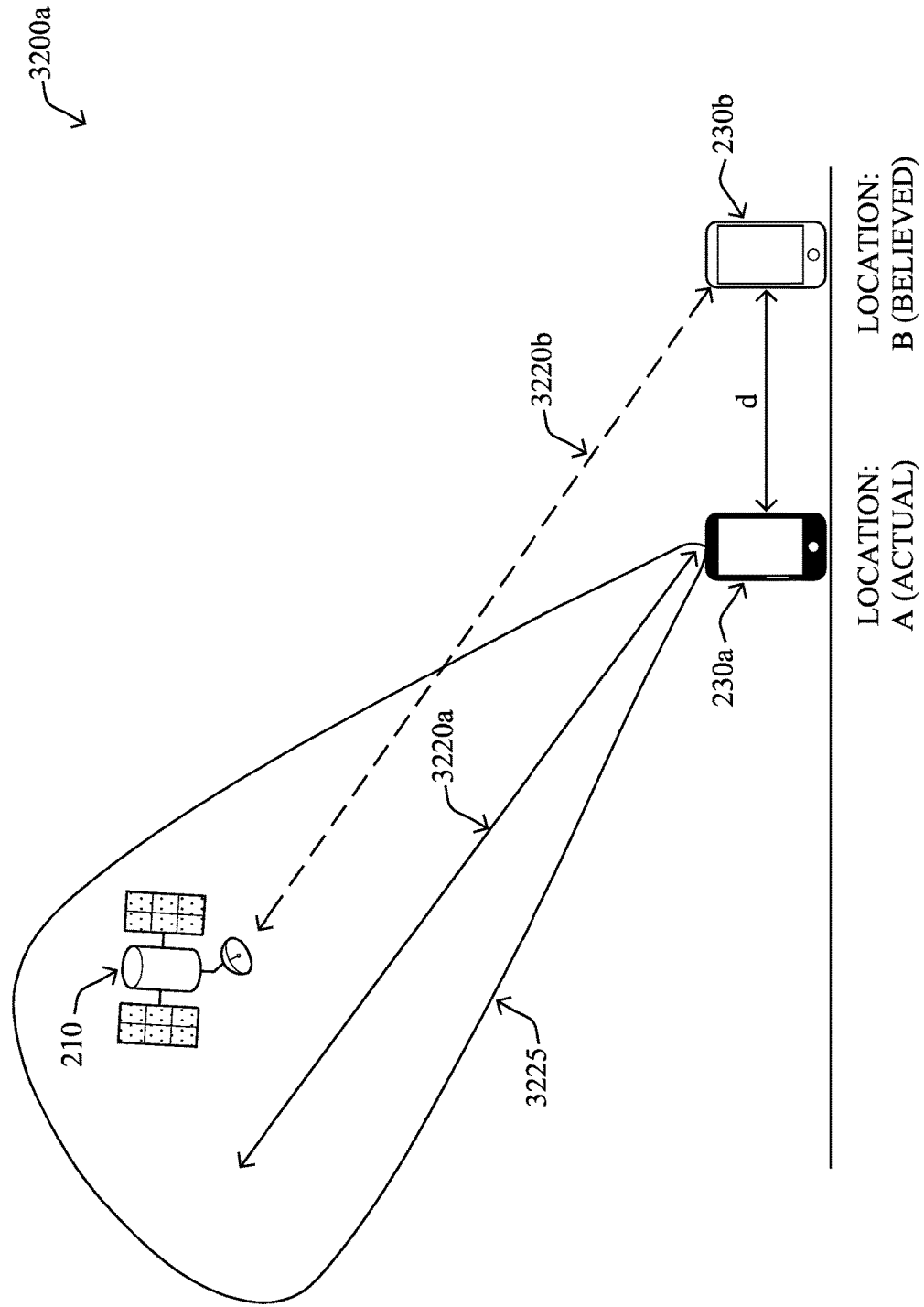
FIGS. 32A-32C illustrate examples of directional antenna aiming considerations in accordance with one or more embodiments herein.
Figure 32B:
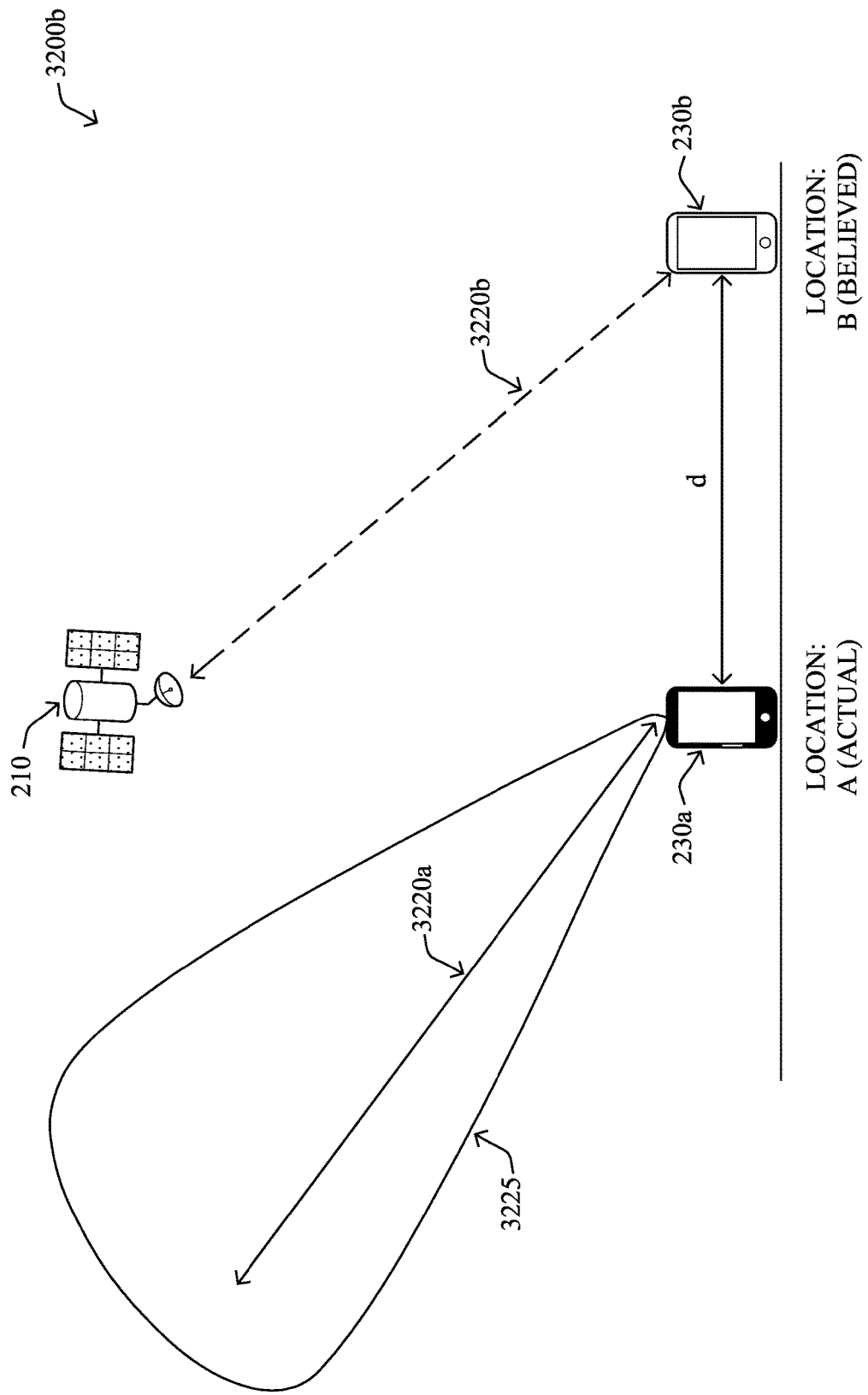

In particular, as shown in FIG. 32A, environment 3200a illustrates that a mobile device is actually in location A (mobile device 230a), even though it "believes" it is in location B (mobile device 230b), separated by some distance "d". This may occur based on inaccuracies in calculations, spoofing, jamming, movement since a last location determination, and so on, as mentioned above. As such, when aiming at communication satellite for transmitting or receiving a signal, the mobile device may believe it is aiming for signal 3220b, when in fact it is aiming for signal 3220a. The tolerance of how much error there is the location of the mobile device (i.e., the size of distance d) for communication success between the satellite and the mobile device is based generally on the antenna properties, namely how wide the antenna lobe 3225 is. For instance, as shown in FIG. 32A, the wide antenna lobe 3225, despite the mobile device 230a believing it is in a different location (230b), may still reach the communication satellite 210 for a successful communication. In this manner, the techniques herein may still be able to perform the locating message protocols described above, even where there is a distance d separating the device's believed location B from its actual location A. As shown in FIG. 32B, however, environment 3200b illustrates the scenario where the lobe 3225 does not reach the communication satellite due to distance d being larger than the tolerance would allow.

In accordance with one or more embodiments of the techniques herein, various mechanisms may be used to attempt to mitigate against the error between a believed location and an actual location (the distance d) in order to ensure that the communication satellite 210 is reachable, especially since the mobile device, in the embodiments described above, communicates with the satellite 210 to determine its location in the event of the believed location (230b) being incorrect (jammed, spoofed, or otherwise). In one embodiment, the mobile device stores its last known GNSS position (e.g., based on utilizing a dead reckoning method), or a history of selected last known GNSS positions, for reference when a jamming or spoofing occurs. As such, the last known position(s) may then be used as a reference point that is sufficient for communicating with the satellite 210. That is, in one example, the device may have remained stationary, or within a small enough distance d, since the last known location, such that when either a jamming occurs (where no location is known via GNSS) or a spoofing occurs (the mobile device now believes it is in a different location), the techniques herein my thus resort to the last known location for aiming the antenna (e.g., from the dead reckoning method). In another embodiment, the mobile device has one or more position/movement sensors (e.g., gyros, accelerometers, compass, etc.) that may roughly track motion of the device as noted above. As such, the mobile device may resort to a last known location (e.g., confirmed to be correct/un-spoofed), and can apply an estimate of movement since that last location to bring the believed location closer in line with the actual location, accordingly. Again, given the wide lobe of the illustrative mobile device antenna, this rough estimate location may be close enough to reach the communication satellite and to refine (and maintain) the actual location of the mobile device according to the techniques described above.

In one embodiment, too, in the event that the mobile device 230a believes it is in location B based on GNSS positioning (with or without accounting for movement of the device since a last known location, as noted above), and attempts unsuccessfully to aim its antenna for a communication to/from satellite 210 (e.g., the scenario shown in environment 3200b of FIG. 32B), then the techniques herein may declare that the GNSS signals may have been spoofed. In other words, if the mobile device believes it is in a location where it should be able to communicate with a certain satellite by aiming in a certain direction, and yet cannot do so, then it can be assumed that the mobile device is not actually where it is believed to be, and thus the GNSS positioning is likely spoofed. (Note that it is unlikely that the communication satellite is being jammed or is otherwise missing, however if the communication satellite is merely unreachable, the techniques herein may still treat that particular satellite as being denied, and would attempt location messages to other communication/GEO satellites as described above.)

Figure 32C:
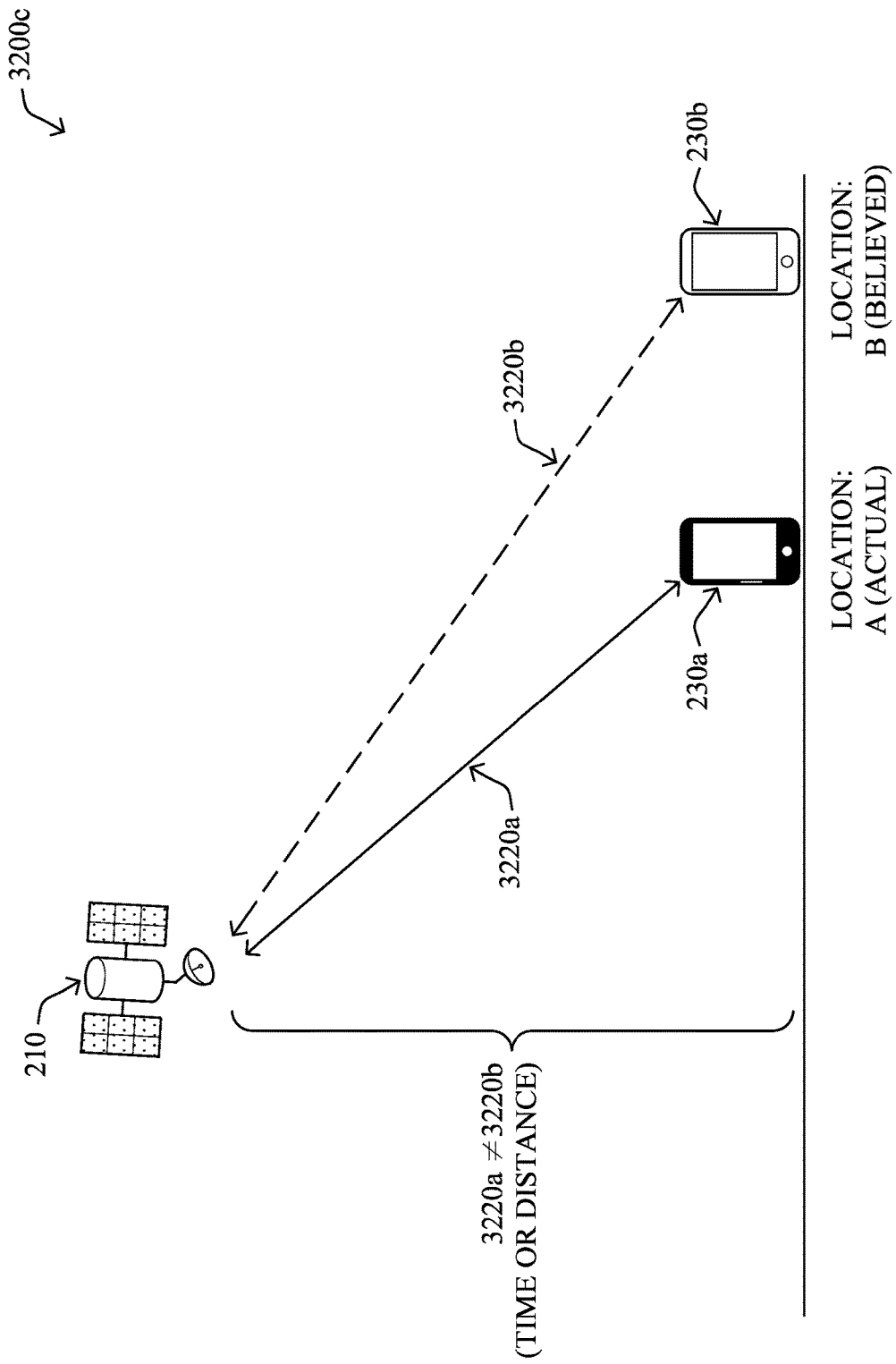

In one additional embodiment, and with reference to environment 3200c shown in FIG. 32C, assuming the antenna lobe from mobile device 230a can still communicate with the satellite 210 (e.g., lobe 3225 of FIG. 32A, above), then the location measurement techniques above may further be used to detect a spoofing attack (or other error in GNSS-based locations). In particular, if a mobile device believes it is in location B (230b), then correspondingly it would be assumed that the length of communication 3220b (in time or distance) should be one value. However, based on the techniques described above, when ranging calculations are performed on the actual communication 3220a, it may be determined that the length (time or distance) of 3220a does not equal the expectation of 3220b, and as such, the system herein may declare a potential spoofing has occurred.

For example, the communication 3220a may be initiated not in response to a spoofing, but instead to either confirm a location (i.e., to check for spoofing), or else as a general communication (e.g., data or other communication being transmitted to a ground station, not shown in FIG. 32C), which may also include an indication of a believed location B for the mobile device. Based on the techniques described above, therefore, whether based on clock synchronization or self-clocked echoed messages, the actual length in time or distance between the mobile device 230a and satellite 210 (i.e., length of signal 3220a) can be compared to the expected length of signal 3220b, such that any error (e.g., above an acceptable threshold) of that one segment may trigger a potential spoofing, accordingly. Note that this determination may be made at the mobile device 230 in accordance with WAI messaging techniques above (i.e., messages sent from the mobile device and echoed back via the satellite and optionally the ground station) and/or WYA messaging techniques above (i.e., time-synchronized messages sent from the ground station to the mobile device). Alternatively, this determination may be made at the ground station 650 (not shown in FIG. 32C) in accordance with WAY messaging techniques above (i.e., messages sent from the ground station and echoed back via the satellite and the mobile device) and/or WIA messaging techniques above (i.e., time-synchronized messages sent from the mobile device to the ground station).

The ability to check for spoofing using a singular measurement in this manner not only alleviates the need to obtain a full location fix from a plurality of communication satellites to detect a spoofed GNSS situation, but also more readily allows for general communication messages to be used for the dual purpose of spoofing detection. For instance, rather than (or in addition to) checking specifically for spoofing using a determined location (based on a plurality of satellite ranges), the techniques herein may opportunistically use communication messages (e.g., sending data, text, etc.) in the manner described above to detect a single unexpected difference in range to a communication satellite, which could be used to detect a spoofed location. Additionally, in this manner, this particular technique may be used to merely initially trigger a potential spoofing incident, which may then result in a full location determination using additional communication satellites as described above for a conclusory spoofing determination (e.g., based on difference in determined location rather than merely the single range difference). This may also be beneficial, for instance, where clocks are not perfectly synchronized between the ground station and mobile device, and the mis-matched range determination between the mobile device and the satellite, which may be based on clock error, may be confirmed using the precision self-clocked echoing techniques that do not require synchronized clocks, accordingly.

Notably, while the communication-satellite-based geolocation techniques described above would be able to provide meter-level accuracy, in order to achieve meaningful results in this range, a very high accuracy x,y,z position of each communication satellite (GEO and/or LEO) is required. Although the North American Aerospace Defense Command (NORAD) maintains the orbit data of GEO satellites, it currently only does so to the precision of approximately one kilometer (1 km) to 1.5 km, and GEO satellite operators do not claim to know the positions of the satellites any better. Specifically, since GEO satellites were traditionally used for communication purposes, e.g., conveying voice, text, and video between distant locations, knowing the location of a GEO satellite within this 1.5 km "box of uncertainty" (e.g., an approximately 1.5 km region/vicinity within which a satellite traverses a generally consistent path over time) has been acceptable for aiming of a directional communication antenna. However, this seemingly small ambiguity of location in space is not sufficient for providing a reference point for highly accurate ranging to be used for positioning determinations and geolocation, as truly accurate geolocation of a mobile device requires a satellite position precision on the scale of meters (notably from a spacecraft that is ~36,000 km away, which is about one tenth the distance to the moon). From the perspective of a mobile device at mean sea level (MSL), this is a measurement accuracy of less than $10^{-5}$ degrees, a particularly challenging requirement.

Regarding accuracy of the locations provided using the techniques described herein, therefore, in order to provide a highly accurate location determination, the location of the communication (e.g., GEO) satellites must be known with high accuracy. Once a highly accurate location of a given satellite is determined, it can then be used by the techniques herein in correlation with the determined ranges/distances from the mobile device to the satellites for the trilateration calculations, to thus determine a highly accurate location of the mobile device, accordingly.

In one embodiment, therefore, an improved accuracy system in accordance with the present disclosure utilizes the known (and accurate) location of the GNSS satellites to more accurately determine the location of the communication (e.g., GEO) satellites by defining a "modified" Delta-Differential One-Way Ranging ("Delta-DOW" or "ΔDOR") technique. Specifically, the techniques herein can achieve an extremely-high precision localization of the communication satellites 210 above to an x,y,z position accuracy of ~10 m using the concept of differential interferometry, as described below.

In particular, Very Long Baseline Interferometry (VLBI) is a technique that has been used to determine precise locations of bodies in space, allowing for a determination of angular position for distant radio sources by measuring a geometric time delay between received radio signals at two geographically separated stations. (As described below, the observed time delay is a function of a known baseline vector joining the two radio antennas and the direction to the radio source.) The National Aeronautics and Space Administration (NASA) had developed the Double-Difference Very Long Baseline Interferometry (DD-VLBI) technique to provide meter-level accuracy of spacecraft landing on the moon. DD-VLBI evolved into the Delta-DOR technique, which uses two widely separated antennas to simultaneously track a transmitting radio source in order to measure the time difference (delay time) between signals arriving at the two stations. That is, Delta-DOR is an application of VLBI where spacecraft measurements are obtained from the phases of tones emitted from the radio sources, first detected separately at each station, and then differenced. Delta-DOR is now commonly used in radio astronomy to determine the relative position of numerous astronomical bodies, delivering a delta (difference) angle from a known location datum in the sky.

Figure 33A:
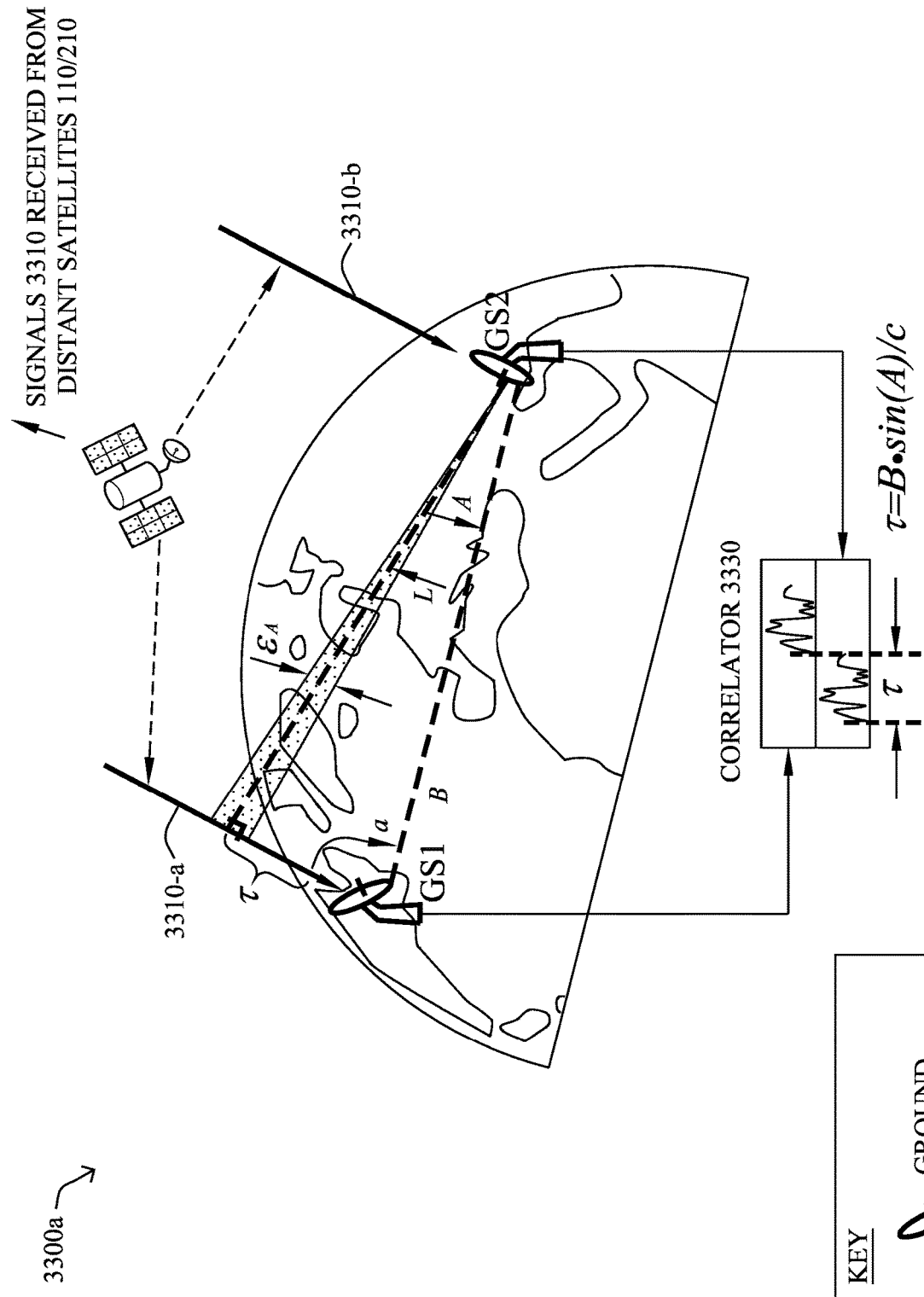
FIG. 33A illustrates an example of differential one-way ranging (DOR) for accurate locating of a communication satellite in accordance with one or more embodiments herein.

Specifically, for a better understanding first of differential one-way range (DOR), reference is made to the geometry of environment 3300a of FIG. 33A in accordance with one or more embodiments herein. DOR itself is the measure of the difference in arrival time (τ) of a signal 3310 at two ground stations 650, e.g., antennas of ground stations GS1 and GS2, receiving signal 3310 as 3310-a and 3310-b, respectively, as shown. Note that only a range difference, rather than an absolute range, is determined using DOR for the purpose of determining an angular difference in the received signal, and that an actual range to the satellites may be determined according to standard techniques (e.g., for GNSS) or using the communication satellites here (e.g., echo ranging).

The radio waves (signals 3310) from the target satellite 110/210 arrive in approximately parallel rays at the interferometer, which is a system formed of the two receiving antennas and an imaginary line that connects the two antennas called the "baseline" (denoted as "B"). The difference in parallelism between the received signals may be based on a perpendicular reference line "L" to a particular incoming signal (e.g., 3310-a), and an angle "A" is shown between B and L. The difference in arrival time (τ) can thus be computed as follows:

$$\tau = B \sin(A)/c \qquad \text{Eq. 8a;}$$

or for determining the angle "a" between the baseline B and signal 3310-a:

$$\tau = B \cos(a)/c \qquad \text{Eq. 8b;}$$

where "c" is the speed of light (or, more the particularly the speed of propagation of signals 3310). The value of τ can be determined through a correlator 3330 by matching the incoming signals, and determining the synchronization difference, accordingly. (Note that τ may also be converted to a distance (e.g., Range "R") using standard conversion, e.g., multiplying by the speed of light c.) Through solving either of Eqs. 8a/8b for the respective angles, DOR can thus determine the relative angles from each ground station 650, which can produce a reasonably accurate location of the satellite 110/210 in combination with determined ranges to the satellite, accordingly.

Note that the observable here is an uncalibrated delay between the two antennas, and there is an uncertainty in angle A, denoted "$\varepsilon_A$". In particular, while in theory the delay-based value of τ depends only on the positions of the two antennas and the satellite, in reality, the delay is affected by several sources of error, particularly, for example, media effects on the separate signals (such as how the signals travel through the troposphere and ionosphere to the respective antennas), as well as other factors such as solar plasma and clock instabilities at the ground stations. As such, DOR provides only general information about the angular position of the target satellite, and greater accuracy may be necessary for highly accurate ranging techniques described herein.

Accordingly, Delta-DOR produces a more meaningful measurement for location determination than DOR itself, as Delta-DOR corrects these errors by tracking a reference object in angular proximity to the target satellite with a known and highly accurate position. That is, to calibrate the interferometer against these effects, a DOR measurement may be made on a reference source that is near the target spacecraft in an angular sense, and then the individual DOR results are differenced (a Delta-DOR measurement) to cancel out the error-inducing effects (i.e., any errors which are station or path dependent will cancel), resulting in much smaller measurement errors. Thus, one is able to evaluate a potentially error-free relative station delay, which leads to an accurate determination of the satellite position in the plane of the sky.

Radio astronomers today commonly use large antenna measurements of quasars for their reference datum locations. Rather than using quasars, however, the techniques herein may use GNSS satellites (e.g., GPS satellites, Galileo satellites, etc.) as reference datums to determine the position of the communication satellites (e.g., GEO or LEO satellites). In particular, with reference to environment 3300b of FIG. 33B, and as described in greater detail below, a "modified Delta-DOR technique" herein uses ranges/distances and angles as discussed to comparatively determine the position of the communication satellites, but instead of stationary reference objects (e.g., quasars), moving objects (with known locations at a given time) may be used (e.g., GNSS satellites 110). In addition, communication satellites 210 may be caused to return the signals 3320 used for the corresponding DOR computations based on signals originated from the ground stations 650 (e.g., the echo messages described above).

Specifically, the GNSS satellites 110 are medium earth orbit (MEO) and orbit the earth a few times per day. When one of these GNSS satellites moves close enough in angle (θ), the techniques herein can compare the signals between the GNSS satellite and GEO satellite, accordingly. In one embodiment, the GNSS satellite may be within the beam of a Delta-DOR antenna (e.g., on a ground station 650) aiming at a GEO satellite 210, and the signals can be obtained contemporaneously. In another embodiment, the GNSS satellite may be in a location that may still be within an acceptable angular proximity for use in Delta-DOR, but that may require moving/repositioning the ground station antenna. (Those skilled in the art will appreciate that multiple measurements may be made for interpolation in order to compensate for the time difference in measurements.)

Notably, the extent to which error sources (such as distortion caused by the earth atmosphere) cancel between the target device (e.g., communication satellite 210) and reference object (e.g., GNSS satellite 210) depends on the angular separation of the two sources being observed. That is, since the intent is to have two sources whose signals traverse generally similar paths through Earth's atmosphere, it is generally accepted that the maximum angular distance (angle θ) between the objects (i.e., the satellites herein) should not exceed 10 degrees.

Through the modified Delta-DOR technique herein, as described in greater detail below, a ground station 650 (or other equipped device) may thus determine the precise location of the GEO (communication) satellites by processing the phase of the signals it receives from the GEO satellites and the phase of the signals it receives from whichever GNSS satellites are within acceptable angular proximity at the time using the Delta-DOR method, which amounts to an accurate angle calculation of the GEO satellite based on mitigating any errors as noted above according to the DOR calculation of the with reference to a GNSS satellite is an angular proximity whose location is known with high accuracy. (Note that the angle A/α of the GEO/communication satellite and the GNSS satellite, as well as the difference θ between them, are based on a vertex being a particular reference ground station antenna, and the two sides of the angle being the ray between the particular reference ground station antenna and the ray formed by a baseline between the reference ground station antenna and a second ground station antenna used in determining the angle, as described below.)

As an example, the exact positions of GNSS satellites are generally updated every few hours by their management entities (e.g., the United States Air Force updates the positions of their GPS satellites every four hours), typically with an accuracy on the order of a meter. Coupled with range measurements (via two-way time transfer ranging described above, or otherwise), the angle measurement of the GEO satellite, compensated for errors based on Delta-DOR calculations using the highly accurate position of the nearby GNSS satellite as described below, makes for a much higher resolution determination of the GEO satellite's position. The highly accurate location of the GEO satellite may then be used for the techniques described herein to determine the location of a mobile device (e.g., using the WAI messages or otherwise along with trilateration techniques) with a greater degree of accuracy.

Figure 34:
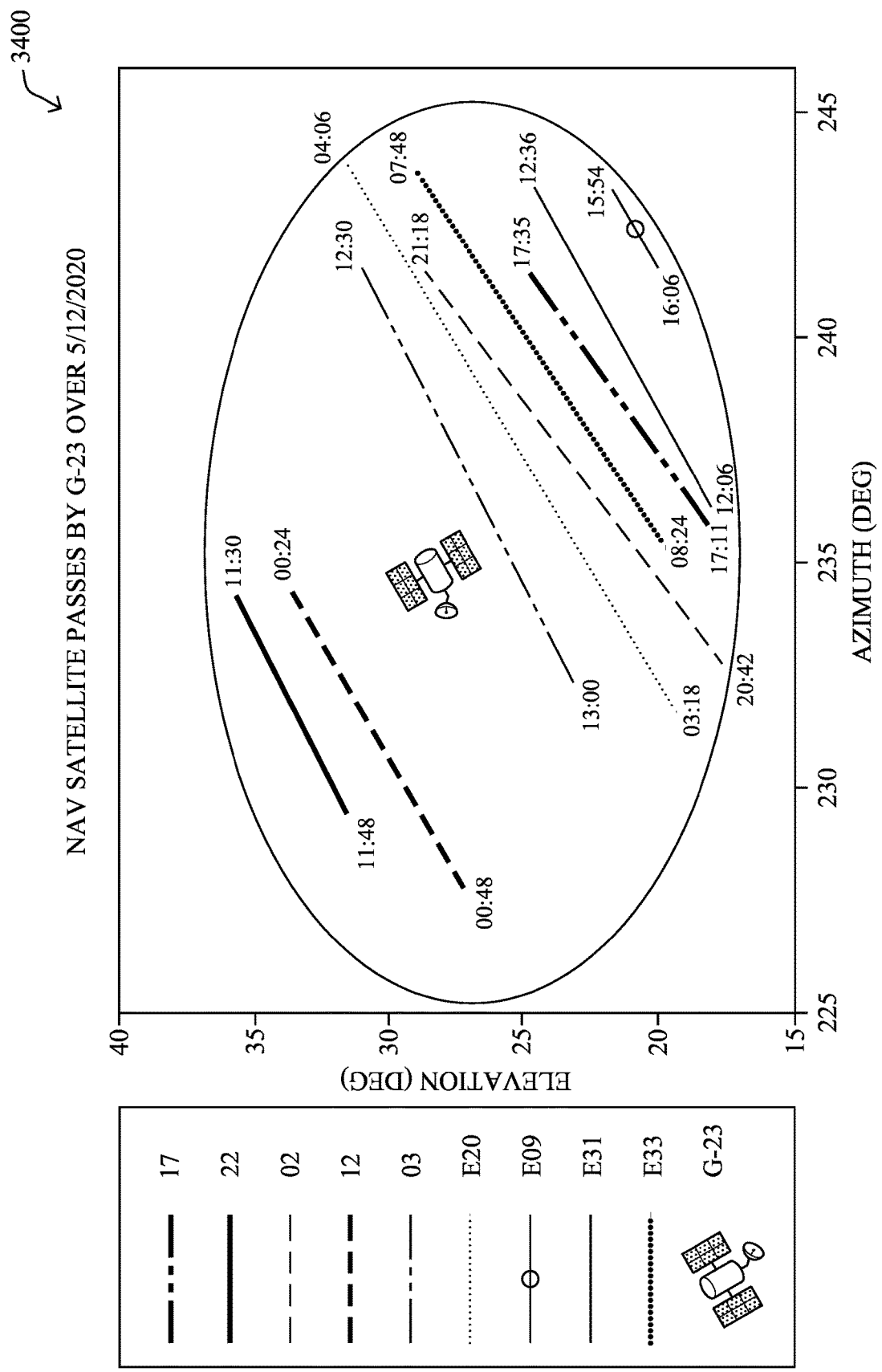
FIG. 34 illustrates an example of an example communication satellite and specific GNSS satellites passing in angular proximity over time for differential interferometry in accordance with one or more embodiments herein.

Since Delta-DOR works especially well when the delta angle (θ) between the two celestial bodies is within a given threshold of 10 degrees (because the differencing described below substantially eliminates common mode errors associated with similar traversal of the signals through the atmosphere), the techniques herein have defined a preferred (though non-limiting) 10-degree conjunction between measurement datum (notably first based on a general location of the communication antenna, which is then made more accurate according to the techniques herein). As shown in FIG. 34, from a study of satellite ephemerides, it has been determined that GNSS navigation satellites fly within the desired 10-degree tolerance window 3400 of a given GEO satellite commonly six to ten times per day, thus permitting an updated measurement of a GEO satellite every four hours (or so). For reference, FIG. 34 shows the "G-23" GEO satellite and the specific GPS satellites which pass in angular proximity to the GEO satellite (e.g., GPS satellites known as "17", "22", "02", "12", "03", "E20", "E09", "E31", and "E33"), including the specific date and times of the day wherein those satellites are in close angular proximity to the example G-23 GEO satellite. Accordingly, over the course of a day, the techniques herein now have a number of space datum with high known accuracy, and can thus track the accurate locations of the GEO satellites, as described below. In particular, any one of fifty or more GNSS navigation satellites may be used as position datums to determine various GEO satellite positions based on the known location of the GNSS satellites.

Referring again to FIG. 33B, interferometry is a technique that combines signals in a manner that can be used to extract information, such as to determine one or more observable differences in received signals, such as phase, frequency, etc., (e.g., radio signals 120 from GNSS satellites 110 and location signals 3320 from GEO/LEO satellites 210, such as the WAI, WAY, WIA, or WYA messages above, or other communications and/or ranging messages). The modified Delta-DOR positioning determination process herein, in particular, may utilize signals received at two different antennas located either at one or two different ground stations 650 to determine an angle to the GEO/communication satellite 210 (e.g., a DOR calculation), that is corrected based on also receiving radio signals 120 from a similarly angled GNSS satellite 110 to account for similarly encountered signal errors in the receipt of the location signals 3320 (e.g., a Delta-DOR calculation), as described below. The precise determination of the GEO/communication satellites location can take place once every predetermined time period, in a continuous manner, or can be triggered each time a mobile device sends a locating message (e.g., WAI message) to a ground station or vice versa.

The two antennas, which could reside in the same ground station though preferably in two different ground stations, as shown in FIG. 33B as different ground stations "GS1" and "GS2", may be employed to determine the location of a GEO satellite, e.g., "GEO1". Notably, these receivers (GS1 and GS2) may be clock aligned, though non-synchronized techniques may be utilized as may be appreciated by those skilled in the art. In accordance with one embodiment herein, the ground stations may utilize GNSS satellite "GPS1" as a reference point (datum) for which the location is known with high accuracy as described above, where GPS1 is determined to be currently within a predetermined angle in the sky with reference to the GEO satellite (from the perspective of the ground station antennas) whose location is being determined. (For example, to determine the location of GEO1, the ground station may determine that GPS1 is within close angular proximity to GEO1 at the current time, and that another GNSS satellite "GPS2" is in close proximity to another GEO satellite (e.g., "GEO2") at the current time, and so on. Also, at a later time, the ground station may determine that GPS1 is no longer within close angular proximity to GEO1, but that another GNSS satellite "GPS3" is within close angular proximity to GEO1 at that later time, and that still another GNSS satellite "GPS4" is in close proximity to GEO2 at that later time, and so on, and would use those GNSS satellites at that time, accordingly.)

Specifically, as shown in FIG. 33B, the signals from the communication/GEO satellite 210 (e.g., signals 3320 "S3" and "S4" from GEO1) and from the reference/GNSS satellite 110 (e.g., signals 120 "S1" and "S2" from GPS1) are received by the two antennas of the ground station(s) 650, GS1 and GS2, respectively (i.e., S1 and S3 received at GS1, and S2 and S4 received at GS2). Note that signals S1 and S2 are the same transmission from the reference (GNSS) satellite 110 (e.g., a single beaconed GNSS message), separated to indicate their respective angles and reception. Also, signals S3 and S4 are the same transmission from the communication (GEO) satellite 210, such as any opportunistic communication signal, a beaconed signal from the satellite, or else an initiated signal from a ground station (e.g., a single echo message as described above transmitted to the satellite, from which the same echoed message is received at the two or more ground stations, accordingly). Also note that while a certain number of antennas are shown and/or described, communication satellites and reference/GNSS satellite may use different antennas (e.g., one at each ground station for each frequency band, one narrow-band stationary antenna aimed at a GEO communication satellite and another moving and tracking an exact angle toward a GNSS satellite, etc.), and the view and description herein will be understood by those skilled in the art to merely be an example illustration. Further, single antennas may also be used for receiving both signals in certain situations, such as where signal configuration and antenna design so allows.

In one embodiment these ground stations are separated by a long baseline 3380, perhaps hundreds of miles (longer baselines equal better accuracies). In this case the ground stations may have aligned clocks by a mechanism such as an atomic clock/oscillator or otherwise. In another embodiment the ground stations are antennas separated by tens of meters, optionally kept synchronized directly from one oscillator/clock. In either case, the two antennas' received signals are processed using a modified Delta-DOR (differential interferometry) process resulting in an accurate angle determination of the communication satellite 210 (e.g., GEO1), notably with respect to similar atmospheric errors encountered by one of the nearby (e.g., within angular proximity) GNSS satellites 110 (e.g., GPS1). The communication satellite position may also be measured based on the time transfer ranging from the two or more ground stations 650, optionally obtained as described above (e.g., self-clocked echoing messages as described above or otherwise). In accordance with one specific embodiment the process includes angular estimation. In accordance with another specific embodiment the process includes multiple radial estimates. The variance characteristics of these angular and radial estimates are quite different and complementary, as may be appreciated by those skilled in the art.

As an example, a modified Delta-DOR computation herein may be based on determining two values, "Phase delta1" and "Phase delta2", where the Phase delta1 is used to compensate for atmospheric perturbation, and the compensated Phase delta2 may then be used to estimate the location of the communication satellite 210, as described above. In particular:

$$\text{Phase delta1} = \text{Phase } S1 - \text{Phase } S2 \qquad \text{Eq. 9a;}$$

$$\text{Phase delta2} = \text{Phase } S3 - \text{Phase } S4 \qquad \text{Eq. 9a;}$$

and $$\tau_{SC}^O = \frac{(\phi_2^1 - \phi_2^2) - (\phi_1^1 - \phi_1^2)}{f_2 - f_1} s. \qquad \text{Eq. 10;}$$

where Eq. 10 calculates the observed value of differential range, also known as delay (the superscript 'O' on the observable denotes this as the observed observable of the "space craft" (SC), i.e., the communications satellite). With $\phi_j^i$ denoting the measured phase, for tone j, at station i, an estimate is made of the transmitter frequency at the time of signal transmission. The estimated transmitter frequency for tone j is denoted as $f_j$. (Note that by using communication based on 4 GHz and 6 GHz signals, the techniques herein may generally be affected by less ionospheric perturbation than typical 1.5 GHz GNSS signals, as will be appreciated by those skilled in the art.)

In general, for Eqs. 9a-10, the system acquires signals from two sources, where source "1" transmits frequency $f_1$ and source "2" transmits frequency $f_2$. According to the techniques herein, the signals are received at two different ground stations (or at two different antennas of the same ground station), from transmitters such as a GNSS satellite (e.g., GPS1) or other celestial transmitters, and a communication satellite (e.g., GEO1), and for each one of the received signals. The system herein determines the phases of the received signal at a specific time. Therefore, for each signal (one from each transmitter) there are two phases: one phase of the signal received (and measured) at the first ground station, and a second phase for the signal received (and measured) at the second ground station. (Altogether, then, Eq. 10 thus utilizes four measured phases which are used in the numerator, and the denominator utilizes the frequencies transmitted by the two sources.)

Figure 33C:
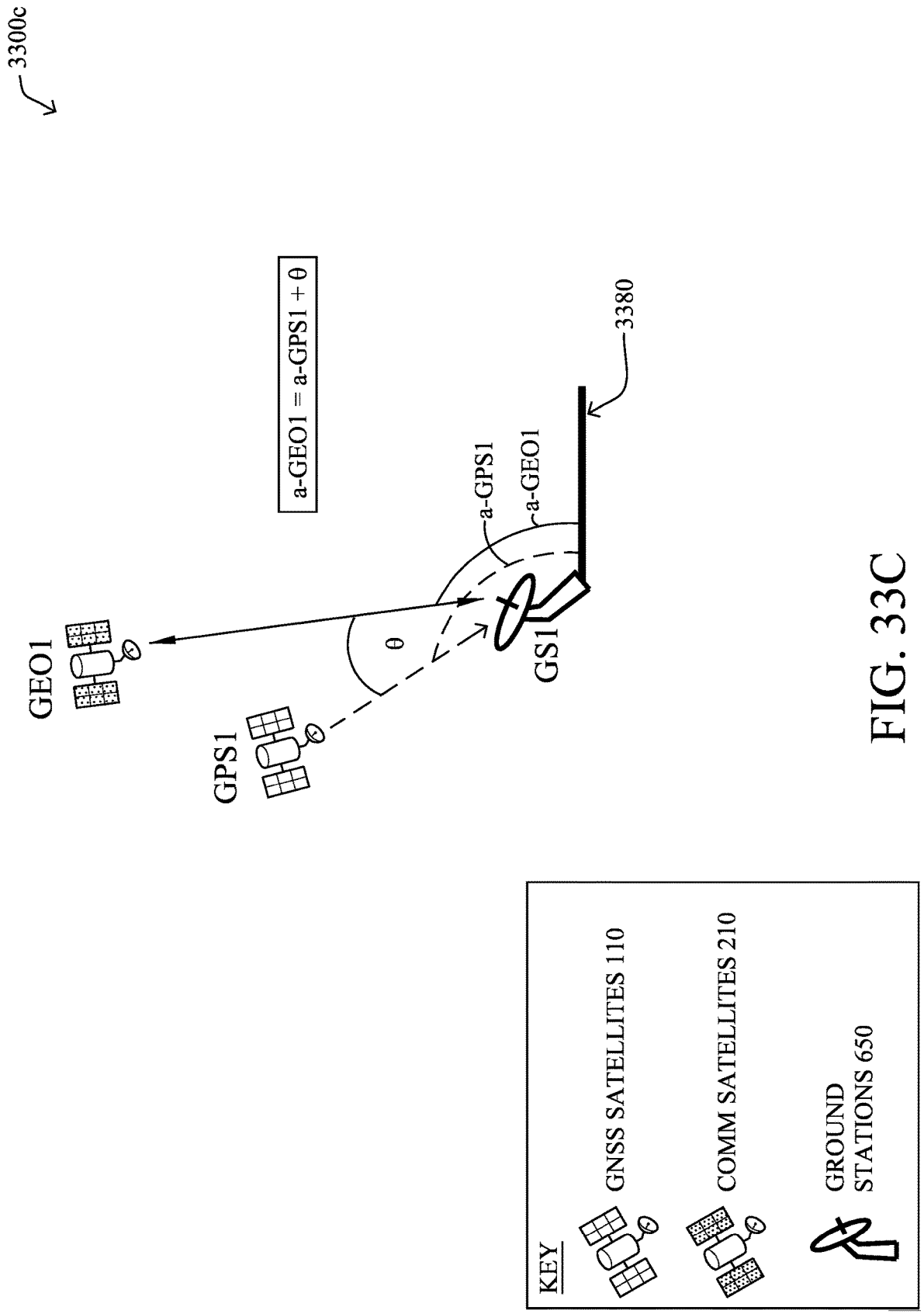
FIG. 33C illustrates an example of highly accurate locating of a communication satellite in relation to an angular difference from a reference satellite of a known location in accordance with one or more embodiments herein.

Based on the resultant differencing between the measured parameters of the signals of the reference signal (e.g., GNSS satellite 110) at a given time and the measured parameters from the communication satellite (e.g., GEO satellite 210), the techniques herein can thus compute an accurate angular position of the communication satellite with relation to the reference satellite. Said differently, the techniques herein can determine the exact angle θ between a reference satellite (with an accurate known location) and the communication satellite (with a generally known location) from each antenna at a given time, and then can determine a more accurate value of A/α to the communication satellite based thereon. For instance, as shown in illustration 3300c of FIG. 33C, from the perspective of ground station 650 (i.e., its antenna), the accurate angle to the communication satellite 210 (α-GEO1) can be determined based on the known angle to the reference satellite 110 (α-GPS1), now that the accurate difference θ has been determined, as follows:

$$\alpha\text{-GEO1} = \alpha\text{-GPS1} + \theta \qquad \text{Eq. 11.}$$

Note that depending on the orientation of the communication satellite to the reference satellite, θ may be added or subtracted (or, said differently, the angles for α may be greater or smaller), and the equation (or the sign of θ), may be adjusted accordingly. Note also that as used herein, and as shown within the Figures, A/α and θ are shown from different ground station antennas and used in different equations. Generally, though the angles are similar from the perspectives of both ground station antennas due to the perpendicularity of the received signals, but the precise calculations performed herein are based on a particular A/α and θ from a particular respective ground station antenna, accordingly (and, as described below, the difference in the angles may be used for determining a level of accuracy of the computations).

In one particular embodiment, the precise angle α, when applied to one or more ranging measurements (e.g., echo messages, such as WAI messages, or otherwise) to the communication satellite, thus solves to a highly accurate location of the communication satellite 210 (e.g., GEO1). That is, the techniques herein can solve for the accurate location of the communication satellite using the accurate angle α, and an accurate distance/range to the communication satellite, such as a distance as computed according to the echo message ranging techniques described above.

Figure 33D:
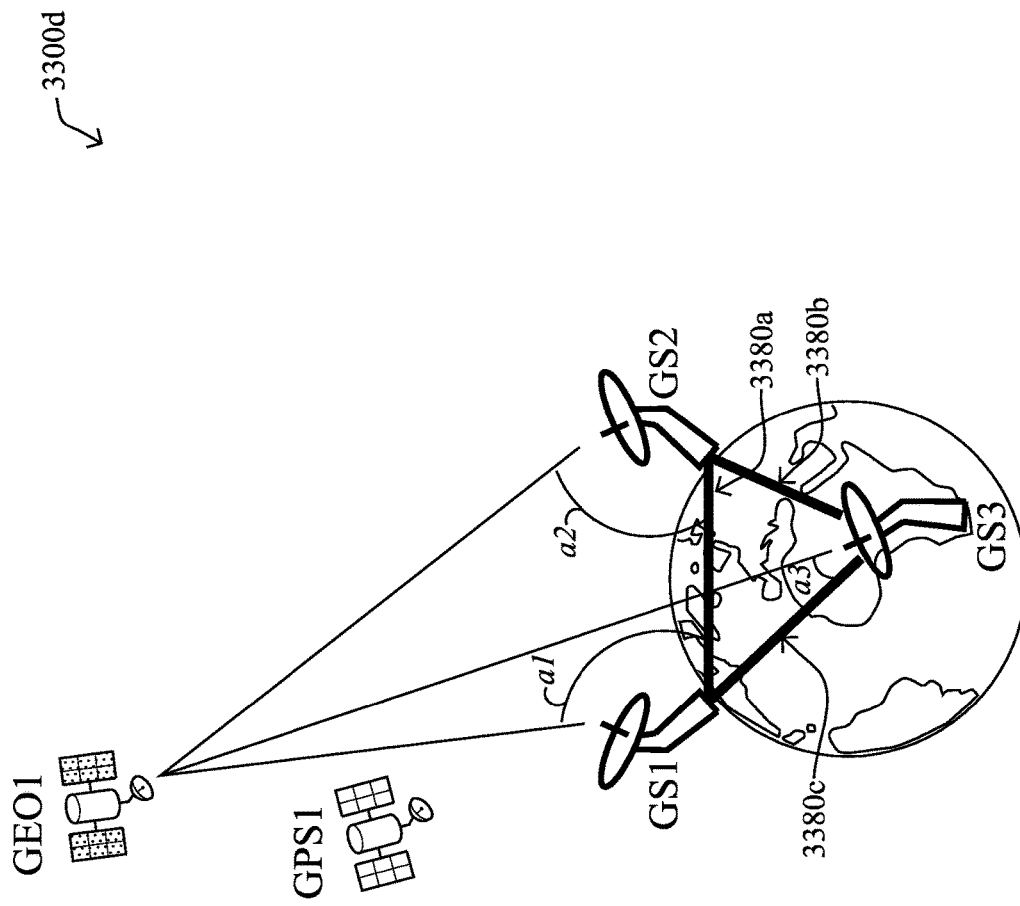
FIG. 33D illustrates another example of Delta-DOR (differential interferometry) for highly accurate locating of a communication satellite in accordance with one or more embodiments herein.

Alternatively, and with reference to environment 3300d of FIG. 33D, the techniques herein can also solve for the accurate location of the communication satellite using an accurate angle from the perspective of three ground stations (three ground station antennas). That is, based on known locations of the three (or more) ground stations (e.g., now including GS3), and three separately computed accurate (e.g., individually computed Delta-DOR-based) values of the angles α (α1, α2, and α3) from those ground stations (i.e., along three, or more, separate baselines between ground stations, 3380a, 3380b, and 3380c), the techniques herein may use angular based locating to pinpoint the accurate position of the communication satellite, accordingly. That is, based on the intersection between the angular lines as shown (e.g., (α1, α2, and α3), the techniques herein may thus determine the x,y,z location of the satellite in the sky. Note that the selected positions of the angles α1, α2, and α3 are merely representative choices, and any three angles α corresponding to one angle from each reference ground station (e.g., using different baselines than as shown) may be used. (Note that in an alternative embodiment, calculations may also be made based on values of θ directly, e.g., "θ1, θ2, and θ3", in order to determine the accurate location of the communication satellite based on its relation to the reference satellite.)

Also, while a Delta-DOR correction for each angle α1, α2, and α3 (or θ1, θ2, and θ3) may be based on a single reference (e.g., GNSS) satellite 110, such as GPS1 as shown and as described above, different reference satellites may be used for respective Delta-DOR adjustment for corresponding angles α1, α2, and α3 (or θ1, θ2, and θ3), accordingly. That is, for example, since GNSS satellites are much lower than GEO satellites, at times the θ angles between the reference satellite (e.g., GNSS) and the communication satellite (e.g., GEO) may not all be within the desired 10-degree range, different reference satellites (not shown) may be chosen for the Delta-DOR correction calculations based on the particular line of site from the corresponding ground stations.

The accurate position of the communication satellite may then be used in the locating processes described herein (e.g., WAI, WAY, WIA, and WYA messages) to produce an accurate location of the mobile device 230, accordingly (as well as for other purposes not necessarily related to locating processes, such as for spoofing detection, or others not specifically described herein).

Notably, because GEO satellites move very little in the sky, the location accuracy can be maintained for a lengthy period of time. It should also be noted, however, that because the GEO satellites are substantially fixed in space and the GNSS satellites (e.g., GPS and Galileo satellites) are moving in lower orbit, the selection and matching of the best datum GNSS satellite (the one with a closer angular proximity) is dynamically changing. As such, there will be times of higher accuracy estimation opportunity, when the two satellite types (GNSS and GEO) are in close angular proximity. During measurement and estimation periods, as well as periods without a satisfactory datum (times when there are no GNSS satellites in close angular proximity to the GEO satellite), the system herein may keep a model of the GEO satellite the motion (drifting) based on historical GNSS satellite locations estimating the location of the GEO satellite based on the latest modified Delta-DOR measurement. In addition, in certain embodiments where so configured, the motion of the communication/GEO satellite may be compensated for by utilizing accelerometers such as gyros onboard the communication satellite, accordingly.

Note also that because the illustrative GEO satellites are substantially fixed in the sky with respect to the earth coordinates at an altitude of approximately 22,236 miles (35,786 kilometers) above the Earth's equator, and because, in contrast, the GNSS (e.g., GPS) satellites move in an orbit at an altitude of approximately 12,550 miles (20,200 km), in order to ensure that the phase of the measured signals from the moving GNSS signals is accounted properly, the techniques herein may determine the relative speed of the GNSS datum satellite with respect to the ground stations, and shifts the frequency of the received signal to compensate for the Doppler shift before feeding the signals into the Delta-DOR location processing above. Alternatively, another method to track the waveform from the GPS satellite would be to use a frequency tracking loop, like a "Costas loop", as may be appreciated by those skilled in the art. (Note that other adjustments may also be made to these and any other measurements discussed herein based on satellite communication best practices, such as accounting for the "Sagnac effect" (or "Sagnac interference"), and so on, and any signal, timing, and/or distance corrections mentioned herein are not meant to be limiting to the present disclosure.)

Furthermore, according to the system described herein, the ground station measurements of the GNSS signals will not be vulnerable to jamming/spoofing like a mobile unit could be, as the techniques herein take advantage of the fact that the jamming of the GNSS satellite is limited to a specific coverage area. This is a limit set by the power and field of view of jammers. Such an area, for instance, may be limited to, e.g., a battlefield, a border area, etc. Other remote areas, outside of the jammed area, may still be able to receive an unjammed signal from a GNSS satellite that is being jammed in the first area. A system in accordance with the present disclosure, in particular, uses ground stations in areas which are not accessible to an adversary, or which are at least not within the range of the jammed area. That is, the system components necessary for precise locating of the communication (e.g., GEO) satellites may be located at a distant location from the mobile device (e.g., domestically located ground stations used for internationally located mobile devices), and the components can also be redundant. Moreover, recall that GNSS jamming vulnerability is due to the extremely weak signal on downlink only received by an omni-directional GNSS receiver. The ground stations according to the technique herein can use an array of directional antennas pointed in a skyward direction to capture both the GNSS signal (e.g., a GPS L-band signal) and the communication satellite signal (e.g., a GEO satellite C-band signal). These antennas may be able to achieve 25 to 40 dB of side-lobe rejection, thus requiring a jammer to be directly above the antenna. Therefore, for each and both of these reasons, it is highly likely that the ground stations in these areas can receive unjammed and un-spoofed signals from the GNSS satellites, and these ground stations can communicate with the communication/GEO satellites without hindrance.

In accordance with another aspect of the embodiments herein, the ground station process that determines the locations of the communication/GEO satellite can also estimate the accuracy of the location determination based on, among other things, a distance between antennas/ground stations (i.e., the baseline) used in determining the accurate angular position of the communication satellite; a frequency difference between signals received by antennas for use in determining the accurate angular position of the communication satellite with relation to the reference satellite (e.g., due to different atmospheric effects on the signals); and an angular proximity between the reference satellite and the communication satellite (e.g., the angle between the communication satellite and the GNSS satellite (as seen from the ground stations)) at the time of the determination (e.g., greater angles θ may result in greater inaccuracies). (Note, too, that the frequency difference may be controlled herein through careful selection of the frequency used for the signal from the communication satellite.)

Additionally, for instance, the accuracy of the determination of θ (the difference between respective α angles, or Δα) improves as the measurement error in the observable τ decreases. Further, θ accuracy improves as the baseline length increases. In addition, the accuracy in measurement of the observable τ improves as the spanned bandwidth $f_{BW}$ increases, and τ accuracy improves as the angle θ between radio sources decreases. Combining these relations and taking partial derivatives provides an expression for the dependence of the accuracy of angular offset determination as follows:

$$\sigma_\theta \propto \frac{\theta}{f_{BW}B}. \qquad \text{Eq. 12}$$

The estimated accuracy of the location of the communication satellite (or, said differently, the expected error in the calculated location of the communications satellite) may then be used locally in various calculations and/or reports, or may be shared/conveyed to a mobile device as an indicator for the accuracy of the location determination of the mobile device.

In accordance with one or more additional embodiments of the present disclosure, highly accurate locations for communication satellites may also be achieved using coordinated trilateration. For instance, with reference to environment 3500 of FIG. 35, where a communication satellite 210 (e.g., GEO1) is in communication with three (or more) ground stations 650, namely GS1, GS2, and GS3. As described above, location signals 3520 may be transmitted between the ground stations and the satellite, where segments of communication, as well as their corresponding distances, have been denoted for simplicity as "A" for the segment between GS1 and GEO1, "B" for the segment between GS2 and GEO1, and "C" for the segment between GS3 and GEO1. As described below, for example, a message 3520 transmitted by GS1, echoed by GEO1, and returned to GS1 may be denoted as path "A-A", while a message transmitted by GS2, via GEO1, to be echoed by GS3, back via GEO1 to GS2, would traverse path "B-C-C-B", and so on. Also, the distance from GS1 to GEO1 may also be denoted as "A", the distance from GS2 to GEO1 may be denoted as "B", and the distance from GS3 to GEO1 may be denoted as "C".

According to this embodiment, the ground stations 650 (or, more specifically, their antennas used to communicate with the satellites, "reference antennas" herein) are stationary and have known locations (e.g., configured latitude/longitude (lat/long) coordinates, GNSS determined coordinates, etc.). Assuming that the exact location of the communication satellite is unknown (e.g., within the 1.5 km box of uncertainty), the techniques herein may first determine an accurate precise distance/range to at least one of the ground stations. For example, GS1 may use the WAI messaging technique described in detail above to send a location signal (WAI message) 3520 on path A-A to determine a self-clocked distance of segment A (e.g., removing satellite delay and dividing by two). Even though the GEO1 satellite position is still not exactly known, GS1 now knows its precise distance to the satellite (i.e., the precise distance from the satellite to the ground station's "reference antenna", the location of which, although may or may not be co-located with the ground station, provides the precise accuracy required for trilateration calculations).

To determine the distances from the other ground stations 650 (i.e., their reference antennas) to the communication satellite 210, one of a number of options may be used according to the techniques herein. In a first embodiment, each of the remaining ground stations (e.g., GS2 and GS3) would also use a WAI message technique, and may share their respective distances for B and C with GS1. In another embodiment, now that the first distance A is known, GS1 may send WAY messages along respective paths to the ground stations to determine their distances. For example, GS1 may send a WAY message as signal 3520 to GS2 along path A-B-B-A, and may remove satellite delay, GS2 delay, and both segments A in order to determine the B distance ((B+B)/2), as detailed above. In still another embodiment, GS1 may alternatively send WYA or WIA messages to the other ground stations, along with distance A, so the ground stations can extrapolate their own segments (e.g., B and C), in the event the ground stations are clock synchronized, as described above. For instance, either a WYA or WIA message in this instance may be used since the end result is the same, meaning that a one-way message is sent (e.g., A-B or A-C), and the receiving ground station would remove distance A and satellite delay to determine their respective distance using the clock-synchronized techniques detailed above. The ground stations would then coordinate communications to ensure that at least one of the ground stations had each of the segment distances A, B, and C.

Now that one of the ground stations knows all three distances A, B, and C, and knows all three ground station locations (e.g., in advance or else as part of the information communication process outlined above), that particular ground station may use the three distances for precise trilateration of the communication satellite, accordingly. (Note that a fourth distance is unnecessary, as the satellite can be assumed to be celestially visible to the ground stations, and not to the other side of the Earth, which is where the alternate location would be calculated, as will be understood by those skilled in the art.)

Notably, avoiding geometric dilution of precision (GDOP) is important for this embodiment, where GDOP describes the reduction of the location accuracy due to a specific geometry of reference datums being located in a straight line. As such, it is recommended that the ground stations be geolocated not only in distanced locations from each other (e.g., not all in one antenna array), but also that they are in geometrically dispersed locations (e.g., Hawaii, California, and Virginia, not all close to the same latitude).

Note that GDOP may also be a concern for the accuracy of geolocation of mobile devices using the techniques described above, particularly whenever only GEO satellites are used, since most GEO satellites are at or near the equator. In this case, it would be beneficial to have the datums spread in both inclination and longitude. To reduce this effect, calculations indicate that even with only a small amount of satellite inclination (e.g., 4 or 5 degrees), the uncertainty of the geolocation latitude can still be reasonable; likely in the 100-meter range. This accuracy increases with inclination, therefore, the use of a GEO satellite in inclined orbit (no longer station-kept), or other satellite sources (e.g., one trusted GNSS satellite) may be employed to improve the GDOP during mobile device geolocation.

Moreover, returning to FIG. 35, though the illustration 3500 is described with ground stations 650, any device with an accurately determined and maintained location may be used as any one or more of the reference datums for the trilateration to the communication satellite. For instance, a building with a satellite communicator and a known location may be used, regardless of the capability to process communications as a ground station 650. Also, mobile devices may be used, assuming their locations are known and at least temporarily stationary, such as when GNSS is trusted (i.e., not jammed or spoofed) and accurate, the mobile device may participate in place of any of the ground stations mentioned above to determine another reference datum. In this manner, a larger number of reference datums may be used to further refine and/or confirm the communication satellite location (and may also help reduce the occurrence of GDOP).

Further mechanisms may be used in conjunction with the techniques described herein to improve the accuracy of the locations determined according to the embodiments of the present disclosure. For instance, one example embodiment uses the GEO satellite position determination techniques above together with GPS signals to come up with an improved hybrid answer to geolocation. In real-time kinematic (RTK) GPS (a type of differential GPS), for instance, a defined landmark receiver, near the unknown location device, collects GPS signals and broadcasts a radio signal update to the mobile device. This signal is useful in that it experiences very nearly the same atmospheric delay and attenuation as the mobile device experiences, but with a known absolute position (location). This extra point of reference often dramatically improves the accuracy of the mobile device's position determination. With the GEO satellite geolocation techniques described herein, a similar reference could be used to improve the position determination, accordingly.

Figure 36:
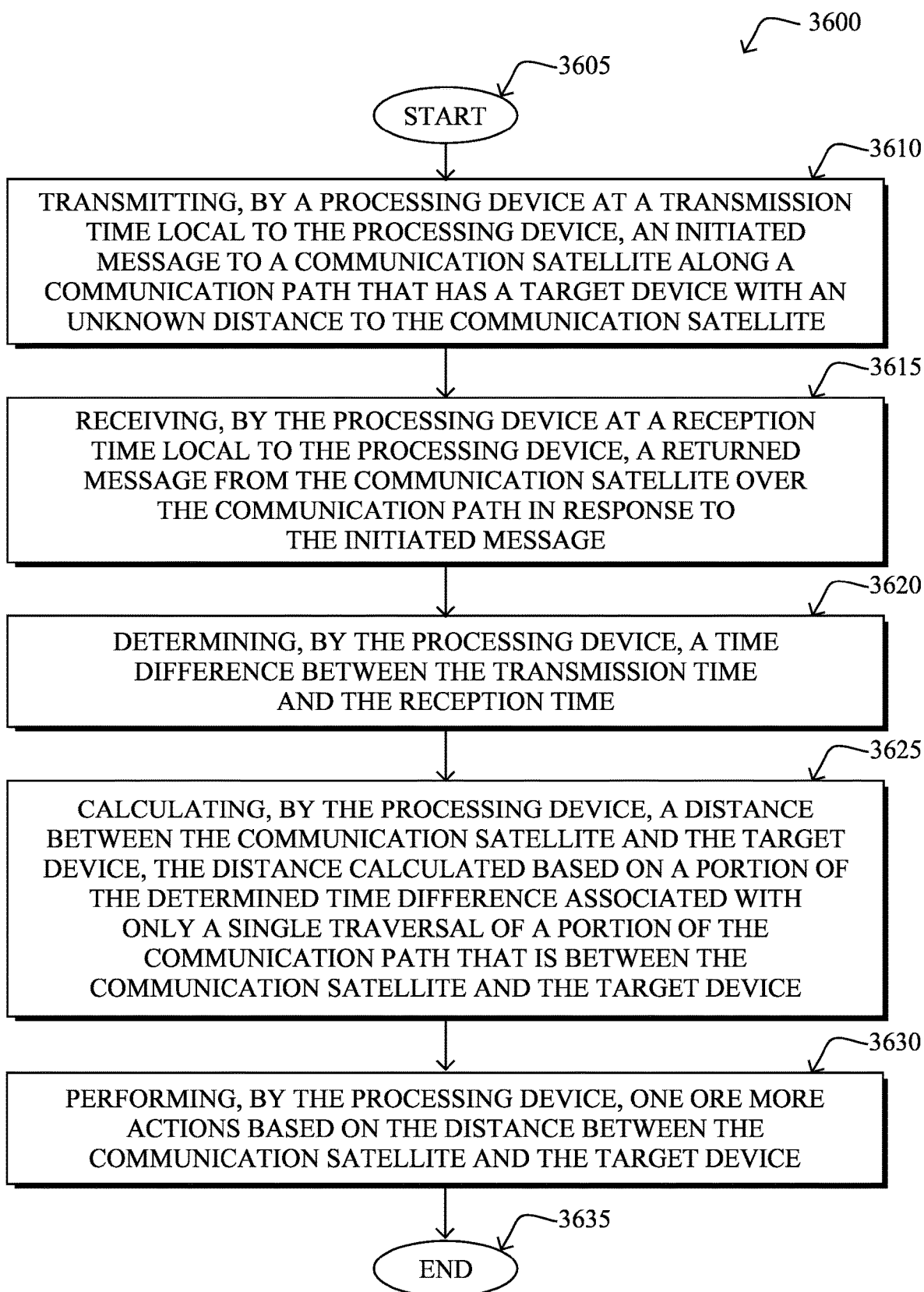
FIG. 36 illustrates an example simplified procedure for satellite echoing for geolocation and mitigation of GNSS denial in accordance with one or more embodiments described herein.

In closing, FIG. 36 illustrates an example simplified procedure for satellite echoing for geolocation and mitigation of GNSS denial in accordance with one or more embodiments described herein. For example, a non-generic, specifically configured device (e.g., mobile device 230 and/or ground station 650) may perform procedure 3600 by having a processor execute stored instructions (e.g., a process) on the device (e.g., in a memory). The procedure 3600 may start at step 3605, and continues to the following steps, as described in greater detail above:

Step 3610: transmitting, by a processing device at a transmission time local to the processing device, an initiated message to a communication satellite along a communication path that has a target device with an unknown distance to the communication satellite;

Step 3615: receiving, by the processing device at a reception time local to the processing device, a returned message from the communication satellite over the communication path in response to the initiated message;

Step 3620: determining, by the processing device, a time difference between the transmission time and the reception time;

Step 3625: calculating, by the processing device, a distance between the communication satellite and the target device, the distance calculated based on a portion of the determined time difference associated with only a single traversal of a portion of the communication path that is between the communication satellite and the target device; and Step 3630: performing, by the processing device, one or more actions based on the distance between the communication satellite and the target device.

The simplified procedure then ends in step 3635.

Note that other steps and details may also be included generally within the procedure above.

In one embodiment, determining the portion of the determined time difference associated with only the single traversal of the portion of the communication path that is between the communication satellite and the target device is based at least in part on removing any node-incurred delay along the communication path. In one embodiment, the node-incurred delay is a fixed time and known prior to transmitting the initiated message. In one embodiment, the node-incurred delay is indicated in the returned message. In one embodiment, the node-incurred delay is set by the communication satellite. In one embodiment, the node-incurred delay is indicated in one or more following messages received by the processing device after the returned message once the node-incurred delay is calculated by one or more nodes along the communication path.

In one embodiment, determining the portion of the determined time difference associated with only the single traversal of the portion of the communication path that is between the communication satellite and the target device is based at least in part on removing portions of the communication path other than the portion of the communication path that is between the communication satellite and the target device. In one embodiment, removing portions of the communication path other than the portion of the communication path that is between the communication satellite and the target device is based on removing a known time associated with the portions of the communication path other than the portion of the communication path that is between the communication satellite and the target device. In one embodiment, removing portions of the communication path other than the portion of the communication path that is between the communication satellite and the target device is based on removing a known distance associated with the portions of the communication path other than the portion of the communication path that is between the communication satellite and the target device.

In one embodiment, performing one or more actions based on the distance between the communication satellite and the target device comprises using the distance between the communication satellite and the target device for a location determination of the target device. In one embodiment, the location determination of the target device uses a plurality of distances between the target device and a respective plurality of reference objects for trilateration. In one embodiment, the plurality of reference objects for trilateration comprise additional communication satellites with respective distances to the target device being calculated based on determining a respective time difference between the respective transmission time of additional initiated messages and the respective reception time of corresponding returned messages. In one embodiment, the target device comprises a directional antenna, and wherein the target device aims separately at one or more of the plurality of reference objects. In one embodiment, the plurality of reference objects for trilateration are based on a plurality of different location determination hardware systems. In one embodiment, at least one of the plurality of different location determination hardware systems is a Global Navigation Satellite System (GNSS) and wherein at least one of the plurality of reference objects for trilateration is a GNSS satellite. In one embodiment, at least one of the plurality of distances is between the target device and a geolocated object having a known location based on a Global Navigation Satellite System (GNSS). In one embodiment, the target device comprises a directional antenna, and wherein the target device aims the directional antenna singularly at the communication satellite and communicates with one or more other communication satellites as reference objects based on adjacent satellite interference (ASI) spillover from the directional antenna for corresponding additional distances between the target device and the one or more other communication satellites. In one embodiment, the target device is the processing device, and wherein the one or more other communication satellites communicate with the communication satellite to which the target device aims as a primary communication satellite, and wherein the one or more other communication satellites are time synchronized with the target device, and wherein the one or more other communication satellites create a respective timestamp upon reception of the initiated message and communicate the respective timestamp to the primary communication satellite for return to the target device. In one embodiment, at least one of the plurality of reference objects is selected based on minimizing geometric dilution of precision (GDOP) of the location determination/estimation based on the plurality of reference objects. In one embodiment, the plurality of reference objects for trilateration includes one or more communication satellites and a separate altitude determination mechanism.

In one embodiment, the processing device is the target device. In one embodiment, calculating the distance between the communication satellite and the target device comprises: determining a delay incurred by the communication satellite; subtracting the delay from the determined time difference to produce a time of flight value; and separating the single traversal of the portion of the communication path that is between the communication satellite and the target device from the total time of flight value for the communication path by a process selected from a group consisting of: a) dividing the time of flight value in half to produce the portion of the determined time difference associated with only the single traversal of the portion of the communication path that is between the communication satellite and the target device, and converting the portion of the determined time difference associated with only the single traversal of the portion of the communication path that is between the communication satellite and the target device into the distance between the communication satellite and the target device; and b) converting the time of flight value for the communication path into a total distance for the communication path, and dividing the total distance in half to produce the distance between the communication satellite and the target device. In one embodiment, calculating the distance between the communication satellite and the target device comprises: determining a total delay incurred by the communication satellite along the communication path; determining a delay incurred by a ground station along the communication path that establishes the returned message in response to the initiated message; subtracting the total delay incurred by the communication satellite and the delay incurred by the ground station from the determined time difference to produce a total time of flight value for the communication path; and separating the single traversal of the portion of the communication path that is between the communication satellite and the target device from the total time of flight value for the communication path by a process selected from a group consisting of: a) dividing the total time of flight value for the communication path in half to produce a one-way time of flight value for the communication path, subtracting a known time of flight value between the satellite and the ground station from the one-way time of flight value for the communication path to produce the portion of the determined time difference associated with only the single traversal of the portion of the communication path that is between the communication satellite and the target device, and converting the portion of the determined time difference associated with only the single traversal of the portion of the communication path that is between the communication satellite and the target device into the distance between the communication satellite and the target device; b) subtracting a known time of flight value between the satellite and the ground station in two directions from the total time of flight value for the communication path to produce a total time of flight value for the communication path between the satellite and the target device, dividing the total time of flight value for the communication path between the satellite and the target device in half to produce the portion of the determined time difference associated with only the single traversal of the portion of the communication path that is between the communication satellite and the target device, and converting the portion of the determined time difference associated with only the single traversal of the portion of the communication path that is between the communication satellite and the target device into the distance between the communication satellite and the target device; c) dividing the total time of flight value for the communication path in half to produce a one-way time of flight value for the communication path, converting the one-way time of flight value for the communication path into a one-way distance for the communication path, and subtracting a known distance between the satellite and the ground station from the one-way distance for the communication path to produce the distance between the communication satellite and the target device; and d) converting the total time of flight value for the communication path into a total distance for the communication path, dividing the total distance for the communication path in half to produce a one-way distance for the communication path, and subtracting a known distance between the satellite and the ground station from the one-way distance for the communication path to produce the distance between the communication satellite and the target device. In one embodiment, either of the known time of flight value between the satellite and the ground station or the known distance between the satellite and the ground station is known by the target device either in advance of the initiated message, or in response to the returned message.

In one embodiment, the processing device is a ground station along the communication path, and wherein the target device establishes the returned message in response to the initiated message. In one embodiment, the ground station transmits the initiated message in response to a request from the target device. In one embodiment, the ground station transmits the initiated message as an unsolicited beacon to one or more target devices. In one embodiment, the method further comprises: receiving a plurality of returned messages established by a corresponding plurality of target devices; and calculating a respective distance between the communication satellite and each of the plurality of target devices. In one embodiment, calculating the distance between the communication satellite and the target device comprises: determining a total delay incurred by the communication satellite along the communication path; determining a delay incurred by the target device when it establishes the returned message in response to the initiated message; subtracting the total delay incurred by the communication satellite and the delay incurred by the target device from the determined time difference to produce a total time of flight value for the communication path; and separating the single traversal of the portion of the communication path that is between the communication satellite and the target device from the total time of flight value for the communication path by a process selected from a group consisting of: a) dividing the total time of flight value for the communication path in half to produce a one-way time of flight value for the communication path, subtracting a known time of flight value between the satellite and the ground station from the one-way time of flight value for the communication path to produce the portion of the determined time difference associated with only the single traversal of the portion of the communication path that is between the communication satellite and the target device, and converting the portion of the determined time difference associated with only the single traversal of the portion of the communication path that is between the communication satellite and the target device into the distance between the communication satellite and the target device; b) subtracting a known time of flight value between the satellite and the ground station in two directions from the total time of flight value for the communication path to produce a total time of flight value for the communication path between the satellite and the target device, dividing the total time of flight value for the communication path between the satellite and the target device in half to produce the portion of the determined time difference associated with only the single traversal of the portion of the communication path that is between the communication satellite and the target device, and converting the portion of the determined time difference associated with only the single traversal of the portion of the communication path that is between the communication satellite and the target device into the distance between the communication satellite and the target device; c) dividing the total time of flight value for the communication path in half to produce a one-way time of flight value for the communication path, converting the one-way time of flight value for the communication path into a one-way distance for the communication path, and subtracting a known distance between the satellite and the ground station from the one-way distance for the communication path to produce the distance between the communication satellite and the target device; and d) converting the total time of flight value for the communication path into a total distance for the communication path, dividing the total distance for the communication path in half to produce a one-way distance for the communication path, and subtracting a known distance between the satellite and the ground station from the one-way distance for the communication path to produce the distance between the communication satellite and the target device.

In one embodiment, the processing device configures one or more adjustable transmission parameters for the initiated message.

In one embodiment, the processing device is one of either a ground station along the communication path or the target device, and wherein performing one or more actions based on the distance between the communication satellite and the target device comprises sending the distance to the other of the target device or the ground station, respectively.

In one embodiment, the communication satellite is selected from a group consisting of: a geosynchronous equatorial orbit (GEO) satellite; a medium earth orbit (MEO) satellite; and a low earth orbit (LEO) satellite.

In one embodiment, performing one or more actions based on the distance between the communication satellite and the target device comprises one or more of: using the distance for geolocation of the target device; and using the distance for detecting spoofing of a different location determination hardware.

In one embodiment, the target device is in motion between the transmitting and receiving, and wherein performing one or more actions based on the distance between the communication satellite and the target device comprises: compensating for the motion of the target device during geolocation of the target device based on the calculated distance between the communication satellite and the target device. In one embodiment, compensating is based on one or more motion tracking sensors on the target device.

In one embodiment, the transmitting of the initiated message is in response to detecting denial of a primary location determination system.

In one embodiment, the transmitting of the initiated message is performed by the target device in response to a trigger communicated from a primary device local to the target device.

In one embodiment, the method further comprises: determining an accuracy of the distance between the communication satellite and the target device based on an accuracy of a location of the communication satellite. In one embodiment, the accuracy of the location of the communication satellite is determined by a ground station along the communication path and shared with the target device for use by the target device (e.g., display, threshold determination, etc.).

In one embodiment, the processing device is the target device, and wherein the target device uses at least a general location of the communication satellite for aim of an antenna when transmitting the initiated message, the method further comprising: receiving a highly accurate location of the communication satellite for calculating distance between the communication satellite and the target device.

In one embodiment, the method further comprises: determining an estimated expected distance between the communication satellite and the target device according to a Global Navigation Satellite System (GNSS) geolocation of the target device; and declaring a potential spoofing of the GNSS geolocation in response to the calculated distance between the communication satellite and the target device being different than the estimated expected distance by greater than a threshold amount.

In one embodiment, the processing device is the target device, and the method further comprises: determining an expected aim of an antenna of the target device to communicate with the communication satellite based on a Global Navigation Satellite System (GNSS) geolocation of the target device; and declaring a potential spoofing of the GNSS geolocation in response to the target device being unable to communicate with the communication satellite based on the expected aim of the antenna.

Figure 37:
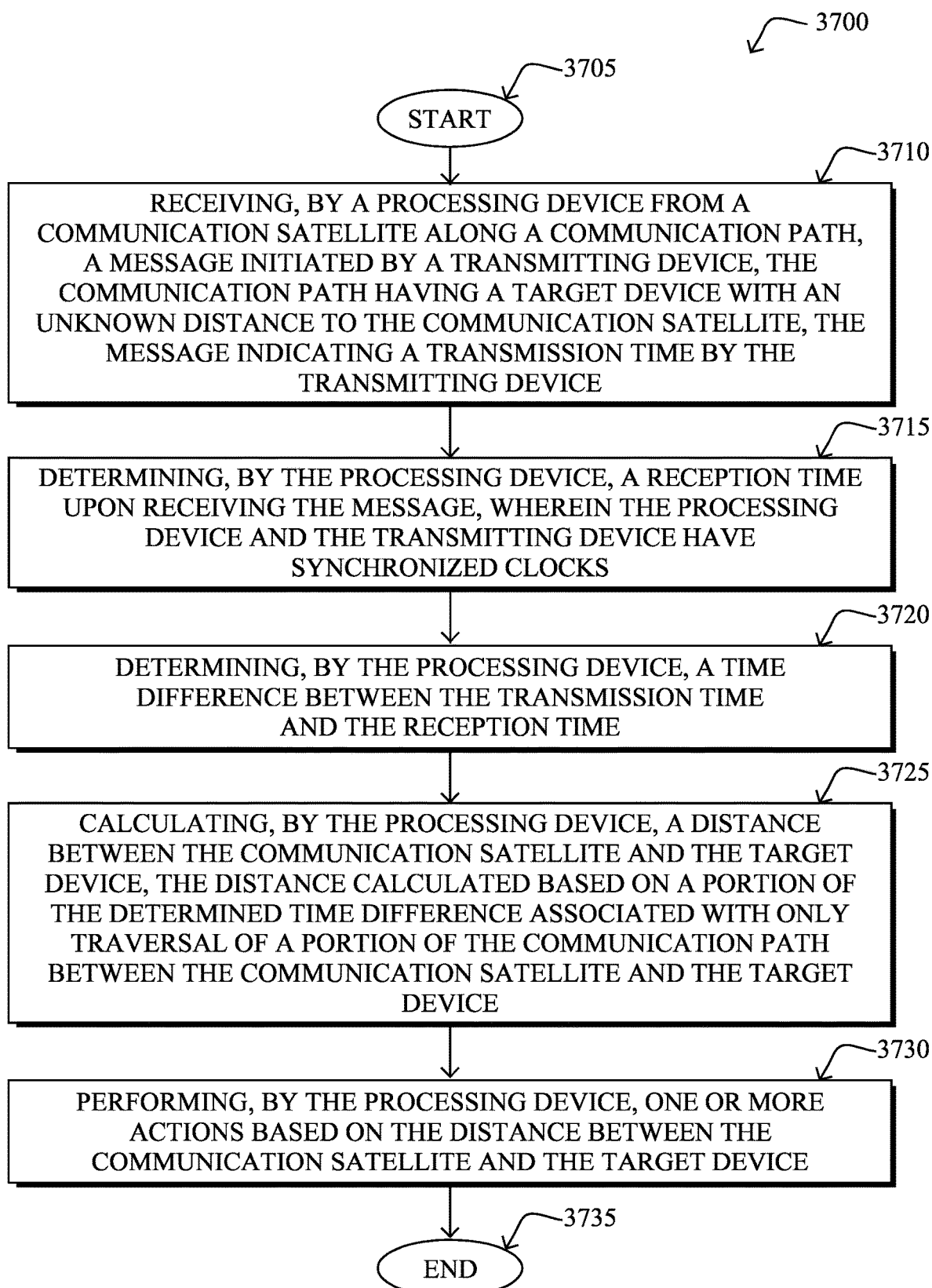
FIG. 37 illustrates an example simplified procedure for satellite relaying for geolocation and mitigation of GNSS denial in accordance with one or more embodiments described herein.

Additionally, FIG. 37 illustrates an example simplified procedure for satellite relaying for geolocation and mitigation of GNSS denial in accordance with one or more embodiments described herein. For example, a non-generic, specifically configured device (e.g., mobile device 230 and/or ground station 650) may perform procedure 3700 by having a processor execute stored instructions (e.g., a process) on the device (e.g., in a memory). The procedure 3700 may start at step 3705, and continues to the following steps, as described in greater detail above:

Step 3710: receiving, by a processing device from a communication satellite along a communication path, a message initiated by a transmitting device, the communication path having a target device with an unknown distance to the communication satellite, the message indicating a transmission time by the transmitting device;

Step 3715: determining, by the processing device, a reception time upon receiving the message, wherein the processing device and the transmitting device have synchronized clocks;

Step 3720: determining, by the processing device, a time difference between the transmission time and the reception time;

Step 3725: calculating, by the processing device, a distance between the communication satellite and the target device, the distance calculated based on a portion of the determined time difference associated with only traversal of a portion of the communication path that is between the communication satellite and the target device; and Step 3730: performing, by the processing device, one or more actions based on the distance between the communication satellite and the target device.

The simplified procedure then ends in step 3735.

Note that other steps and details may also be included generally within the procedure above.

In one embodiment, the transmitting device is the target device, and wherein the processing device is a ground station.

In one embodiment, the transmitting device is a ground station, and wherein the processing device is the target device.

In one embodiment, the transmitting device is the communication satellite, and wherein the processing device is the target device, and the communication satellite is configured to send the message as one of a plurality of beacon messages as instructed by a ground station. In one embodiment, the communication satellite receives updated control messages from the ground station regarding configuration of the beacon messages configures one or more adjustable transmission parameters for the initiated message. In one embodiment, the updated control messages from the ground station regarding configuration of the beacon messages configure one or more adjustable transmission parameters for the beacon messages.

In one embodiment, the processing device and the transmitting device have synchronized clocks based on the processing device and the transmitting device independently using Global Navigation Satellite System (GNSS) timing, the method further comprising: declaring a potential spoofing of the GNSS and a lack of clock synchronization between the processing device and the transmitting device in response to the calculated distance between the communication satellite and the target device being an improbable distance based on one or more criteria.

In one embodiment, the processing device and the transmitting device each have a synchronized atomic clock.

In one embodiment, the processing device and the transmitting device have synchronized clocks based on a two-way, common view, time transfer communication mechanism between the processing device and the transmitting device. In one embodiment, one of either the processing device or the transmitting device has an atomic clock.

In one embodiment, the transmitting device is the target device, and wherein the communication satellite has a synchronized clock with the transmitting device, wherein the communication satellite marks a time of arrival of the message from the transmitting device at the communication satellite, and wherein determining the reception time comprises using the time of arrival marked by the communication satellite, and wherein calculating the distance between the communication satellite and the target device comprises converting the time difference between the transmission time and the reception time into the distance.

In one embodiment, the processing device is the target device, and wherein the communication satellite has a synchronized clock with the processing device, wherein the communication satellite marks a time of transmission of the message from the communication satellite, and wherein the time of transmission of the message from the communication satellite is used as the transmission time for determining the time difference between the transmission time and the reception time, and wherein calculating the distance between the communication satellite and the target device comprises converting the time difference between the transmission time and the reception time into the distance.

In one embodiment, determining the portion of the determined time difference associated with only the traversal of the portion of the communication path that is between the communication satellite and the target device is based at least in part on removing any delay incurred by the communication satellite. In one embodiment, the delay is a fixed time and known prior to transmitting the initiated message. In one embodiment, the delay is predetermined by the communication satellite and indicated in the message when sent by the communication satellite. In one embodiment, the delay is indicated in one or more following messages sent by the communication satellite once the delay is calculated by the communication satellite.

In one embodiment, determining the portion of the determined time difference associated with only the traversal of the portion of the communication path that is between the communication satellite and the target device is based at least in part on removing portions of the communication path other than the portion of the communication path that is between the communication satellite and the target device. In one embodiment, removing portions of the communication path other than the portion of the communication path that is between the communication satellite and the target device is based on removing a known time associated with the portions of the communication path other than the portion of the communication path that is between the communication satellite and the target device. In one embodiment, removing portions of the communication path other than the portion of the communication path that is between the communication satellite and the target device is based on removing a known distance associated with the portions of the communication path other than the portion of the communication path that is between the communication satellite and the target device.

In one embodiment, performing one or more actions based on the distance between the communication satellite and the target device comprises using the distance between the communication satellite and the target device for a location determination of the target device. In one embodiment, the location determination of the target device uses a plurality of distances between the target device and a respective plurality of reference objects for trilateration. In one embodiment, the plurality of reference objects for trilateration comprise additional communication satellites with respective distances to the target device being calculated based on determining a respective time difference between the respective transmission time of additional messages and the respective reception time of the additional messages. In one embodiment, the target device comprises a directional antenna, and wherein the target device aims separately at one or more of the plurality of reference objects. In one embodiment, the plurality of reference objects for trilateration are based on a plurality of different location determination hardware systems. In one embodiment, at least one of the plurality of different location determination hardware systems is a Global Navigation Satellite System (GNSS) and wherein at least one of the plurality of reference objects for trilateration is a GNSS satellite. In one embodiment, at least one of the plurality of distances is between the target device and a geolocated object having a known location based on a Global Navigation Satellite System (GNSS). In one embodiment, the transmitting device is the target device, and the target device comprises a directional antenna, and the target device aims the directional antenna singularly at the communication satellite and communicates with one or more other communication satellites as reference objects based on adjacent satellite interference (ASI) spillover from the directional antenna for corresponding additional distances between the target device and the one or more other communication satellites. In one embodiment, the one or more other communication satellites communicate with the communication satellite to which the target device aims as a primary communication satellite, and the one or more other communication satellites are time synchronized with the target device, and the one or more other communication satellites create a respective timestamp upon reception of the initiated message and communicate the respective timestamp to the primary communication satellite for transmission to the processing device. In one embodiment, the one or more other communication satellites communicate with one or more corresponding ground stations, and wherein the one or more other communication satellites are time synchronized with the target device, and wherein the one or more other communication satellites create a respective timestamp upon reception of the initiated message and communicate the respective timestamp to the one or more corresponding ground stations for transmission to the processing device. In one embodiment, at least one of the plurality of reference objects is selected based on minimizing geometric dilution of precision (GDOP) of the location determination/estimation based on the plurality of reference objects. In one embodiment, the plurality of reference objects for trilateration includes two communication satellites and a separate altitude determination mechanism.

In one embodiment, the processing device is one of either the target device or a ground station along the communication path, and wherein calculating the distance between the communication satellite and the target device comprises: determining a delay incurred by the communication satellite along the communication path; subtracting the delay incurred by the communication satellite from the determined time difference to produce a total time of flight value for the communication path; and separating the traversal of the portion of the communication path that is between the communication satellite and the target device from the total time of flight value for the communication path by a process selected from a group consisting of: a) subtracting a known time of flight value between the satellite and the ground station from the total time of flight value for the communication path to produce the portion of the determined time difference associated with only the traversal of the portion of the communication path that is between the communication satellite and the target device, and converting the portion of the determined time difference associated with only the traversal of the portion of the communication path that is between the communication satellite and the target device into the distance between the communication satellite and the target device; and b) converting the total time of flight value for the communication path into a total distance for the communication path, and subtracting a known distance between the satellite and the ground station from the total distance for the communication path to produce the distance between the communication satellite and the target device. In one embodiment, the processing device is the target device, and wherein either of the known time of flight value between the satellite and the ground station or the known distance between the satellite and the ground station is known by the target device either in advance of receiving the message, or as an indication within the message.

In one embodiment, the transmitting device transmits the message in response to a request from the target device.

In one embodiment, the transmitting device transmits the message as an unsolicited beacon to the target device.

In one embodiment, the method further comprises: receiving a plurality of messages initiated by the transmitting device via a plurality of communication satellites in communication with the target device; and calculating a respective distance between each of the plurality of communication satellites and the target device.

In one embodiment, the transmitting device configures one or more adjustable transmission parameters for the message and shares the one or more adjustable transmission parameters for the message with the processing device.

In one embodiment, the processing device is one of either a ground station along the communication path or the target device, and wherein performing one or more actions based on the distance between the communication satellite and the target device comprises sending the distance to the other of the target device or the ground station, respectively.

In one embodiment, the communication satellite is selected from a group consisting of: a geosynchronous equatorial orbit (GEO) satellite; a medium earth orbit (MEO) satellite; and a low earth orbit (LEO) satellite.

In one embodiment, performing one or more actions based on the distance between the communication satellite and the target device comprises one or more of: using the distance for geolocation of the target device; and using the distance for detecting spoofing of a different location determination hardware.

In one embodiment, the initiating of the message is in response to detecting denial of a primary location determination system of the target device.

In one embodiment, the transmitting device is the target device, and initiating of the message is performed by the target device in response to a trigger communicated from a primary device local to the target device.

In one embodiment, the method further comprises: determining an accuracy of the distance between the communication satellite and the target device based on an accuracy of a location of the communication satellite.

In one embodiment, the processing device is the target device, and the target device uses at least a general location of the communication satellite for aim of an antenna when receiving the message, the method further comprising: receiving a highly accurate location of the communication satellite for calculating distance between the communication satellite and the target device.

In one embodiment, the method further comprises: determining an estimated expected distance between the communication satellite and the target device according to a Global Navigation Satellite System (GNSS) geolocation of the target device; and declaring a potential spoofing of the GNSS geolocation in response to the calculated distance between the communication satellite and the target device being different than the estimated expected distance by greater than a threshold amount.

In one embodiment, the processing device is the target device, the method further comprising: determining an expected aim of an antenna of the target device to receive the message from the communication satellite based on a Global Navigation Satellite System (GNSS) geolocation of the target device; and declaring a potential spoofing of the GNSS geolocation in response to the target device being unable to receive the message from the communication satellite based on the expected aim of the antenna.

Figure 38:
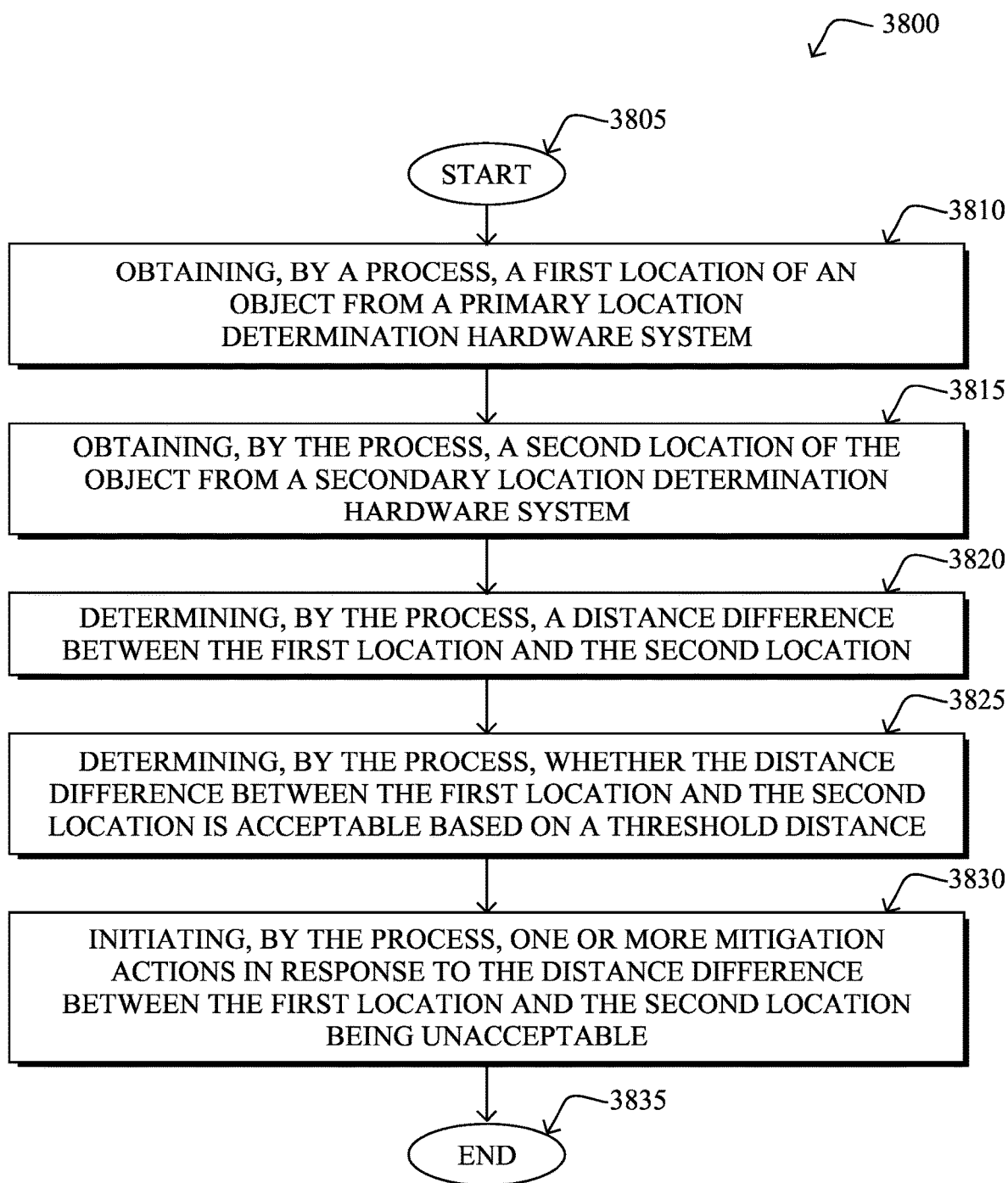
FIG. 38 illustrates an example simplified procedure for to multi-system-based detection and mitigation of GNSS spoofing in accordance with one or more embodiments described herein.

Moreover, FIG. 38 illustrates an example simplified procedure for multi-system-based detection and mitigation of GNSS spoofing in accordance with one or more embodiments described herein. For example, a non-generic, specifically configured device (e.g., mobile device 230 and/or ground station 650) may perform procedure 3800 by having a processor execute stored instructions (e.g., a process) on the device (e.g., in a memory). The procedure 3800 may start at step 3805, and continues to the following steps, as described in greater detail above:

Step 3810: obtaining, by a process, a first location of an object from a primary location determination hardware system;

Step 3815: obtaining, by the process, a second location of the object from a secondary location determination hardware system;

Step 3820: determining, by the process, a distance difference between the first location and the second location;

Step 3825: determining, by the process, whether the distance difference between the first location and the second location is acceptable based on a threshold distance; and Step 3830: initiating, by the process, one or more mitigation actions in response to the distance difference between the first location and the second location being unacceptable.

The simplified procedure then ends in step 3835.

Note that other steps and details may also be included generally within the procedure above.

In one embodiment, one of the one or more mitigation actions comprises switching from utilization of the first location to the second location.

In one embodiment, one of the one or more mitigation actions comprises switching from utilization of the primary location determination hardware system to the secondary location determination hardware system for geolocation of the object.

In one embodiment, wherein the primary location determination hardware system is based on distances to Global Navigation Satellite System (GNSS) satellites, and wherein the secondary location determination hardware system is based on distances to communication satellites. In one embodiment, distances to communication satellites are calculated by echo messages communicated between the communication satellites and the object. In one embodiment, distances to communication satellites are calculated by one-way relay messages communicated between the communication satellites and the object. In one embodiment, the communication satellite is selected from a group consisting of: a geosynchronous equatorial orbit (GEO) satellite; a medium earth orbit (MEO) satellite; and a low earth orbit (LEO) satellite.

In one embodiment, the object is a mobile device.

In one embodiment, the process is executed on a ground station in communication with the object.

In one embodiment, the process is executed on the object, and wherein the object is a mobile device.

In one embodiment, the primary location determination hardware system and secondary location determination hardware system are located on a single device. In one embodiment, the single device is the object. In one embodiment, the single device is a separate device other than the object.

In one embodiment, the primary location determination hardware system and secondary location determination hardware system are located on first and second devices, respectively, wherein the first and second devices are in communication with each other. In one embodiment, one of the first and second devices is the object.

In one embodiment, the primary location determination hardware system has a better sensitivity than the secondary location determination hardware system.

In one embodiment, the method further comprises: utilizing the first location in response to the distance difference between the first location and the second location being acceptable.

In one embodiment, one of the one or more mitigation actions comprises determining a weighted average location of the object as a weighted average between the first location and second location.

In one embodiment, at least one of the primary location determination hardware system and the secondary location determination hardware system is based on a fusion algorithm using input from a plurality of location determination hardware systems, wherein the primary location determination hardware system and the secondary location determination hardware system differ by at least one location determination hardware system.

In one embodiment, the primary location determination hardware system and the secondary location determination hardware system are different and selected from a group consisting of: the Global Positioning System (GPS), the BeiDou Navigation Satellite System (BDS), the Global Navigation Satellite System (GLONASS), the Galileo Global Navigation Satellite System, echo messages communicated between the communication satellites and the object, and one-way relay messages communicated between the communication satellites and the object.

In one embodiment, one of the one or more mitigation actions comprises providing a spoofing alert message.

In one embodiment, one of the one or more mitigation actions comprises determining one or more trusted measurements from the primary location determination hardware system, and augmenting the one or more trusted measurements from the primary location determination hardware system with one or more measurements from an alternative location determination hardware system. In one embodiment, the alternative location determination hardware system is the secondary location determination hardware system.

In one embodiment, one of the one or more mitigation actions comprises alerting one or more subordinate devices. In one embodiment, alerting the one or more subordinate devices causes the one or more subordinate devices switch from utilization of the primary location determination hardware system to an alternative location determination hardware system for geolocation of the respective subordinate device of the one or more subordinate devices. In one embodiment, the alternative location determination hardware system is the secondary location determination hardware system.

In one embodiment, the process is executed on an aircraft, and wherein one of the one or more mitigation actions comprises preventing a drop of cargo from the aircraft. In one embodiment, the cargo is configured to self-navigate during a drop based on the primary location determination hardware system.

In one embodiment, the process is executed on an aircraft, and wherein a cargo associated with the aircraft is configured to self-navigate during a drop from the aircraft, and wherein one of the one or more mitigation actions comprises instructing the cargo to utilize an alternative location determination hardware system during a drop from the aircraft. In one embodiment, the alternative location determination hardware system is the secondary location determination hardware system.

In one embodiment, one of the one or more mitigation actions comprises adjusting one or more communication parameters of the primary location determination hardware system to circumvent spoofing communications of the primary location determination hardware system.

In one embodiment, one of the one or more mitigation actions comprises selecting different reference objects used by the primary location determination hardware system to circumvent spoofed reference objects of the primary location determination hardware system.

In one embodiment, the threshold distance is based on one or both of a first accuracy error of the primary location determination hardware system for the first location and a second accuracy error of the secondary location determination hardware system for the second location.

In one embodiment, the threshold distance is based on an expected error in a calculated location of one or more satellites used by one of either the primary location determination hardware system or the secondary location determination hardware system.

Figure 39:
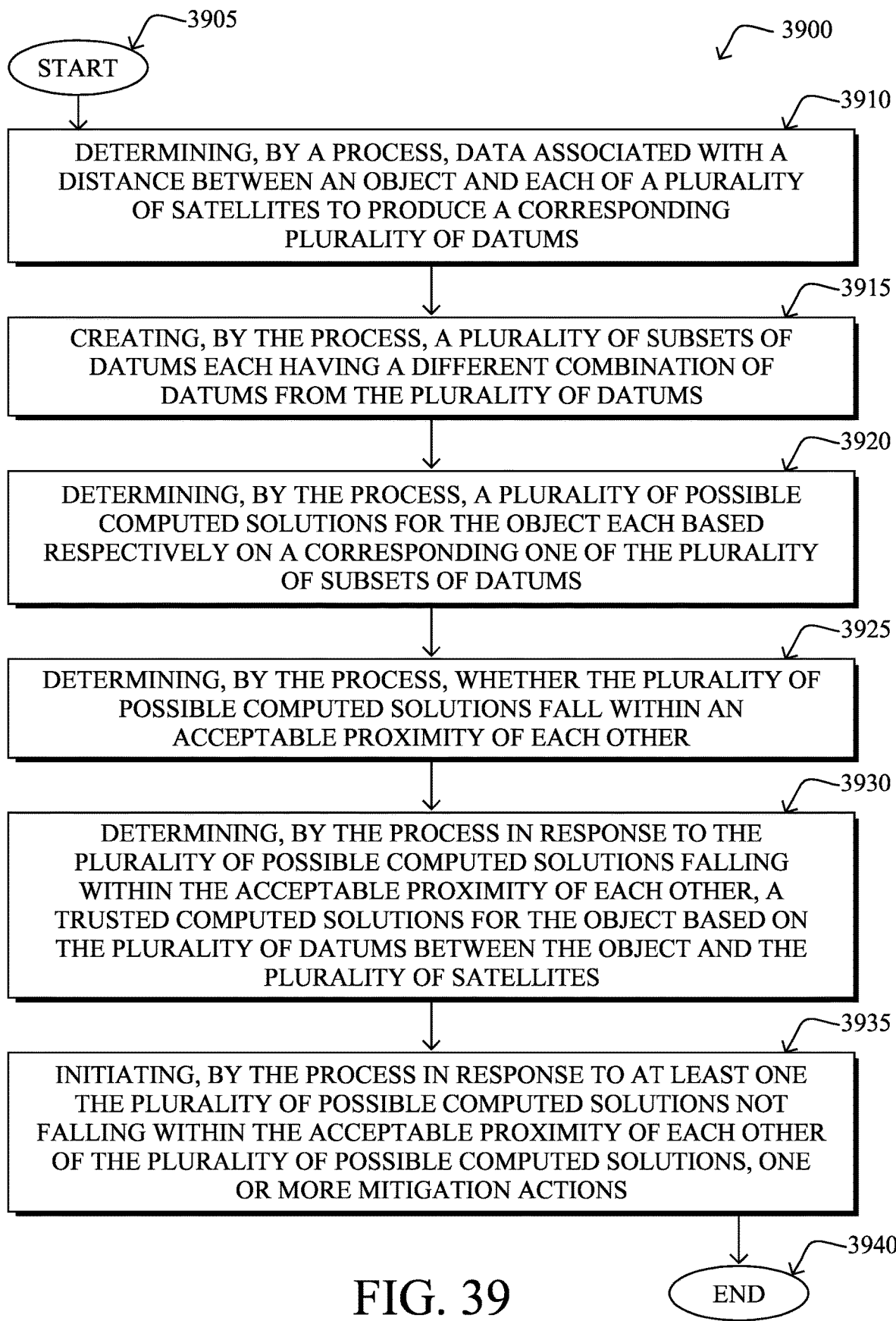
FIG. 39 illustrates an example simplified procedure for multi-subset-based detection and mitigation of GNSS spoofing in accordance with one or more embodiments described herein.

Furthermore, FIG. 39 illustrates an example simplified procedure for multi-subset-based detection and mitigation of GNSS spoofing in accordance with one or more embodiments described herein. For example, a non-generic, specifically configured device (e.g., mobile device 230 and/or ground station 650) may perform procedure 3900 by having a processor execute stored instructions (e.g., a process) on the device (e.g., in a memory). The procedure 3900 may start at step 3905, and continues to the following steps, as described in greater detail above:

Step 3910: determining, by a process, data associated with a distance between an object and each of a plurality of satellites to produce a corresponding plurality of datums (e.g., distances, times of flight, times of arrival, etc.);

Step 3915: creating, by the process, a plurality of subsets of datums each having a different combination of datums from the plurality of datums;

Step 3920: determining, by the process, a plurality of possible computed solutions for the object (e.g., location, local time, etc.) each based respectively on a corresponding one of the plurality of subsets of datums;

Step 3925: determining, by the process, whether the plurality of possible computed solutions fall within an acceptable proximity of each other;

Step 3930: determining, by the process in response to the plurality of possible computed solutions falling within the acceptable proximity of each other, a trusted computed solution for the object based on the plurality of datums between the object and the plurality of satellites; and Step 3935: initiating, by the process in response to at least one the plurality of possible computed solutions not falling within the acceptable proximity of each other of the plurality of possible locations, one or more mitigation actions.

The simplified procedure then ends in step 3940.

Note that other steps and details may also be included generally within the procedure above.

In one embodiment, one of the one or more mitigation actions comprises: determining one or more specific datums of the plurality of datums between the object and the plurality of satellites that are incorrect datums. In one embodiment, one of the one or more mitigation actions comprises: excluding the one or more specific datums of the plurality of datums between the object and the plurality of satellites that are incorrect datums from a computed solution determination of the object based on remaining datums of the plurality of datums between the object and the plurality of satellites.

In one embodiment, the plurality of datums comprises greater than four datums.

In one embodiment, the trusted computed solution for the object is based on all of the plurality of datums between the object and the plurality of satellites.

In one embodiment, all of the plurality of datums are determined using a single location determination hardware system. In one embodiment, the single location determination hardware system is a Global Navigation Satellite System (GNSS).

In one embodiment, determining the plurality of datums is based on a primary location determination hardware system, and wherein one of the one or more mitigation actions comprises switching from utilization of the primary location determination hardware system to a secondary location determination hardware system for geolocation of the object. In one embodiment, the primary location determination hardware system is based on Global Navigation Satellite System (GNSS) satellites, and wherein the secondary location determination hardware system is based on communication satellites. In one embodiment, the datums are distances to communication satellites that are calculated by echo messages communicated between the communication satellites and the object. In one embodiment, the datums are distances to communication satellites that are calculated by one-way relay messages communicated between the communication satellites and the object.

In one embodiment, the process is executed on a device other than the object, wherein the device is in communication with the object to obtain the plurality of datums.

In one embodiment, the process is executed on the object, and wherein the object is a mobile device.

In one embodiment, one of the one or more mitigation actions comprises determining a weighted average location of the object as a weighted average based on the plurality of datums.

In one embodiment, the plurality of datums is based on a plurality of location determination hardware systems.

In one embodiment, the plurality of datums is based on one or more location determination hardware systems selected from a group consisting of: the Global Positioning System (GPS), the BeiDou Navigation Satellite System (BDS), the Global Navigation Satellite System (GLONASS), the Galileo Global Navigation Satellite System, echo messages communicated between the communication satellites and the object, and one-way relay messages communicated between the communication satellites and the object.

In one embodiment, one of the one or more mitigation actions comprises providing a spoofing alert message.

In one embodiment, one of the one or more mitigation actions comprises alerting one or more subordinate devices. In one embodiment, alerting the one or more subordinate devices causes the one or more subordinate devices switch from utilization of a primary location determination hardware system to an alternative location determination hardware system for geolocation of the respective subordinate device of the one or more subordinate devices.

In one embodiment, the process is executed on an aircraft, and wherein one of the one or more mitigation actions comprises preventing a drop of cargo from the aircraft. In one embodiment, the cargo is configured to self-navigate during a drop based on a primary location determination hardware system, and wherein the plurality of datums are determined based on the primary location determination hardware system.

In one embodiment, the process is executed on an aircraft, and wherein a cargo associated with the aircraft is configured to self-navigate during a drop based on a primary location determination hardware system, and wherein the plurality of datums are determined based on the primary location determination hardware system, and wherein one of the one or more mitigation actions comprises instructing the cargo to utilize an alternative location determination hardware system during a drop from the aircraft.

In one embodiment, one of the one or more mitigation actions comprises adjusting one or more communication parameters of the primary location determination hardware system to circumvent spoofing communications of the primary location determination hardware system.

In one embodiment, one of the one or more mitigation actions comprises selecting one or more different satellites than the plurality of satellites to circumvent spoofed satellite signals associated with the plurality of satellites.

In one embodiment, the acceptable proximity is based on an accuracy error of the plurality of possible computed solutions.

In one embodiment, data associated with the distance between the object and each of the plurality of satellites to produce the corresponding plurality of datums is selected from a group consisting of: a computed distance between the object and each of the plurality of satellites; a determined time of flight of a radio signal between the object and each of the plurality of satellites; a computed delay time of a radio signal from each of the plurality of satellites to the object; and a computed time of arrival of a radio signal from each of the plurality of satellites to the object.

In one embodiment, the plurality of possible computed solutions for the object each based respectively on a corresponding one of the plurality of subsets of datums are selected from a group consisting of: a plurality of possible locations for the object; and a plurality of possible local times for the object.

Figure 40:
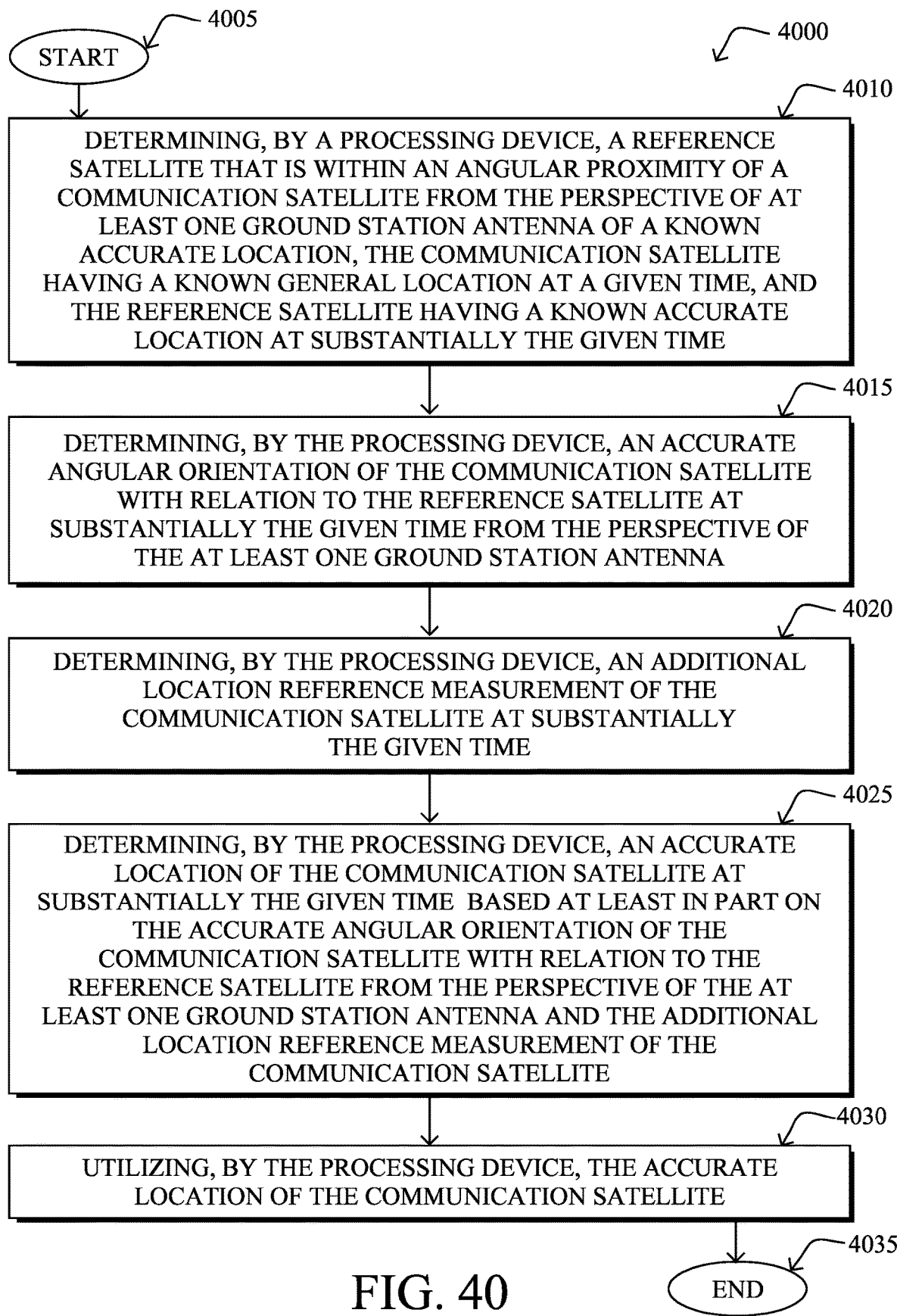
FIG. 40 illustrates an example simplified procedure for interferometry-based satellite location accuracy in accordance with one or more embodiments described herein.

Also, FIG. 40 illustrates an example simplified procedure for interferometry-based satellite location accuracy (e.g., related to the "modified Delta-DOR" technique described above) in accordance with one or more embodiments described herein. For example, a non-generic, specifically configured device (e.g., generally only ground station 650, or specific mobile devices 230 with appropriately configured and capable antennas) may perform procedure 4000 by having a processor execute stored instructions (e.g., a process) on the device (e.g., in a memory). The procedure 4000 may start at step 4005, and continues to the following steps, as described in greater detail above:

Step 4010: determining, by a processing device, a reference satellite that is within an angular proximity of a communication satellite from the perspective of at least one ground station antenna of a known accurate location, the communication satellite having a known general location at a given time, and the reference satellite having a known accurate location at substantially the given time;

Step 4015: determining, by the processing device, an accurate angular position of the communication satellite with relation to the reference satellite at substantially the given time from the perspective of the at least one ground station antenna;

Step 4020: determining, by the processing device, an additional location reference measurement of the communication satellite at substantially the given time;

Step 4025: determining, by the processing device, an accurate location of the communication satellite at substantially the given time based at least in part on the accurate angular position of the communication satellite with relation to the reference satellite from the perspective of the at least one ground station antenna and the additional location reference measurement of the communication satellite; and Step 4030: utilizing, by the processing device, the accurate location of the communication satellite.

The simplified procedure then ends in step 4035.

Note that other steps and details may also be included generally within the procedure above.

In one embodiment, the additional location reference measurement of the communication satellite comprises an accurate distance between the communication satellite and a particular ground station antenna of a known accurate location. In one embodiment, the accurate distance between the communication satellite and the particular ground station antenna is calculated based on an echo message communicated from the particular ground station antenna to the communication satellite and back to the particular ground station antenna. In one embodiment, the accurate distance between the communication satellite and the particular ground station antenna is calculated based on a one-way relay message communicated from an initiating ground station antenna via the communication satellite to the particular ground station antenna. In one embodiment, the particular ground station antenna is one of the at least one ground station antenna. In one embodiment, the accurate distance between the communication satellite and the particular ground station antenna is calculated based on a signal received by the at least one ground station antenna for use in determining the accurate angular position of the communication satellite with relation to the reference satellite.

In one embodiment, determining the accurate angular position of the communication satellite with relation to the reference satellite from the perspective of the at least one ground station antenna comprises: obtaining a first signal from the reference satellite received at both a first antenna of a first ground station of a known accurate location and at a second antenna of a second ground station of a known accurate location; obtaining a second signal from the communication satellite received at both a third antenna of the first ground station and at a fourth antenna of the second ground station; and processing receipts of the first signal and second signal at both the first ground station and the second ground station to determine the accurate angular position of the communication satellite with relation to the reference satellite. In one embodiment, processing receipts of the first signal and second signal at both the first ground station and the second ground station to determine the accurate angular position of the communication satellite with relation to the reference satellite from the perspective of the at least one ground station antenna comprises: determining a first differential one-way ranging (DOR) measurement based in part on comparing timing of receipt of the first signal from the reference satellite at the first antenna and the second antenna; determining a second DOR measurement based in part on comparing timing of receipt of the second signal from the communication satellite at the third antenna and the fourth antenna; calculating a delta-DOR measurement based on differencing the first DOR measurement and second DOR measurement; and determining the accurate angular position of the communication satellite with relation to the reference satellite from the perspective of the at least one ground station antenna based on the delta-DOR measurement. In one embodiment, the first ground station and the second ground station are separated by a baseline having a fixed and known distance. In one embodiment, the second signal received from the communication satellite is based on a message initially communicated from a particular ground station. In one embodiment, the message is communicated from the particular ground station to the communication satellite and back to both the third antenna and the fourth antenna. In one embodiment, the particular ground station is selected from a group consisting of: the first ground station; the second ground station; and a third ground station other than the first ground station and the second ground station. In one embodiment, the at least one ground station antenna is selected from a group consisting of: the first antenna; the second antenna; the third antenna; and the fourth antenna. In one embodiment, the method further comprises compensating for movement of the reference satellite when processing the first signal received from the reference satellite. In one embodiment, compensating comprises: determining a relative speed of the reference satellite; and shifting a frequency of the signals received from the reference satellite to compensate for Doppler shift based on the relative speed. In one embodiment, the additional location reference measurement of the communication satellite comprises at least two additional accurate angular positions of the communication satellite with relation to one or more respective reference satellites at substantially the given time from the perspective of at least two additional respective ground station antennas of respective known accurate locations. In one embodiment, at least one of the one or more respective reference satellites is the same as the reference satellite. In one embodiment, the first ground station and second ground station are clock synchronized.

In one embodiment, the accurate angular position is based on angular estimation by the at least one ground station antenna.

In one embodiment, utilizing the accurate location of the communication satellite comprises determining a location of an object based at least in part on a determined distance between the object and the communication satellite.

In one embodiment, utilizing the accurate location of the communication satellite comprises reporting the accurate location to a remote processing device. In one embodiment, the remote processing device is caused to determine a location of an object based at least in part on a determined distance between the object and the communication satellite. In one embodiment, the remote processing device is the object. In one embodiment, the remote processing device is one of: a ground station in communication with the object; and a computing device attached to a network of the ground station that is in communication with the object.

In one embodiment, determining the accurate location of the communication satellite is triggered in response to receiving a request for the accurate location communication satellite at substantially the given time.

In one embodiment, determining the accurate location of the communication satellite is triggered in response to receiving a request for an object location that is based on a distance to the communication satellite.

In one embodiment, determining the accurate location of the communication satellite is triggered in response to the processing device determining an object location that is based on a distance to the communication satellite.

In one embodiment, determining the accurate location of the communication satellite is triggered periodically.

In one embodiment, the reference satellite is a Global Navigation Satellite System (GNSS) satellite.

In one embodiment, the communication satellite is selected from a group consisting of: a geosynchronous equatorial orbit (GEO) satellite; a medium earth orbit (MEO) satellite; and a low earth orbit (LEO) satellite.

In one embodiment, the processing device is a ground station associated with the at least one ground station antenna.

In one embodiment, the communication satellite is moving within a range vicinity of the known general location over time, and wherein the accurate location of the communication satellite is valid for substantially the given time.

In one embodiment, the communication satellite is configured to track motion of the communication satellite over time based on one or more motion-based sensors on the communication satellite and to share the tracked motion with the processing device, and wherein the accurate location of the communication satellite is valid for an extended time beyond substantially the given time based on the tracked motion.

In one embodiment, one or both of the reference satellite and the communication satellite are moving over time, and the method further comprises: selecting the reference satellite from a plurality of possible reference satellites based on the reference satellite being within the angular proximity of a communication satellite at substantially the given time. In one embodiment, the reference satellite is selected based on the angular proximity between the reference satellite and the communication satellite being below a given threshold. In one embodiment, the given threshold is 10 degrees.

In one embodiment, the method further comprises: determining an accuracy of the accurate location of the communication satellite. In one embodiment, the method further comprises: sharing the accuracy of the accurate location of the communication satellite with one more remote processing devices to which the accurate location is reported. In one embodiment, determining the accuracy of the accurate location of the communication satellite is based on one or more factors selected from a group consisting of: a distance between antennas used in determining the accurate angular position of the communication satellite with relation to the reference satellite; a frequency difference between signals received by antennas for use in determining the accurate angular position of the communication satellite with relation to the reference satellite; and an angular proximity between the reference satellite and the communication satellite.

In one embodiment, utilizing the accurate location of the communication satellite comprises detecting spoofing of signals from Global Navigation Satellite System (GNSS) satellites.

In one embodiment, determining the accurate angular position of the communication satellite with relation to the reference satellite at substantially the given time from the perspective of the at least one ground station antenna further comprises: applying the accurate angular position of the communication satellite with relation to the reference satellite from the perspective of the at least one ground station antenna to a known accurate angular position of the reference satellite from the perspective of the at least one ground station antenna to determine an accurate angular position of the communication satellite from the perspective of the at least one ground station antenna.

Figure 41:
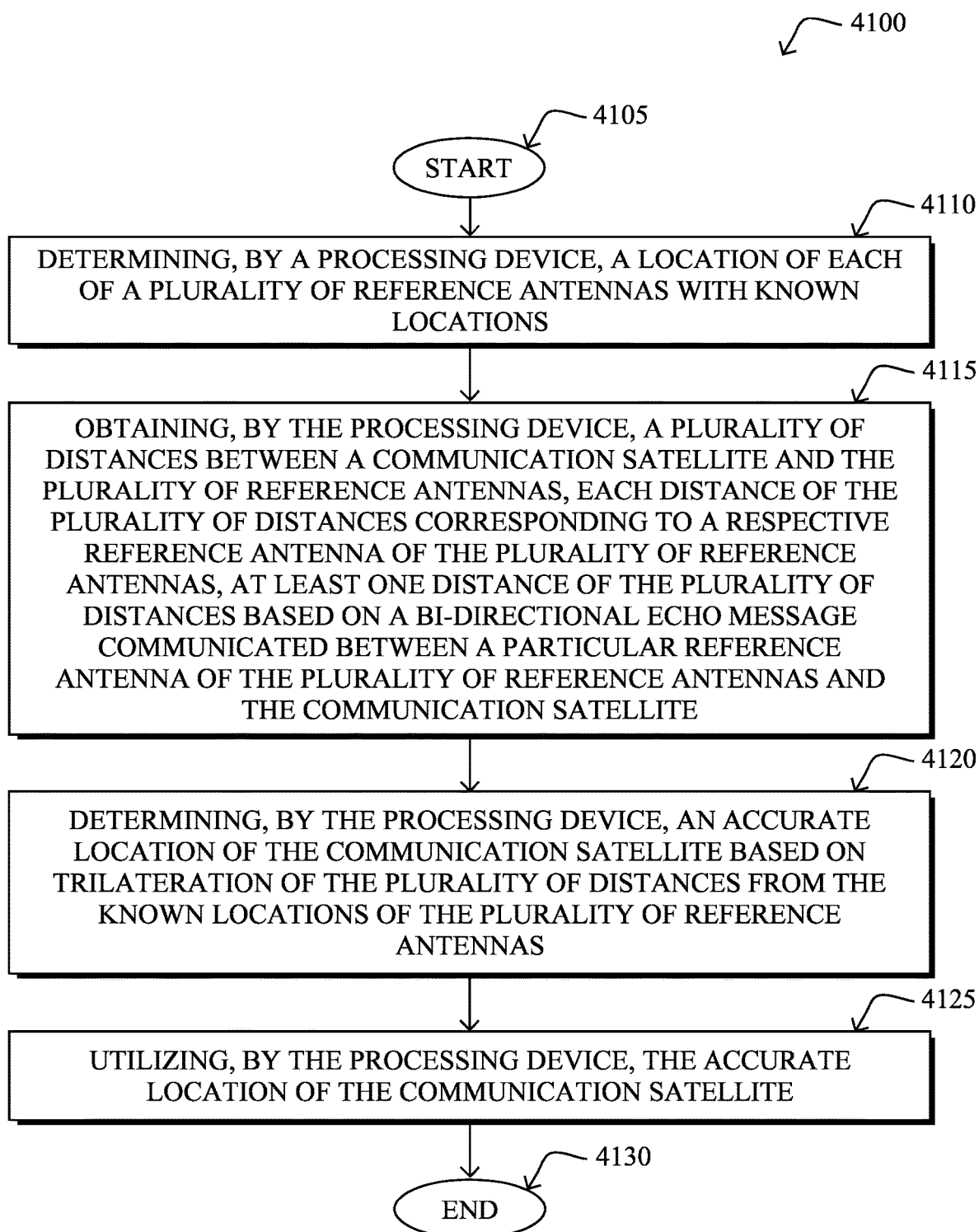
FIG. 41 illustrates an example simplified procedure for trilateration-based satellite location accuracy for improved satellite-based geolocation in accordance with one or more embodiments described herein.

Lastly, FIG. 41 illustrates an example simplified procedure for to trilateration-based satellite location accuracy for improved satellite-based geolocation in accordance with one or more embodiments described herein. For example, a non-generic, specifically configured device (e.g., generally only ground station 650, though also appropriately configured mobile devices 230 with known locations at the time) may perform procedure 4100 by having a processor execute stored instructions (e.g., a process) on the device (e.g., in a memory). The procedure 4100 may start at step 4105, and continues to the following steps, as described in greater detail above:

Step 4110: determining (e.g., calculating, obtaining, receiving, looking up, etc.), by a processing device, a location of each of a plurality of reference antennas with known locations;

Step 4115: obtaining, by the processing device, a plurality of distances between a communication satellite and the plurality of reference antennas, each distance of the plurality of distances corresponding to a respective reference antenna of the plurality of reference antennas, at least one distance of the plurality of distances based on an echo message communicated between a particular reference antenna of the plurality of reference antennas and the communication satellite;

Step 4120: determining, by the processing device, an accurate location of the communication satellite based on trilateration of the plurality of distances from the known locations of the plurality of reference antennas; and Step 4125: utilizing, by the processing device, the accurate location of the communication satellite.

The simplified procedure then ends in step 4130.

Note that other steps and details may also be included generally within the procedure above.

In one embodiment, the processing device is a ground station associated with one of the plurality of reference antennas.

In one embodiment, the processing device is a device that is not associated with any of the plurality of reference antennas, wherein the processing device is in communication with one or more devices that are associated with the plurality of reference antennas.

In one embodiment, at least one of the plurality of reference antennas is selected based on minimizing geometric dilution of precision (GDOP) caused by locations of the plurality of reference antennas relative to the communication satellite.

In one embodiment, obtaining the plurality of distances between the communication satellite and the plurality of reference antennas is based on one or more of: a) a remote echo message transmitted from a particular transmitting antenna of the plurality of reference antennas via the communication satellite and back to the transmitting antenna, wherein a first remote processing device associated with the particular transmitting antenna shares a result of the remote echo message with the processing device; b) a one-way relay message communicated from the particular reference antenna to a particular receiving antenna of the plurality of reference antennas via the communication satellite, wherein a second remote processing device associated with the particular receiving antenna shares a result of the one-way relay message with the processing device; and c) an additional echo message transmitted from the particular reference antenna via the communication satellite and a particular echoing antenna of the plurality of reference antennas and back to the particular reference antenna, wherein the processing device is associated with the particular reference antenna and locally computes a result of the additional echo message. In one embodiment, the result of the remote echo message, the result of the one-way relay message, and the result of the additional echo message are individually selected from a group consisting of: a distance-based result; and a time-based result.

In one embodiment, each distance of the plurality of distances is based on a respective echo message communicated between a respective reference antenna of the plurality of reference antennas and the communication satellite.

In one embodiment, the at least one distance based on the echo message between the particular reference antenna and the communication satellite is used when communicating one-way relay messages from the particular reference antenna to one or more other reference antennas of the plurality of reference antennas via the communication satellite, wherein the at least one distance based on the echo message between the particular reference antenna and the communication satellite is subtracted from ranging calculations for distances based on the one-way relay messages from the particular reference antenna to the one or more other reference antennas. In one embodiment, the distances between the communication satellite and the one or more other reference antennas based on the one-way relay messages from the particular reference antenna to the one or more other reference antennas are calculated at a ground station associated with the one or more other reference antennas and shared with the processing device. In one embodiment, timing values based on the one-way relay messages from the particular reference antenna to the one or more other reference antennas are shared with the processing device for calculating the distances from the communication satellite to the one or more other reference antennas.

In one embodiment, the at least one distance based on the echo message between the particular reference antenna and the communication satellite is used when communicating additional echo messages from the particular reference antenna to one or more other reference antennas of the plurality of reference antennas via the communication satellite, wherein the at least one distance based on the echo message between the particular reference antenna and the communication satellite is subtracted from ranging calculations for distances based on the additional echo messages from the particular reference antenna to the one or more other reference antennas.

In one embodiment, the known locations of one or more of the plurality of reference antennas are based on a Global Navigation Satellite System (GNSS).

In one embodiment, the known locations of one or more of the plurality of reference antennas are based on manual entry of the known locations.

In one embodiment, one or more subsets of reference antennas of the plurality of reference antennas are part of a same ground station and are separated by a fixed distance.

In one embodiment, utilizing the accurate location of the communication satellite comprises determining a location of an object based at least in part on a determined distance between the object and the communication satellite.

In one embodiment, utilizing the accurate location of the communication satellite comprises reporting the accurate location to a remote processing device. In one embodiment, the remote processing device is caused to determine a location of an object based at least in part on a determined distance between the object and the communication satellite. In one embodiment, the remote processing device is the object. In one embodiment, the remote processing device is one of: a ground station in communication with the object; and a computing device attached to a network of the ground station that is in communication with the object.

In one embodiment, determining the accurate location of the communication satellite is triggered in response to receiving a request for the accurate location communication satellite.

In one embodiment, determining the accurate location of the communication satellite is triggered in response to receiving a request for an object location that is based on a distance to the communication satellite when the accurate location of the communication satellite is either unknown or outdated.

In one embodiment, determining the accurate location of the communication satellite is triggered in response to the processing device determining an object location that is based on a distance to the communication satellite when the accurate location of the communication satellite is either unknown or outdated.

In one embodiment, determining the accurate location of the communication satellite is triggered periodically.

In one embodiment, the communication satellite is selected from a group consisting of: a geosynchronous equatorial orbit (GEO) satellite; a medium earth orbit (MEO) satellite; and a low earth orbit (LEO) satellite.

In one embodiment, the communication satellite is moving within a vicinity of the known general location over time, and wherein the accurate location of the communication satellite is valid for a given time.

It should be noted that the steps shown and described in the flowcharts/procedures above are merely examples for illustration, and certain other steps may be included or excluded as desired. For instance, as mentioned above, other steps and details may also be included generally within procedures above as described herein. Further, while a particular order of the steps is shown, this ordering is merely illustrative, and any suitable arrangement of the steps may be utilized without departing from the scope of the embodiments herein. Moreover, while procedures may be described separately, certain steps from each procedure may be incorporated into each other procedure, and the procedures are not meant to be mutually exclusive.

Figure 42:
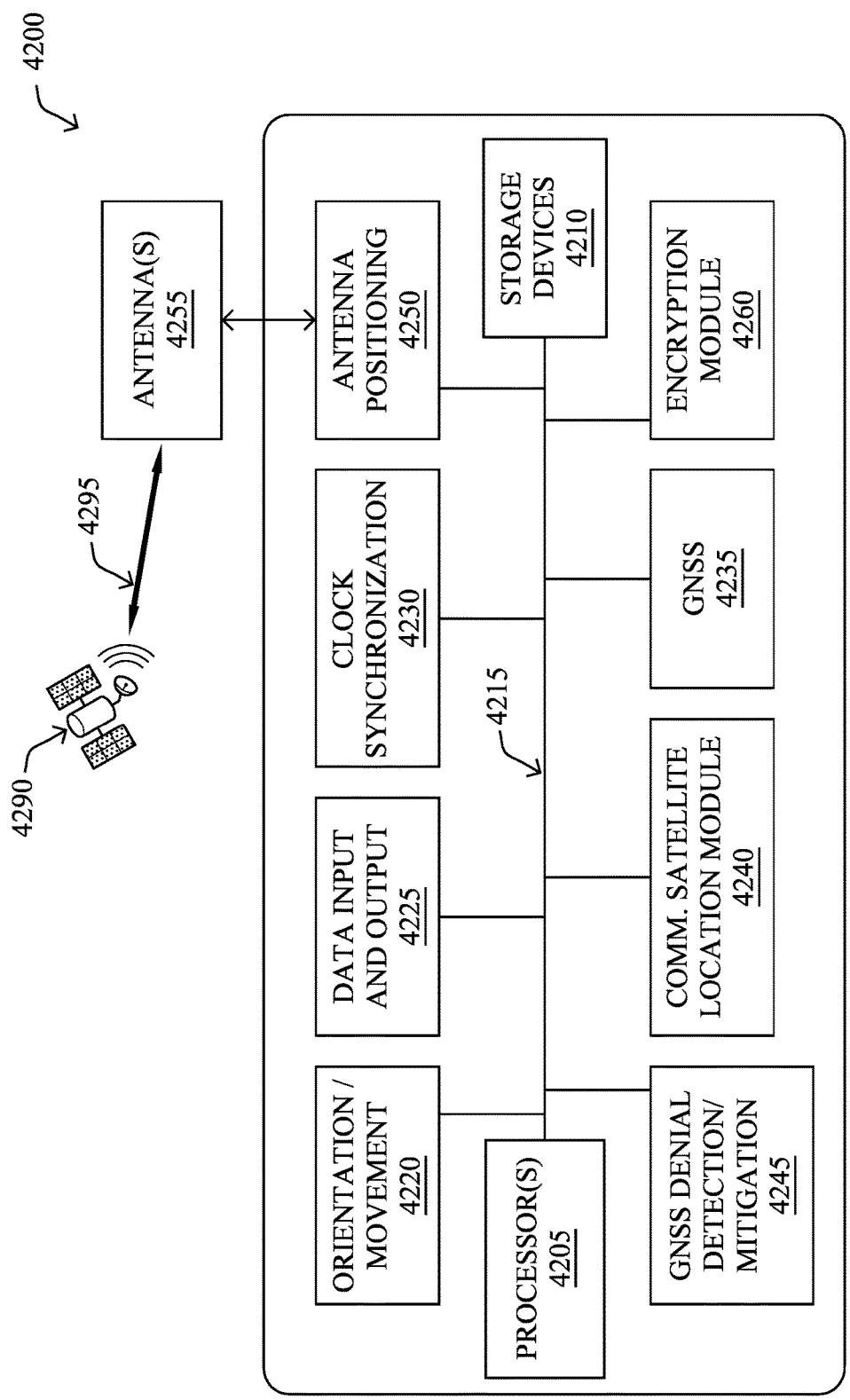
FIG. 42 illustrates an example simplified block diagram of a computing device in accordance with one or more embodiments described herein.

FIG. 42 is an example drawing of a computing device 4200 in accordance with one or more embodiments herein. In particular, the device 4200 may be embodied as a ground station 650 (e.g., satellite communication teleport, building, command center, antenna array, etc.) or a mobile device 230 (e.g., a smartphone, GNSS receiver, vehicle, vessel, boat, aircraft, spacecraft, IoT device, inventory tracker, and so on), depending upon the particular embodiment, implementation, and perspective as described above. The device 4200 may also be embodied as a tethered device, such as having some or all components located within a single enclosure that relays information to another device connected via a communication link, or else where certain components are located in one enclosure (e.g., antennas and antenna positioning control). For example, the techniques herein may assist with underwater geolocation using such a tethered configuration from a submerged vessel (and the "receive only" embodiments herein would also be helpful for remaining generally hidden).

The operation of device 4200 is governed by the controller or processor(s) 4205. The control may be, and often is, governed by software modules residing in the memory of storage device 4210 or shown separately (e.g., hardware, software, firmware, or combinations thereof), where communication between the storage device, processor(s), and various modules is conducted over an internal communication bus 4215.

Various orientation and/or movement sensors 4220, such as gyros (gyroscopes), accelerometers, compasses, barometers, etc. may be used to determine general movement and orientation of the device 4200, such as angle to the earth, degrees to true north, acceleration in a particular direction, and so on, in order to roughly track the location of a mobile device as well as to track the aim of antennas of the device.

Device 4200 may also include a data input/output (I/O) module 4225. The module 4225 on a mobile device may be any combination of a microphone for entering a voice message, a keyboard for entering a text message, and a video camera for entering a video message, and a network connection for entering any type of received data. In accordance with another embodiment, the data entry module is a sensor such as an IoT device which produces data to be transmitted securely to another user such as a person, a server, or another device. Data I/O module 4225 on a ground station, on the other hand, may be generally a computer network connection to send and receive data of any configuration, as well as internally generated data for mobile device tracking as described herein.

As mentioned above, a clock synchronization module 4230 may, in certain configurations on the mobile device 230 but in most configurations on the ground station 650, contain one or more mechanisms for maintaining a precision clock, which may be a time shared across multiple time-synchronized devices. For example, atomic clocks are a well-known method for maintaining strict clock synchronization, and while typically large and expensive, and thus reserved for larger devices such as ground stations, recent advances in technology has allowed for chip-sized (or chip-scale) atomic clocks (CSAC), often at reasonable costs, and suitable for use on a mobile device. (One such atomic clock, for example, is the "SA.45s" Chip Size Atomic Clock (CSAC) jointly developed at Symmetricom, Draper Laboratory, and Sandia National Laboratories, which is about the size of a matchbox, weighs about 35 grams, and has a power requirement of only 115 mW.) Other clock synchronization techniques (including one mentioned further below) may also be coordinated by the clock synchronization module 4230, and an atomic clock is merely one example. For example, microelectromechanical system oscillators (MEMS oscillators) are timing devices that generate highly stable reference frequencies, and may be used herein. Note that with precise clock synchronization, the techniques herein may also employ further spoofing detection procedures, such as comparing a GNSS-based computed time to a local time (e.g., from an atomic clock), to determine whether the compared times are the same (e.g., within a given acceptable threshold), or if they are different, possibly indicating a spoofing attack.

GNSS module 4235 may be used to determine the location of the device based on one or more GNSS technologies, such as GPS, Galileo, etc., using received signals from GNSS satellites 110, accordingly, as will be understood by those skilled in the art.

Communication satellite location module 4240, on the other hand, may be used by the device 4200 to complete any of the tasks detailed above for either determining a device location, or for determining a location of a communication satellite, based on the numerous techniques detailed within the present disclosure.

GNSS denial detection and mitigation module 4245 may thus receive information from the GNSS module 4235 and the communication satellite location module 4240, and based on the one or more embodiments described in greater detail above, may make determinations as to whether the GNSS location is accurate or is being spoofed (or jammed), and may take one or more mitigation actions as also detailed above.

The antenna positioning module 4250 illustratively positions the antenna(s) 4255 in the direction of a particular satellite 4290, as described above for transmission and/or reception of signals 4295. Notably, as described above, a communication satellite antenna for a mobile device may be a directional, wide-lobed antenna, illustratively of a mobile-sized form factor (e.g., handheld). On the other hand, an antenna for a ground station may be a large, multi-meter satellite dish. Notably, either antenna is respectively capable of transmitting and receiving wide bandwidth signals to achieve an exceptionally fine measurement of transit time to achieve the precision ranging results detailed above. Also, one antenna 4255 may be used for communication (e.g., with GEOs), while another separate antenna 4255 may be used for GNSS reception (e.g., GPS antenna), and the view is shown merely for simplicity.

The operation of directing the antenna towards a satellite can be one of physically moving the antenna 4255 towards the selected satellite (e.g., one or more motors, gimbals, etc.), instructing the user of the device 4200 to point the antenna towards the satellite, or changing the parameters of a phased array antenna to point the lobe of the antenna towards the selected satellite, or any other method resulting in pointing the antenna towards the selected satellite. Satellite 4290 is similar to GNSS satellites 110 and communication satellites 210 above. In accordance with one embodiment, the signals 4295 may be encrypted/decrypted using encryption module 4260, where the specific encryption mechanisms may be adjusted on-demand as described above.

Note that in one embodiment, for reception of a message, the device 4200 (e.g., a mobile communication device) may periodically probe the ground station via any satellite to find out if there are any messages for the device. For example, if there is a message for the device, the ground station (via the probed satellite) transmits a command to the device advising it about the messages that will be sent to it and the satellites that will be used (unless, that is, the protocol configured is to use the same satellite that conveyed the info/command message in the first place for transmitting the subsequent messages themselves, as well). The device verifies that it can communicate with the satellites and acknowledges to the ground station the proposed transmission scheme. Alternatively, the device may suggest to the ground station which satellites are visible and request that the ground station utilize these satellites for sending the message.

Other configurations of a computing device 4200 may be used in accordance with the techniques herein, and FIG. 42 is merely an example of one implementation. For instance, more or fewer modules may be included, and certain modules may be embodied as software processes within storage device 4210 for execution by the processor 4205. As such, any module and/or process described herein may generally be referred to as a process for execution by a processor. For instance, when the computing device is the ground station, for example, certain computations may involve coordination between multiple computing devices, where the "process" comprises one or more coordinated components, such as, e.g., Delta DOR computations using two antennas and a delay analyzer, as described above.

As noted above, clock synchronization process 4230 may use one or more techniques in addition to or as an alternative to atomic clock synchronization. For instance, in accordance with one or more embodiments herein, the communication messages above may provide precision time transfer using two-way, common view, time transfer techniques (or "two-way satellite time and frequency transfer", TWSTFT). In particular, by using two-way communication over communication (e.g., GEO) satellites 210, the techniques herein can perform two-way (common view) time transfer, as compared to the one-way transfer of GNSS (e.g., GPS clock synchronization), as will be appreciated by those skilled in the art.

Figure 43:
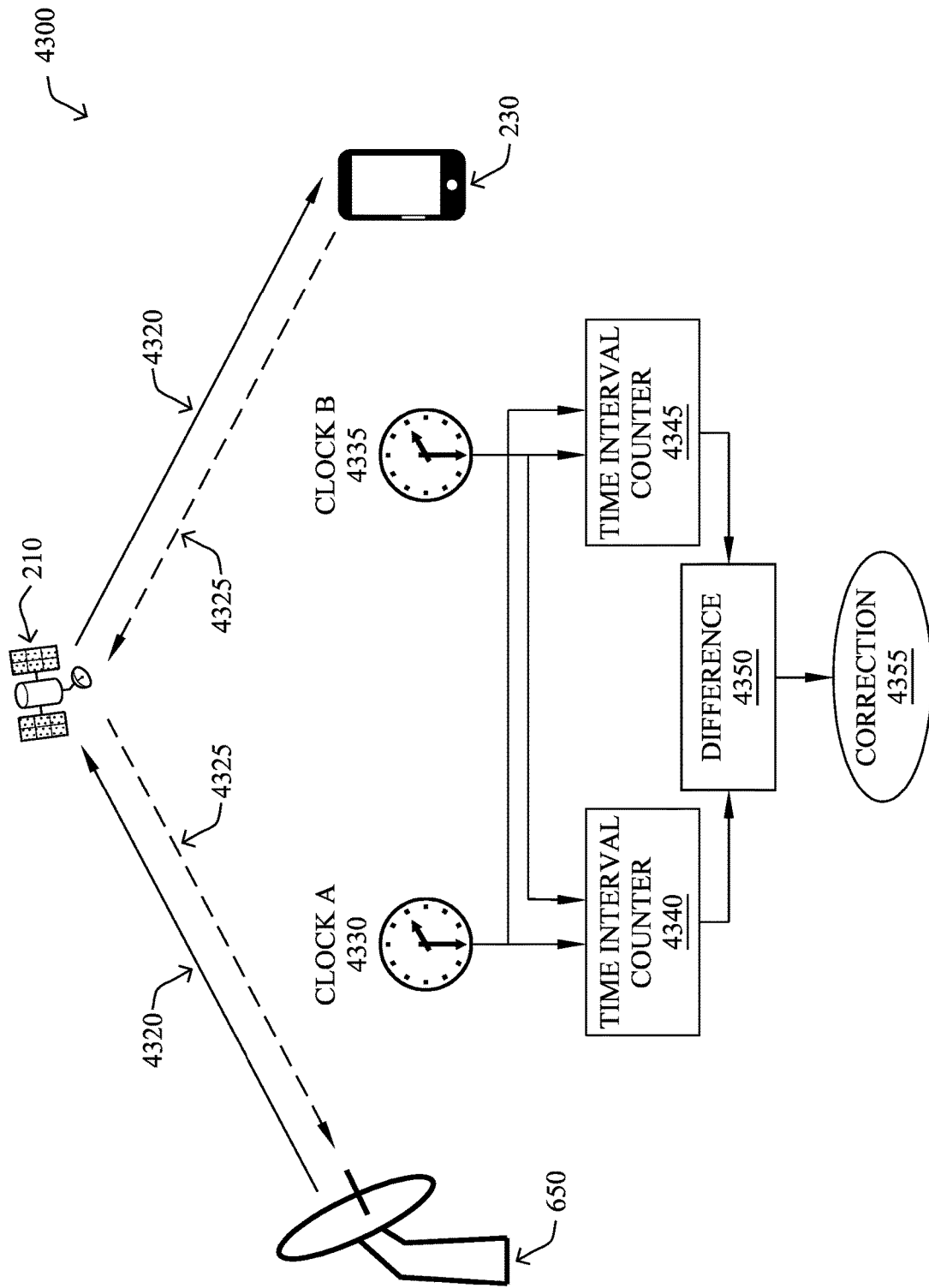
FIG. 43 illustrates an example of two-way (common view) time transfer for clock synchronization in accordance with one or more embodiments described herein.

For instance, with reference to illustration 4300 of FIG. 43, with two-way time transfer, both the ground station 650 (with clock A 4330) and the mobile device 230 (with clock B 4335) will initiate independent time-of-flight measurements: one path from A to B (messages 4320-A) and one path from B to A (messages 4325) (via satellite 210). As will be appreciated by those skilled in the art, the signals and timing can be combined and compared based on time interval measurements (made with time interval counters (TICs) at each site, illustratively 4340 at the ground station and 4345 at the mobile device), where the TICs are started by a pulse from the local clock and stopped by the received pulse from the remote clock. At the same time as the local clock pulse is starting the TIC it is also being transmitted to the other station. (The same process goes on at both stations.) Typically, a one-pulse-per-second (PPS) signal is used, but others may be configured based on numerous implementation factors. This time interval data is recorded at both sites and then the data files are exchanged (in additional messages transmitted back and forth) and then differenced (e.g., difference 4350) to create a correction 4355 at each clock in order to synchronize the clocks, accordingly.

One particular advantage of this technique over GNSS time transfer is that common mode errors are subtracted out to provide a more accurate time transfer (e.g., a factor 2× improvement in time measurement accuracy). That is, stable and accurate time transfer can be accomplished since nearly all of the propagation delay cancels out due to symmetry of the two-way comparison.

In addition, through the illustrative two-way time transfer techniques herein that place the atomic time reference at the ground station, the embodiments herein are more "future-proof" than systems that use atomic clocks on the satellites (e.g., GNSS or GEO satellites, particularly due to their bent pipe architecture). This allows the time transfer accuracy to continually improve as basic clock technology advances.

Further accuracy in time synchronization can make for better TDOA measurements, where such measurements enable more accurate ranging distances, and thus more accurate locations through trilateration. In addition, the time synchronization between endpoints (e.g., mobile device 230 and ground station 650) can provide a mechanism for confirmation of location, as described above. For instance, as discussed above with reference to FIG. 36, when the distance between the mobile device and the communication satellite 210 is not as-expected by more than some threshold difference, it can be assumed that the mobile device is not actually where it believes it is. For the ground station to make this determination, however, synchronized clocks are necessary. As such, where atomic clocks are not used on the mobile devices, the two-way time transfer techniques would allow for an accurate synchronization that would thus enable the embodiments above that require such synchronization, accordingly.

Note, too, that in still another embodiment of the present disclosure, the availability of clock synchronization, whether through a chip-size atomic clock or the two-way time transfer techniques above, would allow still another mechanism for spoofing detection herein. In particular, certain types of GNSS spoofing attacks result in an incorrect time being sent in the spoofing signals (e.g., time-specific attacks, drifting times, reusing old signals in a new location, etc.). As such, where clock synchronization is available on the mobile device, or more particularly, where clock accuracy can be assured on the mobile device (whether through atomic clocks on the mobile device or through the two-way time transfer techniques above), GNSS spoofing can be detected in response to a received GNSS signal that would correlate to an incorrect time associated with it (e.g., precisely or within an error tolerance threshold). For instance, the time may be considered incorrect based on a resultant GNSS-based time determination being off by more than an acceptable amount from the actual (synchronized) time. Alternatively, the time may be considered incorrect based on a single GNSS message by determining either that the transmission time is in the future, or that the distance that GNSS message signal would have to travel based on time calculations is unlikely or impossible (e.g., where the difference between the time allegedly transmitted and the actual synchronized time received would result in a time-of-flight range calculation to the GNSS satellite that is outside the range of possibility, whether too close or too far).

As a general example operational scenario of one or more of the techniques described herein, assume that a user has a mobile device 230 with both GNSS (e.g., GPS) capabilities and a directional antenna and corresponding location algorithm for the techniques described herein (e.g., WAI messages and calculations, etc.). When GNSS is not compromised, the user may simply use GNSS because of its general ease and accuracy. However, when GNSS is denied or there is suspected interference, as described above, the device switches to the secondary location algorithm, which requires that the directional antenna be pointed in defined directions to capture the signals from each of at least two communication (e.g., GEO) satellites, as detailed above. Note that this pointing process could be manual (i.e., the user directs the antenna) or automatic (e.g., motors, gimbals, etc.), depending on the system need and configuration. The position fix may then be determined by the mobile device, or may be computed at the ground station and then forwarded to the mobile device, accordingly.

Figure 44B:
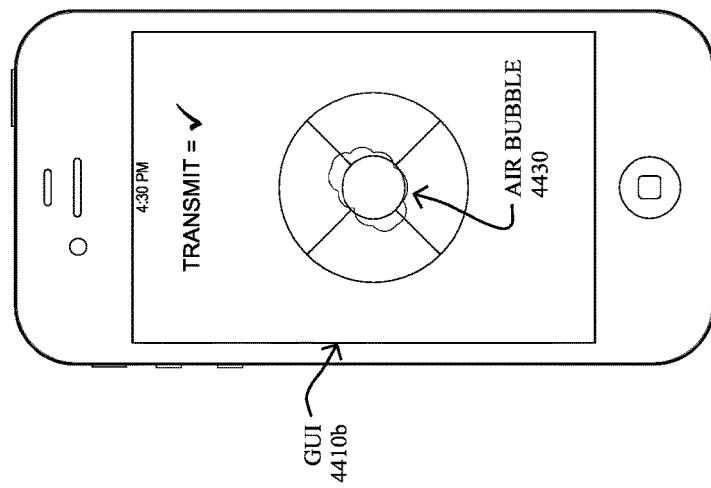
FIGS. 44A-44B illustrate examples of a graphical user interface (GUI) for use with one or more embodiments of the present disclosure.
Figure 44A:
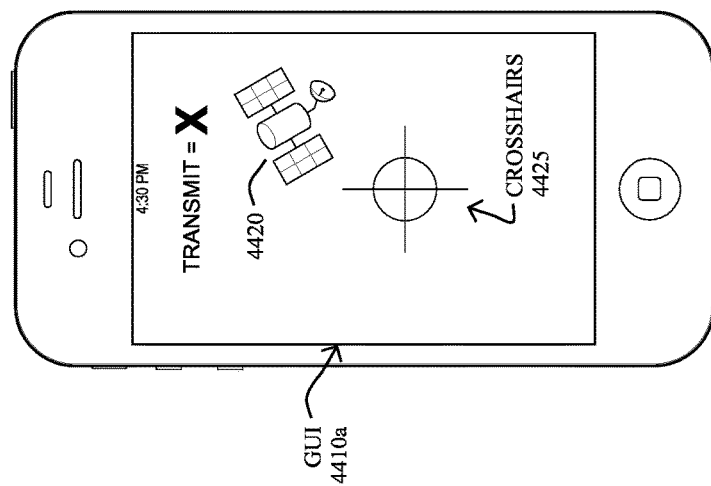

FIGS. 44A-44B illustrate examples of a GUI that may be used according to the techniques described above, particularly for user-based control of the directional antenna. In particular, FIG. 44A illustrates a first mobile device 4400a with an example augmented reality (AR) like GUI display 4410a with an AR satellite 4420 and stationary "crosshairs" 4425 to aim at the satellite, thus representing the desired direction to point the mobile device 230 (whether the satellite is actually located in that direction, or whether that merely represents the desired "aim" of the mobile device to direct the transmission or reception by the directional antenna according to the desired communication parameters). As shown, the mobile device is not pointing in the proper direction (i.e., the moving AR satellite 4420 is not within the crosshairs 4425 of the GUI 4410a), and thus the mobile device should not (or in certain instances, cannot) transmit, or may not be able to receive the desired signals from the intended satellite. Alternatively, FIG. 44B illustrates an example mobile device 4400b with an "air bubble" 4430 on GUI display 4410b to guide a user to point the device to the desired angle. As shown in FIG. 44B, the illustrative air bubble 4430 is "level", and as such, the terminal is appropriately aimed, and transmission and/or reception may commence. Many other types of GUIs and functionalities may be conceived, and those shown herein are not meant to be limiting to the scope of the present disclosure.

Notably, in other embodiments, such as where user intervention is not necessary for movement (e.g., automated terminals, drones/UAVs, etc.), the terminals may be re-aimed, repositioned, moved, elevated, etc., based on terminal-directed or server-directed commands according to the adjusted communication parameters as described herein. That is, no user-based GUI would be necessary to ensure proper adjustment/aim, where sensors and/or controls internal to the terminal would sufficiently and autonomously adjust the orientation of the terminal, accordingly.

Advantageously, the techniques herein provide for multi-system-based detection and mitigation of Global Navigation Satellite System (GNSS) spoofing, particularly for use with a robust positioning and navigation system that is less prone to jamming or spoofing, and that is not dependent on receiving signals from traditional GNSS satellites, and can thus be a standalone system or a companion system to conventional GNSS systems. In particular, certain of the techniques herein offer one or more of the following advantages over other technologies:

One or more embodiments herein may be initiated by the user terminal and as such are much more difficult to jam or to manipulate.

One or more embodiments herein allow for various modifications without hardware reconfiguration, such as frequencies, encryption, calculations, and so on.

One or more embodiments herein do not need to involve processing by a satellite ground station in certain configurations. On the contrary, the mobile device/terminal herein can determine its own location for its own use based on echo messages from satellites (with minimal, or in certain embodiments no, processing from the satellites—e.g., simple communication satellites that echo signals).

One or more embodiments herein do not require the mobile device to have high processing power or high receiver sensitivity (e.g., to detect and process satellite signals received via side-lobes).

One or more embodiments herein use space trilateration that utilizes messages and message parameters determined on the ground—not fixed/hard-coded messages from the sky (like GPS).

One or more embodiments herein use space trilateration using echoed transmissions (self-clocking).

One or more embodiments herein use space trilateration using transmissions that generate overlapping spheres (mathematical spheres from ranging) not hyperboloids (from differencing) offering better accuracy.

One or more embodiments herein use space trilateration using transmissions that generate overlapping spheres not hyperboloids by use of two satellites not three.

One or more embodiments herein use ranging from two or more satellites using the adjacent satellite interference (ASI) spillover.

One or more embodiments herein result in less ionospheric perturbation due to optional use of 4 GHz and 6 GHz signals, rather than 1.5 GHz signals.

One or more embodiments herein are based on geolocation of mobile devices using directional antennas (with narrow lobes) from the ground.

One or more embodiments herein are based on geolocation without time difference of arrival (TDOA) computation (i.e., need no time synchronization between devices).

One or more embodiments herein may use matched filter processing to increase the signal-to-noise ratio (SNR) and add further jam prevention.

One or more embodiments herein provide a wide area of coverage.

One or more embodiments herein may be implemented with a minimal investment cost (e.g., no new satellites needed).

One or more embodiments herein provide a viable handheld solution (e.g., in terms of size, weight, and power).

One or more embodiments herein employ political autonomy in ability (i.e., not limited to country-specific GNSS satellites).

One or more embodiments herein allow operational parameters of the system to be controlled by the end devices, rather than by a central control (such as in GNSS).

One or more embodiments herein have a low probability of detection (LPD) of transmitted signals.

While there have been shown and described illustrative embodiments, it is to be understood that various other adaptations and modifications may be made within the scope of the embodiments herein. For example, the embodiments may, in fact, be used in a variety of types of wireless communication networks and/or protocols, and need not be limited to the illustrative satellite implementation. Furthermore, while the embodiments may have been demonstrated with respect to certain communication environments, physical environments, or device form factors, other configurations may be conceived by those skilled in the art that would remain within the contemplated subject matter of the description above.

In particular, though the United States typically focuses on GPS technologies, other global navigation satellite systems (GNSS) exist, such as the BeiDou Navigation Satellite System, the European Galileo positioning system, and the Russian GLONASS system. In principle, all these systems work similarly by transmitting a pre-defined continuous frequency/messages (albeit using different frequencies and different encoding schemes), and each of which may be susceptible to jamming/spoofing. The techniques herein, when related to GNSS may thus also utilize satellites other than the US GPS satellites for various aspects of the techniques herein (e.g., detecting jamming/spoofing, a point of reference for the modified Delta-DOR techniques, and so on). As such, the term "GPS" as used herein may be used to refer to any of the GNSS satellites and their corresponding technologies, and "GNSS" as used herein may also refer to any navigation satellite system as will be understood by those skilled in the art.

Also, while there have been shown and described illustrative embodiments that relate to determining the location of a mobile device based on utilizing GEO satellites, it is to be understood that various other adaptations and modifications as well as utilization of other satellites can be used without any modifications to the techniques described herein (e.g., MEO, LEO, etc.).

Moreover, it is worth pointing out again that although certain units, data types, procedures, and equations may have been described above, other similarly functional alternatives may be used within the scope of the present disclosure, where applicable. For instance, while a procedure may discuss manipulating distances to create a computed result, a suitable alternative may be to manipulate times of flight to create a computed result prior to converting that result into a distance. Other alternatives to determining a "distance" may comprise determining a "measure of distance", such as time of travel of a signal, time of arrival of a signal, phase of arrival of a signal, and so on. Still other alternatives may also exist herein, as will be appreciated by those skilled in the art, such as detecting spoofing based on outlier distances as opposed to outlier locations, and so on.

Furthermore, in the detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Also, in one embodiment, an illustrative tangible, non-transitory, computer-readable medium according to one or more embodiments of the present disclosure may store program instructions that cause a computer (processing device) to execute a process comprising: obtaining a first location of an object from a primary location determination hardware system; obtaining a second location of the object from a secondary location determination hardware system; determining a distance difference between the first location and the second location; determining whether the distance difference between the first location and the second location is acceptable based on a threshold distance; and initiating one or more mitigation actions in response to the distance difference between the first location and the second location being unacceptable.

Further, in one embodiment, an illustrative apparatus according to one or more embodiments of the present disclosure may comprise: a processor configured to execute one or more processes; a communication interface configured to communicate via one or more satellite antennas associated with the apparatus; and a memory configured to store a process executable by the processor, the process, when executed, configured to perform a process comprising: obtaining a first location of an object from a primary location determination hardware system; obtaining a second location of the object from a secondary location determination hardware system; determining a distance difference between the first location and the second location; determining whether the distance difference between the first location and the second location is acceptable based on a threshold distance; and initiating one or more mitigation actions in response to the distance difference between the first location and the second location being unacceptable.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   obtaining, by a process, a first location of an object from a primary location determination hardware system;
   obtaining, by the process, a second location of the object from a secondary location determination hardware system;
   determining, by the process, a distance difference between the first location and the second location;
   determining, by the process, whether the distance difference between the first location and the second location is acceptable based on a threshold distance; and
   initiating, by the process, one or more mitigation actions in response to the distance difference between the first location and the second location being unacceptable, wherein one of the one or more mitigation actions comprises switching from utilization of the primary location determination hardware system to the secondary location determination hardware system for geolocation of the object.

2. The method as in claim 1, wherein the primary location determination hardware system is based on distances to Global Navigation Satellite System (GNSS) satellites, and wherein the secondary location determination hardware system is based on distances to communication satellites.

3. The method as in claim 2, wherein:
distances to communication satellites are calculated by echo messages communicated between the communication satellites and the object, or
distances to communication satellites are calculated by one-way relay messages communicated between the communication satellites and the object, or both.

4. The method as in claim 1, wherein the object is a mobile device.

5. The method as in claim 1, wherein:
the process is executed on a ground station in communication with the object, or
the process is executed on the object, when the object is a mobile device.

6. The method as in claim 1, wherein the primary location determination hardware system and secondary location determination hardware system are located on first and second devices, respectively, wherein the first and second devices are in communication with each other.

7. The method as in claim 6, wherein one of the first and second devices is the object.

8. A method, comprising:
obtaining, by a process, a first location of an object from a primary location determination hardware system;
obtaining, by the process, a second location of the object from a secondary location determination hardware system;
determining, by the process, a distance difference between the first location and the second location;
determining, by the process, whether the distance difference between the first location and the second location is acceptable based on a threshold distance; and
initiating, by the process, one or more mitigation actions in response to the distance difference between the first location and the second location being unacceptable, wherein the primary location determination hardware system and secondary location determination hardware system are located on a single device.

9. The method as in claim 8, wherein:
the single device is the object; or
the single device is a separate device other than the object.

10. The method as in claim 8, wherein one of the one or more mitigation actions comprises switching from utilization of the first location to the second location.

11. The method as in claim 8, wherein the primary location determination hardware system is based on distances to Global Navigation Satellite System (GNSS) satellites, and wherein the secondary location determination hardware system is based on distances to communication satellites.

12. The method as in claim 11, wherein:
distances to communication satellites are calculated by echo messages communicated between the communication satellites and the object, or
distances to communication satellites are calculated by one-way relay messages communicated between the communication satellites and the object, or both.

13. The method as in claim 8, wherein the object is a mobile device.

14. The method as in claim 8, wherein:
the process is executed on a ground station in communication with the object, or
the process is executed on the object, when the object is a mobile device.

15. The method as in claim 8, wherein the primary location determination hardware system and secondary location determination hardware system are located on first and second devices, respectively, wherein the first and second devices are in communication with each other.

16. The method as in claim 15, wherein one of the first and second devices is the object.

17. A method, comprising:
obtaining, by a process, a first location of an object from a primary location determination hardware system;
obtaining, by the process, a second location of the object from a secondary location determination hardware system, wherein the primary location determination hardware system has a better sensitivity than the secondary location determination hardware system;
determining, by the process, a distance difference between the first location and the second location;
determining, by the process, whether the distance difference between the first location and the second location is acceptable based on a threshold distance; and
initiating, by the process, one or more mitigation actions in response to the distance difference between the first location and the second location being unacceptable.

18. The method as in claim 17, wherein one of the one or more mitigation actions comprises switching from utilization of the first location to the second location.

19. The method as in claim 17, wherein the object is a mobile device.

20. The method as in claim 17, wherein:
the process is executed on a ground station in communication with the object, or
the process is executed on the object, when the object is a mobile device.

21. The method as in claim 17, wherein the primary location determination hardware system and secondary location determination hardware system are located on first and second devices, respectively, wherein the first and second devices are in communication with each other.

22. The method as in claim 21, wherein one of the first and second devices is the object.

23. A method, comprising:
obtaining, by a process, a first location of an object from a primary location determination hardware system;
obtaining, by the process, a second location of the object from a secondary location determination hardware system;
determining, by the process, a distance difference between the first location and the second location;
determining, by the process, whether the distance difference between the first location and the second location is acceptable based on a threshold distance;
initiating, by the process, one or more mitigation actions in response to the distance difference between the first location and the second location being unacceptable; and
utilizing the first location in response to the distance difference between the first location and the second location being acceptable.

24. The method as in claim 23, wherein one of the one or more mitigation actions comprises switching from utilization of the first location to the second location.

25. The method as in claim 23, wherein the primary location determination hardware system is based on distances to Global Navigation Satellite System (GNSS) satellites, and wherein the secondary location determination hardware system is based on distances to communication satellites.

26. The method as in claim 25, wherein:
distances to communication satellites are calculated by echo messages communicated between the communication satellites and the object, or
distances to communication satellites are calculated by one-way relay messages communicated between the communication satellites and the object, or both.

27. The method as in claim 23, wherein the object is a mobile device.

28. The method as in claim 23, wherein:
the process is executed on a ground station in communication with the object, or
the process is executed on the object, when the object is a mobile device.

29. The method as in claim 23, wherein the primary location determination hardware system and secondary location determination hardware system are located on first and second devices, respectively, wherein the first and second devices are in communication with each other.

30. The method as in claim 29, wherein one of the first and second devices is the object.

31. A method, comprising:
obtaining, by a process, a first location of an object from a primary location determination hardware system;
obtaining, by the process, a second location of the object from a secondary location determination hardware system;
determining, by the process, a distance difference between the first location and the second location;
determining, by the process, whether the distance difference between the first location and the second location is acceptable based on a threshold distance; and
initiating, by the process, one or more mitigation actions in response to the distance difference between the first location and the second location being unacceptable, wherein one of the one or more mitigation actions comprises determining a weighted average location of the object as a weighted average between the first location and second location.

32. A method, comprising:
obtaining, by a process, a first location of an object from a primary location determination hardware system;
obtaining, by the process, a second location of the object from a secondary location determination hardware system, wherein at least one of the primary location determination hardware system and the secondary location determination hardware system is based on a fusion algorithm using input from a plurality of location determination hardware systems, wherein the primary location determination hardware system and the secondary location determination hardware system differ by at least one location determination hardware system;
determining, by the process, a distance difference between the first location and the second location;
determining, by the process, whether the distance difference between the first location and the second location is acceptable based on a threshold distance; and
initiating, by the process, one or more mitigation actions in response to the distance difference between the first location and the second location being unacceptable.

33. A method, comprising:
obtaining, by a process, a first location of an object from a primary location determination hardware system;
obtaining, by the process, a second location of the object from a secondary location determination hardware system, wherein the primary location determination hardware system and the secondary location determination hardware system are different and selected from a group consisting of: the Global Positioning System (GPS), the BeiDou Navigation Satellite System (BDS), the Global Navigation Satellite System (GLONASS), the Galileo Global Navigation Satellite System, echo messages to communicated between the communication satellites and the object, and one-way relay messages communicated between the communication satellites and the object;
determining, by the process, a distance difference between the first location and the second location;
determining, by the process, whether the distance difference between the first location and the second location is acceptable based on a threshold distance; and
initiating, by the process, one or more mitigation actions in response to the distance difference between the first location and the second location being unacceptable.

34. The method as in claim 33, wherein one of the one or more mitigation actions comprises switching from utilization of the first location to the second location.

35. The method as in claim 33, wherein the object is a mobile device.

36. The method as in claim 33, wherein:
the process is executed on a ground station in communication with the object, or
the process is executed on the object, when the object is a mobile device.

37. The method as in claim 33, wherein the primary location determination hardware system and secondary location determination hardware system are located on first and second devices, respectively, wherein the first and second devices are in communication with each other.

38. The method as in claim 37, wherein one of the first and second devices is the object.

39. A method, comprising:
obtaining, by a process, a first location of an object from a primary location determination hardware system;
obtaining, by the process, a second location of the object from a secondary location determination hardware system;
determining, by the process, a distance difference between the first location and the second location;
determining, by the process, whether the distance difference between the first location and the second location is acceptable based on a threshold distance; and
initiating, by the process, one or more mitigation actions in response to the distance difference between the first location and the second location being unacceptable, wherein one of the one or more mitigation actions comprises providing a spoofing alert message.

40. The method as in claim 39, wherein the primary location determination hardware system is based on distances to Global Navigation Satellite System (GNSS) satellites, and wherein the secondary location determination hardware system is based on distances to communication satellites.

41. The method as in claim 40, wherein:
distances to communication satellites are calculated by echo messages communicated between the communication satellites and the object, or
distances to communication satellites are calculated by one-way relay messages communicated between the communication satellites and the object, or both.

42. The method as in claim 39, wherein the object is a mobile device.

43. The method as in claim 39, wherein:
the process is executed on a ground station in communication with the object, or
the process is executed on the object, when the object is a mobile device.

44. The method as in claim 39, wherein the primary location determination hardware system and secondary location determination hardware system are located on first and second devices, respectively, wherein the first and second devices are in communication with each other.

45. The method as in claim 44, wherein one of the first and second devices is the object.

46. A method, comprising:
obtaining, by a process, a first location of an object from a primary location determination hardware system;
obtaining, by the process, a second location of the object from a secondary location determination hardware system;
determining, by the process, a distance difference between the first location and the second location;
determining, by the process, whether the distance difference between the first location and the second location is acceptable based on a threshold distance; and
initiating, by the process, one or more mitigation actions in response to the distance difference between the first location and the second location being unacceptable, wherein one of the one or more mitigation actions comprises determining one or more trusted measurements from the primary location determination hardware system, and augmenting the one or more trusted measurements from the primary location determination hardware system with one or more measurements from an alternative location determination hardware system.

47. The method as in claim 46, wherein the alternative location determination hardware system is the secondary location determination hardware system.

48. A method, comprising:
obtaining, by a process, a first location of an object from a primary location determination hardware system;
obtaining, by the process, a second location of the object from a secondary location determination hardware system;
determining, by the process, a distance difference between the first location and the second location;
determining, by the process, whether the distance difference between the first location and the second location is acceptable based on a threshold distance; and
initiating, by the process, one or more mitigation actions in response to the distance difference between the first location and the second location being unacceptable, wherein one of the one or more mitigation actions comprises alerting one or more subordinate devices.

49. The method as in claim 48, wherein alerting the one or more subordinate devices causes the one or more subordinate devices switch from utilization of the primary location determination hardware system to an alternative location determination hardware system for geolocation of a respective subordinate device of the one or more subordinate devices.

50. The method as in claim 49, wherein the alternative location determination hardware system is the secondary location determination hardware system.

51. A method, comprising:
obtaining, by a process, a first location of an object from a primary location determination hardware system;
obtaining, by the process, a second location of the object from a secondary location determination hardware system;
determining, by the process, a distance difference between the first location and the second location;
determining, by the process, whether the distance difference between the first location and the second location is acceptable based on a threshold distance; and
initiating, by the process, one or more mitigation actions in response to the distance difference between the first location and the second location being unacceptable, wherein the process is executed on an aircraft, and wherein one of the one or more mitigation actions comprises preventing a drop of cargo from the aircraft.

52. The method as in claim 51, wherein the cargo is configured to self-navigate during a drop based on the primary location determination hardware system.

53. A method, comprising:
obtaining, by a process, a first location of an object from a primary location determination hardware system;
obtaining, by the process, a second location of the object from a secondary location determination hardware system;
determining, by the process, a distance difference between the first location and the second location;
determining, by the process, whether the distance difference between the first location and the second location is acceptable based on a threshold distance; and
initiating, by the process, one or more mitigation actions in response to the distance difference between the first location and the second location being unacceptable, wherein the process is executed on an aircraft, and wherein a cargo associated with the aircraft is configured to self-navigate during a drop from the aircraft, and wherein one of the one or more mitigation actions comprises instructing the cargo to utilize an alternative location determination hardware system during a drop from the aircraft.

54. The method as in claim 53, wherein the alternative location determination hardware system is the secondary location determination hardware system.

55. A method, comprising:
obtaining, by a process, a first location of an object from a primary location determination hardware system;
obtaining, by the process, a second location of the object from a secondary location determination hardware system;
determining, by the process, a distance difference between the first location and the second location;
determining, by the process, whether the distance difference between the first location and the second location is acceptable based on a threshold distance; and
initiating, by the process, one or more mitigation actions in response to the distance difference between the first location and the second location being unacceptable, wherein one of the one or more mitigation actions comprises adjusting one or more communication parameters of the primary location determination hardware system to circumvent spoofing communications of the primary location determination hardware system.

56. The method as in claim 55, wherein the primary location determination hardware system is based on distances to Global Navigation Satellite System (GNSS) satellites, and wherein the secondary location determination hardware system is based on distances to communication satellites.

57. The method as in claim 56, wherein:
distances to communication satellites are calculated by echo messages communicated between the communication satellites and the object, or
distances to communication satellites are calculated by one-way relay messages communicated between the communication satellites and the object, or both.

58. The method as in claim 55, wherein the object is a mobile device.

59. The method as in claim 55, wherein:
the process is executed on a ground station in communication with the object, or
the process is executed on the object, when the object is a mobile device.

60. The method as in claim 55, wherein the primary location determination hardware system and secondary location determination hardware system are located on first and second devices, respectively, wherein the first and second devices are in communication with each other.

61. The method as in claim 60, wherein one of the first and second devices is the object.

62. A method, comprising:
obtaining, by a process, a first location of an object from a primary location determination hardware system;
obtaining, by the process, a second location of the object from a secondary location determination hardware system;
determining, by the process, a distance difference between the first location and the second location;
determining, by the process, whether the distance difference between the first location and the second location is acceptable based on a threshold distance; and
initiating, by the process, one or more mitigation actions in response to the distance difference between the first location and the second location being unacceptable, wherein one of the one or more mitigation actions comprises selecting different reference objects used by the primary location determination hardware system to circumvent spoofed reference objects of the primary location determination hardware system.

63. A method, comprising:
obtaining, by a process, a first location of an object from a primary location determination hardware system;
obtaining, by the process, a second location of the object from a secondary location determination hardware system;
determining, by the process, a distance difference between the first location and the second location;
determining, by the process, whether the distance difference between the first location and the second location is acceptable based on a threshold distance, wherein the threshold distance is based on one or both of a first accuracy error of the primary location determination hardware system for the first location and a second accuracy error of the secondary location determination hardware system for the second location; and
initiating, by the process, one or more mitigation actions in response to the distance difference between the first location and the second location being unacceptable.

64. A method, comprising:
obtaining, by a process, a first location of an object from a primary location determination hardware system;
obtaining, by the process, a second location of the object from a secondary location determination hardware system;
determining, by the process, a distance difference between the first location and the second location;
determining, by the process, whether the distance difference between the first location and the second location is acceptable based on a threshold distance, wherein the threshold distance is based on an expected error in a calculated location of one or more satellites used by one of either the primary location determination hardware system or the secondary location determination hardware system; and
initiating, by the process, one or more mitigation actions in response to the distance difference between the first location and the second location being unacceptable.

65. A tangible, non-transitory, computer-readable medium storing program instructions that cause a computer on a communication device to execute a process, the process comprising:
obtaining a first location of an object from a primary location determination hardware system;
obtaining a second location of the object from a secondary location determination hardware system;
determining a distance difference between the first location and the second location;
determining whether the distance difference between the first location and the second location is acceptable based on a threshold distance; and
initiating one or more mitigation actions in response to the distance difference between the first location and the second location being unacceptable.

66. An apparatus, comprising:
a processor configured to execute one or more processes;
a communication interface configured to communicate via one or more satellite antennas associated with the apparatus; and
a memory configured to store a process executable by the processor, the process, when executed, configured to perform a process comprising:
obtaining a first location of an object from a primary location determination hardware system;
obtaining a second location of the object from a secondary location determination hardware system;
determining a distance difference between the first location and the second location;
determining whether the distance difference between the first location and the second location is acceptable based on a threshold distance; and
initiating one or more mitigation actions in response to the distance difference between the first location and the second location being unacceptable.

67. The apparatus as in claim 66, wherein one of the one or more mitigation actions comprises switching from utilization of the first location to the second location.

68. The apparatus as in claim 66, wherein one of the one or more mitigation actions comprises switching from utilization of the primary location determination hardware system to the secondary location determination hardware system for geolocation of the object.

69. The apparatus as in claim 66, wherein the primary location determination hardware system is based on distances to Global Navigation Satellite System (GNSS) satellites, and wherein the secondary location determination hardware system is based on distances to communication satellites.

70. The apparatus as in claim 69, wherein:
distances to communication satellites are calculated by echo messages communicated between the communication satellites and the object, or distances to communication satellites are calculated by one-way relay messages communicated between the communication satellites and the object, or both.

71. The apparatus as in claim 69, wherein the communication satellite is selected from a group consisting of: a geosynchronous equatorial orbit (GEO) satellite; a medium earth orbit (MEO) satellite; and a low earth orbit (LEO) satellite.

72. The apparatus as in claim 66, wherein the object is a mobile device.

73. The apparatus as in claim 66, wherein:
the apparatus is a ground station in communication with the object, or
the apparatus is the object, and the object is a mobile device.

74. The apparatus as in claim 66, wherein the primary location determination hardware system and secondary location determination hardware system are located on a single device.

75. The apparatus as in claim 74, wherein:
the single device is the object; or
the single device is a separate device other than the object.

76. The apparatus as in claim 66, wherein the primary location determination hardware system and secondary location determination hardware system are located on first and second devices, respectively, wherein the first and second devices are in communication with each other.

77. The apparatus as in claim 76, wherein one of the first and second devices is the object.

78. The apparatus as in claim 66, wherein the primary location determination hardware system has a better sensitivity than the secondary location determination hardware system.

79. The apparatus as in claim 66, wherein the process further comprises:
utilizing the first location in response to the distance difference between the first location and the second location being acceptable.

80. The apparatus as in claim 66, wherein one of the one or more mitigation actions comprises determining a weighted average location of the object as a weighted average between the first location and second location.

81. The apparatus as in claim 66, wherein at least one of the primary location determination hardware system and the secondary location determination hardware system is based on a fusion algorithm using input from a plurality of location determination hardware systems, wherein the primary location determination hardware system and the secondary location determination hardware system differ by at least one location determination hardware system.

82. The apparatus as in claim 66, wherein the primary location determination hardware system and the secondary location determination hardware system are different and selected from a group consisting of: the Global Positioning System (GPS), the BeiDou Navigation Satellite System (BDS), the Global Navigation Satellite System (GLONASS), the Galileo Global Navigation Satellite System, echo messages communicated between the communication satellites and the object, and one-way relay messages communicated between the communication satellites and the object.

83. The apparatus as in claim 66, wherein one of the one or more mitigation actions comprises providing a spoofing alert message.

84. The apparatus as in claim 66, wherein one of the one or more mitigation actions comprises determining one or more trusted measurements from the primary location determination hardware system, and augmenting the one or more trusted measurements from the primary location determination hardware system with one or more measurements from an alternative location determination hardware system.

85. The apparatus as in claim 84, wherein the alternative location determination hardware system is the secondary location determination hardware system.

86. The apparatus as in claim 66, wherein one of the one or more mitigation actions comprises alerting one or more subordinate devices.

87. The apparatus as in claim 86, wherein alerting the one or more subordinate devices causes the one or more subordinate devices switch from utilization of the primary location determination hardware system to an alternative location determination hardware system for geolocation of a respective subordinate device of the one or more subordinate devices.

88. The apparatus as in claim 87, wherein the alternative location determination hardware system is the secondary location determination hardware system.

89. The apparatus as in claim 66, wherein the process is executed on an aircraft, and wherein one of the one or more mitigation actions comprises preventing a drop of cargo from the aircraft.

90. The apparatus as in claim 89, wherein the cargo is configured to self-navigate during a drop based on the primary location determination hardware system.

91. The apparatus as in claim 66, wherein the process is executed on an aircraft, and wherein a cargo associated with the aircraft is configured to self-navigate during a drop from the aircraft, and wherein one of the one or more mitigation actions comprises instructing the cargo to utilize an alternative location determination hardware system during a drop from the aircraft.

92. The apparatus as in claim 91, wherein the alternative location determination hardware system is the secondary location determination hardware system.

93. The apparatus as in claim 66, wherein one of the one or more mitigation actions comprises adjusting one or more communication parameters of the primary location determination hardware system to circumvent spoofing communications of the primary location determination hardware system.

94. The apparatus as in claim 66, wherein one of the one or more mitigation actions comprises selecting different reference objects used by the primary location determination hardware system to circumvent spoofed reference objects of the primary location determination hardware system.

95. The apparatus as in claim 66, wherein the threshold distance is based on one or both of a first accuracy error of the primary location determination hardware system for the first location and a second accuracy error of the secondary location determination hardware system for the second location.

96. The apparatus as in claim 66, wherein the threshold distance is based on an expected error in a calculated location of one or more satellites used by one of either the primary location determination hardware system or the secondary location determination hardware system.

* * * * *